United States Patent
Yamada et al.

(10) Patent No.: US 9,998,836 B2
(45) Date of Patent: Jun. 12, 2018

(54) ELECTRONIC DEVICE, CONTROL METHOD, AND CONTROL PROGRAM

(71) Applicant: KYOCERA CORPORATION, Kyoto-shi, Kyoto (JP)

(72) Inventors: Hidekatsu Yamada, Yokohama (JP); Junichi Kondou, Yokohama (JP); Junya Yano, Yokohama (JP); Yoshitaka Tokuyama, Yokohama (JP); Takaaki Watanabe, Kawasaki (JP); Shuichi Kutsuzawa, Isehara (JP)

(73) Assignee: KYOCERA CORPORATION, Kyoto (JP)

( * ) Notice: Subject to any disclaimer, the term of this patent is extended or adjusted under 35 U.S.C. 154(b) by 0 days. days.

(21) Appl. No.: 14/375,441

(22) PCT Filed: Apr. 30, 2013

(86) PCT No.: PCT/JP2013/062568
§ 371 (c)(1),
(2) Date: Jul. 30, 2014

(87) PCT Pub. No.: WO2013/164999
PCT Pub. Date: Nov. 7, 2013

(65) Prior Publication Data
US 2015/0043758 A1 Feb. 12, 2015

(30) Foreign Application Priority Data

May 1, 2012 (JP) .................... 2012-104970
May 1, 2012 (JP) .................... 2012-104971
May 25, 2012 (JP) .................... 2012-120086

(51) Int. Cl.
*H04R 17/00* (2006.01)
*H04M 1/02* (2006.01)
(Continued)

(52) U.S. Cl.
CPC .......... *H04R 17/00* (2013.01); *G10K 11/178* (2013.01); *H04M 1/03* (2013.01); *H04R 1/46* (2013.01);
(Continued)

(58) Field of Classification Search
CPC ........ G10K 11/178; G10K 2210/1081; H04M 1/03; H04M 1/0266; H04R 17/00;
(Continued)

(56) References Cited

U.S. PATENT DOCUMENTS 5,511,132 A * 4/1996 Yoshimi ............... H04R 1/1091
381/151
5,682,418 A * 10/1997 Ide ......................... H04M 1/03
379/433.03
(Continued)

FOREIGN PATENT DOCUMENTS

JP 9-36940 A 2/1997
JP 10-271195 A 10/1998
(Continued)

OTHER PUBLICATIONS

ISR for PCT/JP2013/062568 dated Aug. 6, 2013.
(Continued)

*Primary Examiner* — Fan Tsang
*Assistant Examiner* — Angelica M McKinney
(74) *Attorney, Agent, or Firm* — Hauptman Ham, LLP

(57) ABSTRACT

According to an aspect, an electronic device includes: a piezoelectric element; a first sound generating unit that is vibrated by the piezoelectric element and generates a vibration sound transmitted by vibrating a part of a human body; and a second sound generating unit that generates an air conduction sound.

24 Claims, 41 Drawing Sheets

(51) Int. Cl.
*G10K 11/178* (2006.01)
*H04M 1/03* (2006.01)
*H04R 1/46* (2006.01)
*H04R 7/04* (2006.01)

(52) U.S. Cl.
CPC ... *G10K 2210/1081* (2013.01); *H04M 1/0266* (2013.01); *H04R 7/045* (2013.01); *H04R 2400/03* (2013.01); *H04R 2499/11* (2013.01)

(58) Field of Classification Search
CPC .. H04R 1/46; H04R 2499/11; H04R 2460/13; H04R 1/1016; H04R 2400/03; H04R 3/12; H04R 17/005; H04R 17/025; H04R 17/10; H04R 7/045; H03G 3/32
See application file for complete search history.

(56) References Cited

U.S. PATENT DOCUMENTS

| | | | | |
|---|---|---|---|---|
| 5,983,186 | A * | 11/1999 | Miyazawa | G10L 15/26 704/233 |
| 6,674,996 | B1 | 1/2004 | Weckstrom | |
| 8,792,648 | B2 * | 7/2014 | Kim | H03G 3/32 381/57 |
| 9,002,020 | B1 * | 4/2015 | Kim | H04R 17/10 381/56 |
| 2002/0149561 | A1 * | 10/2002 | Fukumoto | G01C 21/3664 345/156 |
| 2003/0003879 | A1 * | 1/2003 | Saiki | H04M 1/03 455/575.1 |
| 2005/0185813 | A1 * | 8/2005 | Sinclair | G10L 21/0208 381/380 |
| 2006/0227981 | A1 * | 10/2006 | Miyata | 381/124 |
| 2006/0227984 | A1 * | 10/2006 | Sinclair | G01P 15/125 381/174 |
| 2006/0233413 | A1 * | 10/2006 | Nam | 381/380 |
| 2007/0037605 | A1 * | 2/2007 | Logan | G08B 13/1427 455/567 |
| 2008/0112581 | A1 * | 5/2008 | Kim et al. | 381/151 |
| 2008/0181442 | A1 * | 7/2008 | Goldstein | G01H 3/14 381/354 |
| 2008/0318640 | A1 * | 12/2008 | Takano | H04R 1/38 455/569.1 |
| 2010/0081487 | A1 * | 4/2010 | Chen | G10L 21/0208 455/575.1 |
| 2010/0195838 | A1 * | 8/2010 | Bright | H04M 1/03 381/57 |
| 2010/0246807 | A1 * | 9/2010 | Kemmochi | H04M 1/05 379/441 |
| 2010/0278362 | A1 * | 11/2010 | Kim | H04M 1/03 381/151 |
| 2011/0158443 | A1 * | 6/2011 | snes et al. | 381/326 |
| 2011/0294550 | A1 | 12/2011 | Tsuchida | |

FOREIGN PATENT DOCUMENTS

| | | | |
|---|---|---|---|
| JP | 2000-232504 A | 8/2000 | |
| JP | 2002-095060 A | 3/2002 | |
| JP | 2002-232542 A | 8/2002 | |
| JP | 2003-143253 A | 5/2003 | |
| JP | 2004-187031 A | 7/2004 | |
| JP | 2005-175746 A | 6/2005 | |
| JP | 2005-348193 A | 12/2005 | |
| JP | 2006-067049 A | 3/2006 | |
| JP | 2006067049 * | 3/2006 | ............... H04R 1/00 |
| JP | 2006-197404 A | 7/2006 | |
| JP | 2007-019898 A | 1/2007 | |
| JP | 2007-082009 A | 3/2007 | |
| JP | 2007-189578 A | 7/2007 | |
| JP | 2007-194757 A | 8/2007 | |
| JP | 2010-10593 A | 1/2010 | |
| JP | 2010-81375 A | 4/2010 | |
| JP | 2010-193494 A | 9/2010 | |
| JP | 2010-239530 A | 10/2010 | |
| JP | 2011-091719 A | 5/2011 | |
| JP | 2011-205289 A | 10/2011 | |
| JP | 2011-249991 A | 12/2011 | |
| JP | 2012-65190 A | 3/2012 | |
| JP | 2013-201494 A | 10/2013 | |
| WO | WO2005096664 * | 10/2005 | ............... H04R 1/00 |

OTHER PUBLICATIONS

Office Action dated Dec. 22, 2015, corresponding to Japanese Patent Application No. 2012-104971, for which an explanation of relevance is attached.

Osamu Sonobe, KDDI and Kyocera prototyped "New Auditory Sensation Smartphone" with "Voice Vibrating Elements", IT media Mobile, Japan, IT Media, Sep. 27, 2011 (Search Date: May 27, 2013) URL: http://www.tmedia.co.jp/mobile/articles/1109/27/news071.html.

Office Action dated Feb. 23, 2016, in Japanese Patent Application No. 2012-120086, for which an explanation of relevance is attached.

Office Action dated Mar. 15, 2016, in Japanese Patent Application No. 2012-104971, for which an explanation of relevance is attached.

Office Action dated Oct. 25, 2016 in Japanese Patent Application No. 2012-104971, for which an explanation of relevance is attached.

* cited by examiner

ELECTRONIC DEVICE, CONTROL METHOD, AND CONTROL PROGRAM

RELATED APPLICATIONS

The present application is a National Phase of International Application Number PCT/JP2013/062568 filed Apr. 30, 2013 and claims priority of Japanese Application Number 2012-120086 filed May 25, 2012, Japanese Application Number 2012-104971 filed May 1, 2012 and Japanese Application Number 2012-104970 filed May 1, 2012.

FIELD

The present application relates to an electronic device, a control method, and a control program.

BACKGROUND

Patent Literature 1 discloses an electronic device that transmits an air conduction sound and a vibration sound to a user. Patent Literature 1 discloses that, when a voltage is applied to a piezoelectric element of a vibrator arranged on the external surface of a housing of the electronic device, the piezoelectric element expands and contracts, thereby causing the vibrator to generate bending vibration. Patent Literature 1 also discloses that the vibrator generating bending vibration is brought into contact with the auricle of the user, thereby transmitting the air conduction sound and the vibration sound to the user. Patent Literature 1 defines the air conduction sound as a sound transmitted to the auditory nerve of the user by vibration of air due to vibration of an object traveling through the external auditory meatus to the eardrum and vibrating the eardrum. Patent Literature 1 defines the vibration sound as a sound transmitted to the auditory nerve of the user via a part of the body of the user (e.g., the cartilage of the external ear) coming into contact with a vibrating object.

CITATION LIST

Patent Literature

Patent Literature 1: Japanese Patent Application Laid-open No. 2005-348193

Technical Problem

Electronic devices are typically desired to transmit a sound to a user more clearly.

SUMMARY

According to an aspect, an electronic device includes: a piezoelectric element; a first sound generating unit that is vibrated by the piezoelectric element and generates a vibration sound transmitted by vibrating a part of a human body; and a second sound generating unit that generates an air conduction sound.

According to another aspect, a control method is performed by an electronic device including a piezoelectric element, a first sound generating unit that is vibrated by the piezoelectric element and generates a vibration sound transmitted by vibrating a part of a human body, and a second sound generating unit that generates an air conduction sound. The control method includes generating a sound by at least one of the first sound generating unit and the second sound generating unit based on a certain condition.

According to another aspect, a control program causes an electronic device including a piezoelectric element, a first sound generating unit that is vibrated by the piezoelectric element and generates a vibration sound transmitted by vibrating a part of a human body, and a second sound generating unit that generates an air conduction sound to perform generating a sound by at least one of the first sound generating unit and the second sound generating unit based on a certain condition.

According to another aspect, an electronic device includes: a housing; a piezoelectric element; a first sound generating unit that is vibrated by the piezoelectric element and generates a vibration sound transmitted by vibrating a part of a human body; a second sound generating unit; and an attitude detection unit, wherein the first sound generating unit or the second sound generating unit generates a sound based on a detection result of the attitude detection unit.

According to another aspect, a control method is performed by an electronic device including a piezoelectric element, a first sound generating unit that is vibrated by the piezoelectric element and generates a vibration sound transmitted by vibrating a part of a human body, a second sound generating unit, and an attitude detection unit. The control method includes: determining to generate a sound from the first sound generating unit or the second sound generating unit based on a detection result of the attitude detection unit; and generating the sound from the first sound generating unit or the second sound generating unit selected at the determining.

According to another aspect, a control program causes an electronic device including a piezoelectric element, a first sound generating unit that is vibrated by the piezoelectric element and generates a vibration sound transmitted by vibrating a part of a human body, a second sound generating unit, and an attitude detection unit, to perform: determining to generate a sound from the first sound generating unit or the second sound generating unit based on a detection result of the attitude detection unit; and generating the sound from the first sound generating unit or the second sound generating unit selected at the determining.

According to another aspect, an electronic device includes: a housing; a piezoelectric element; a first sound generating unit that is vibrated by the piezoelectric element and generates a vibration sound transmitted by vibrating a part of a human body; a second sound generating unit; and an operation detection unit, wherein the first sound generating unit or the second sound generating unit generates a sound based on a detection result of the operation detection unit.

According to another aspect, A control method is performed by an electronic device including a piezoelectric element, a first sound generating unit that is vibrated by the piezoelectric element and generates a vibration sound transmitted by vibrating a part of a human body, a second sound generating unit, and an operation detection unit. The control method includes: determining to generate a sound from the first sound generating unit or the second sound generating unit based on a detection result of the operation detection unit; and generating the sound from the first sound generating unit or the second sound generating unit selected at the determining.

According to another aspect, a control program causes an electronic device including a piezoelectric element, a first sound generating unit that is vibrated by the piezoelectric element and generates a vibration sound transmitted by vibrating a part of a human body, a second sound generating unit, and an operation detection unit, to perform: determining to generate a sound from the first sound generating unit or the second sound generating unit based on a detection result of the operation detection unit; and generating the sound from the first sound generating unit or the second sound generating unit selected at the determining.

DESCRIPTION OF EMBODIMENTS

Exemplary embodiments according to the present invention are described below in greater detail with reference to the accompanying drawings. The following describes a mobile phone as an example of an electronic device that transmits an air conduction sound and a vibration sound to a user.

First Embodiment

Figure 1:
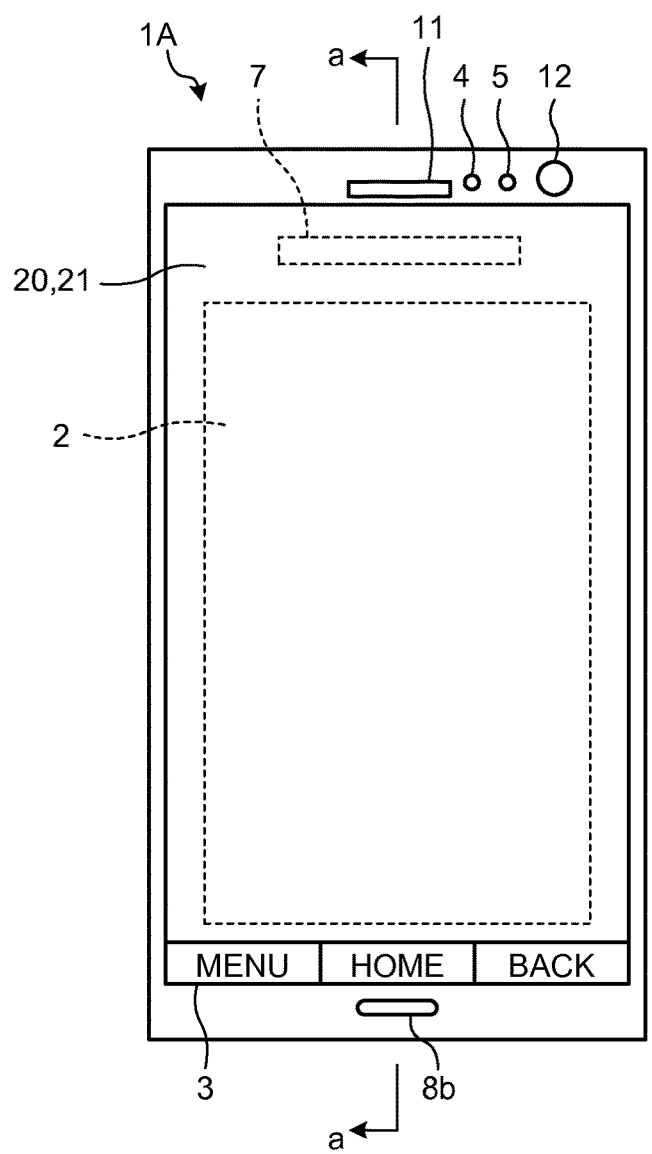
FIG. 1 is a front view of a mobile phone according to an embodiment.
Figure 2:
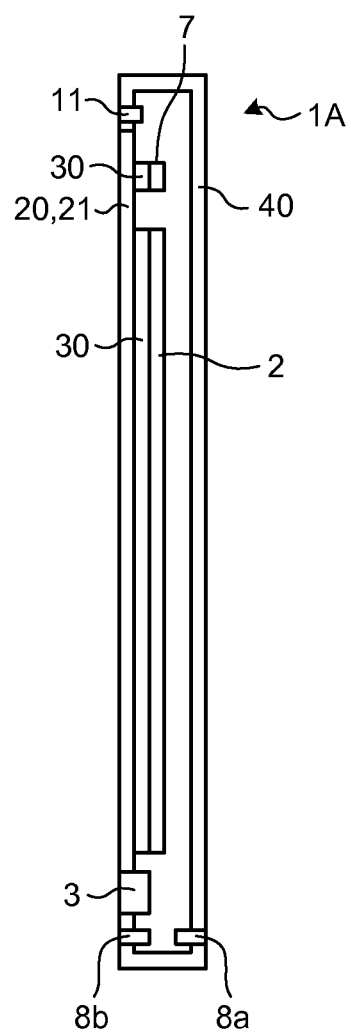
FIG. 2 is a sectional view of the mobile phone according to the embodiment.

The following describes an overall configuration of a mobile phone 1A according to an embodiment with reference to FIG. 1 and FIG. 2. FIG. 1 is a front view of the mobile phone 1A. FIG. 2 is a sectional view schematically illustrating the mobile phone 1A along line a-a. As illustrated in FIG. 1 and FIG. 2, the mobile phone 1A includes a display 2, buttons 3, an illuminance sensor 4, a proximity sensor 5, a piezoelectric element 7, a first microphone 8a and a second microphone 8b, a speaker 11, a camera 12, a panel 20, and a housing 40.

The display 2 includes a display device, such as a liquid crystal display (LCD), an organic electro-luminescence display (GELD), and an inorganic electro-luminescence display (IELD). The display 2 displays a character, an image, a symbol, and a figure, for example.

The buttons 3 receive an operation input from the user. The number of buttons 3 is not limited to that in the example illustrated in FIG. 1 and FIG. 2.

The illuminance sensor 4 detects the illuminance of light surrounding the mobile phone 1A. The illuminance indicates the intensity, the brightness, or the luminance of light. The illuminance sensor 4 is used to adjust the luminance of the display 2, for example. The proximity sensor 5 detects the presence of a contiguous object in a non-contact manner. The proximity sensor 5 detects the presence of the object based on a change in a magnetic field or a change in a returning time of reflected waves of ultrasonic waves, for example. The proximity sensor 5, for example, detects that the display 2 is brought closer to the face. The illuminance sensor 4 and the proximity sensor 5 may be integrated as a single sensor. The illuminance sensor 4 may be used as a proximity sensor.

When an electrical signal (a voltage corresponding to a sound signal) is applied, the piezoelectric element 7 expands and contracts or bends based on the electromechanical coupling coefficient of the constituent material. In other words, the piezoelectric element 7 deforms when an electrical signal is applied thereto. The piezoelectric element 7 is attached to the panel 20 and is used as a vibration source to vibrate the panel 20. The piezoelectric element 7 is formed of ceramics or crystals, for example. The piezoelectric element 7 may be a unimorph, a bimorph, or a laminated piezoelectric element. Examples of the laminated piezoelectric element include, but are not limited to, a laminated bimorph element obtained by laminating bimorphs (e.g., 16 layers or 24 layers of bimorphs). The laminated piezoelectric element has a laminated structure including a plurality of dielectric layers made of lead zirconate titanate (PZT) and electrode layers each arranged between the dielectric layers. The unimorph expands and contracts when an electrical signal (a voltage) is applied thereto. The bimorph bends when an electrical signal (a voltage) is applied thereto.

The first microphone 8a is an input unit that collects and receives a sound around the mobile phone 1A, such as engine noise and tire noise of a car, back-ground music (BGM) on the streets, voices of people, an announcement in a station yard, and rail noise caused by a train. The second microphone 8b is an input unit that receives a voice uttered by the user in a telephone conversation. The first microphone 8a and the second microphone 8b, for example, convert the received sound into an electrical signal and transmit the electrical signal to a controller 10. The first microphone 8a is an example of a sound input unit. The second microphone 8b is an example of a voice input unit.

The speaker 11 is a dynamic speaker, for example, and outputs a sound (an air conduction sound) by an air conduction method. The speaker 11 can transmit a sound obtained by converting an electrical signal to a person who does not bring the ear into contact with the mobile phone 1A. The speaker 11 is used to output a telephone conversation voice and music, for example. To transmit the sound output from the speaker 11 to the outside, an opening (a sound emitting port) is formed in the housing 40. To provide a waterproof structure for the opening, the opening may be blocked by a member that allows a gas to pass therethrough but not a liquid. Examples of the member that allows a gas to pass therethrough but not a liquid include, but are not limited to, Gore-Tex (registered trademark). The speaker 11 is an example of a second sound generating unit.

The camera 12 is an in-camera that photographs an object facing the display 2. The camera 12 converts the image obtained by the photographing into an electrical signal. The mobile phone 1A may include an out-camera that photographs an object facing the surface opposite to the display 2 besides the camera 12.

The panel 20 vibrates in association with deformation (expansion and contraction or bending) of the piezoelectric element 7 and transmits the vibration to the cartilage of the ear (e.g., the auricular cartilage) or the like brought into contact with the panel 20 by the user. The panel 20 is an example of a first sound generating unit. The panel 20 also has a function to protect the display 2, the piezoelectric element 7, and other components from external force. The panel 20 is made of glass or synthetic resin, such as acrylic. The panel 20 has a plate shape, for example. The panel 20 may be a flat plate or a curved panel having a smoothly curved surface.

The display 2 and the piezoelectric element 7 are attached to the back surface of the panel 20 with a joining member 30. The piezoelectric element 7 is arranged on the back surface of the panel 20 in a manner separated from the inner surface of the housing 40 by a predetermined distance. The piezoelectric element 7 is preferably separated from the inner surface of the housing 40 even when it expands and contracts or bends. In other words, the distance between the piezoelectric element 7 and the inner surface of the housing 40 is preferably larger than the maximum deformation amount of the piezoelectric element 7. The piezoelectric element 7 may be attached to the panel 20 via a reinforcing member (e.g., sheet metal or glass fiber reinforced resin). The joining member 30 is a double-sided tape or a thermosetting or ultraviolet curable adhesive, for example. The joining member 30 may be optical elastic resin, which is a colorless and transparent acrylic ultraviolet curable adhesive.

The display 2 is arranged at substantially the center of the panel 20 in the short direction. The piezoelectric element 7 is arranged at a position away from an end of the panel 20 in the longitudinal direction by a predetermined distance such that the longitudinal direction of the piezoelectric element 7 is parallel to the short direction of the panel 20. The display 2 and the piezoelectric element 7 are arranged side by side and parallel to each other on the inner-side surface of the panel 20.

Substantially the entire outer-side surface of the panel 20 is provided with a touch screen (a touch sensor) 21. The touch screen 21 detects a contact on the panel 20. The touch screen 21 is used to detect a contact operation performed by the user with a finger, a pen, or a stylus pen, for example. Examples of the gesture detected by the touch screen 21 include, but are not limited to, a touch, a long touch, a release, a swipe, a tap, a double-tap, a long tap, a drag, a flick, a pinch-in, and a pinch-out. The touch screen 21 may employ a desired detection system, including a capacitive system, a resistance film system, a surface acoustic wave system (or an ultrasonic wave system), an infrared system, an electromagnetic induction system, and a load detecting system.

The touch screen 21 is also used to detect the auricle, the body, or the like coming into contact with the panel 20 to listen to a sound.

The housing 40 is made of resin or metal. The housing 40 supports the buttons 3, the illuminance sensor 4, the proximity sensor 5, the first microphone 8a, the second microphone 8b, the speaker 11, the camera 12, and the panel 20, for example.

Figure 3:
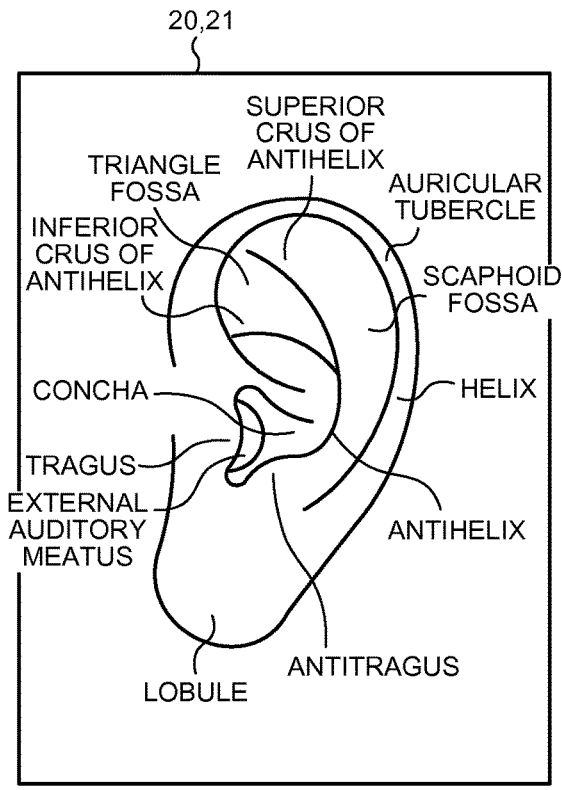
FIG. 3 is a schematic of an example of the shape of a panel.
Figure 4:
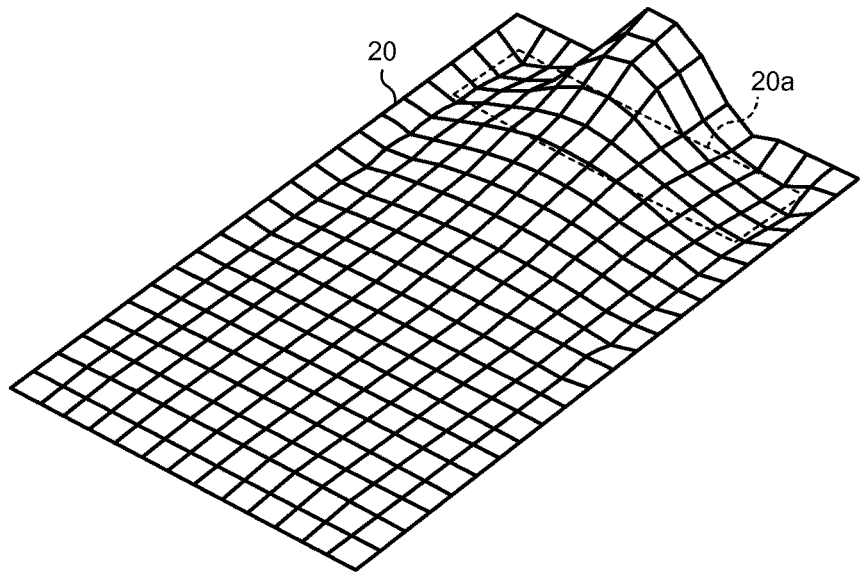
FIG. 4 is a schematic of an example of vibration of the panel.

The following describes output of a sound performed by the mobile phone 1A according to the embodiment in greater detail with reference to FIG. 1 to FIG. 4. FIG. 3 is a schematic of an example of the shape of the panel 20. FIG. 4 is a schematic of an example of vibration of the panel 20.

The piezoelectric element 7 is supplied with an electrical signal corresponding to a sound to be output. The piezoelectric element 7 may be supplied with a voltage of ±15 V, which is higher than a voltage of ±5 V applied to what is called a panel speaker that transmits a sound as an air conduction sound traveling through an external auditory meatus, for example. This enables the panel 20 to generate sufficient vibration even when the user presses a part of the body against the panel 20 with force of equal to or larger than 3 N (force of 5 N to 10 N), for example. Thus, the panel 20 can generate a vibration sound transmitted via the part of the body of the user. The voltage applied to the piezoelectric element 7 can be appropriately adjusted depending on the fixing strength of the panel 20 to the housing 40 or the performance of the piezoelectric element 7, for example.

Application of an electrical signal causes the piezoelectric element 7 to expand and contract or bend in the longitudinal direction. The panel 20 to which the piezoelectric element 7 is attached deforms in association with expansion and contraction or bending of the piezoelectric element 7. This causes the panel 20 to vibrate and generate an air conduction sound. Furthermore, when the user brings a part of the body (e.g., the auricular cartilage) into contact with the panel 20, the panel 20 generates a vibration sound conducted to the user via the part of the body. In other words, the panel 20 vibrates with respect to by an object in contact with the panel 20 in association with the deformation of the piezoelectric element 7 at a frequency such that the vibration is sensed as a vibration sound. The panel 20 is curved by expansion and contraction or bending of the piezoelectric element 7. The panel 20 is directly bent by the piezoelectric element 7. The phenomenon that "the panel 20 is directly bent by the piezoelectric element" is different from the phenomenon that a specific area of the panel is vibrated by inertial force of a piezoelectric actuator, which includes a piezoelectric element arranged in a casing as employed in a conventional panel speaker, and thereby a panel is deformed. The fact that "the panel 20 is directly bent by the piezoelectric element" means that expansion and contraction or bending (curve) of the piezoelectric element directly bends the panel via the joining member or via the joining member and a reinforcing member 31, which will be described later.

When an electrical signal corresponding to sound data of a voice of a communication partner in a telephone conversation, a ringtone, or music is applied to the piezoelectric element 7, for example, the panel 20 generates an air conduction sound and a vibration sound corresponding to the electrical signal. The sound signal output via the piezoelectric element 7 and the panel 20 may be based on sound data stored in a storage 9, which will be described later. Alternatively, the sound signal output via the piezoelectric element 7 and the panel 20 may be based on sound data stored in an external server or the like and acquired via a network by a communication unit 6, which will be described later.

In the present embodiment, the panel 20 may have substantially the same size as that of the ear of the user. Alternatively, the panel 20 may have a size larger than that of the ear of the user as illustrated in FIG. 3. This enables the user to bring substantially the entire outer rim of the ear into contact with the panel 20 to listen to a sound. Listening to a sound in this manner can make an ambient sound (noise) less likely to enter the external auditory meatus. In the present embodiment, the panel 20 vibrates in at least a larger area than an area having the length in the longitudinal direction (or the short direction) corresponding to the distance from the lower crus of the antihelix (inferior crus of the antihelix) of a human to the antitragus and the length in the short direction (or the longitudinal direction) corresponding to the distance from the tragus to the antihelix. Alternatively, the panel 20 may vibrate in an area having the length in the longitudinal direction (or the short direction) corresponding to the distance from a part near the upper crus of the antihelix (superior crus of the antihelix) in the helix to the lobule and the length in the short direction (or the longitudinal direction) corresponding to the distance from the tragus to a part near the antihelix in the helix. The area having the length and the width described above may be a rectangular area or an elliptical area having the length in the longitudinal direction described above as the major axis and the length in the short direction as the minor axis. The average size of a human ear can be understood by referring to the Japanese body size database (1992 to 1994) by the Research Institute of Human Engineering for Quality Life (HQL), for example.

As illustrated in FIG. 4, the panel 20 vibrates not only in an attachment area 20a to which the piezoelectric element 7 is attached but also in an area away from the attachment area 20a. The panel 20 has a plurality of points that vibrate in a direction intersecting with the principal surface of the panel 20 in the vibration area. In each of the points, the value of amplitude of the vibration changes from plus to minus or minus to plus with time. The panel 20 generates vibration as follows: portions having relatively large amplitude of vibration and portions having relatively small amplitude of vibration are distributed seemingly at random or regularly on substantially the whole of the panel 20 at each moment. In other words, a plurality of vibration waves are detected all over the panel 20. Applying a voltage of ±15 V to the piezoelectric element 7 as described above can make the vibration of the panel 20 less likely to attenuate even when the user presses the panel 20 against the body with force of 5 N to 10 N, for example. This enables the user to listen to the vibration sound even when the user brings the ear into contact with an area away from the attachment area 20a on the panel 20. An upper portion of the panel 20 is directly bent by the piezoelectric element 7, and the vibration attenuates in a lower portion compared with the upper portion. The panel 20 is bent by the piezoelectric element 7 such that an area just above the piezoelectric element 7 with respect to the long-side direction of the piezoelectric element 7 protrudes the most compared with the peripheral area.

In the present embodiment, the display 2 is attached to the panel 20. With this configuration, a lower portion (the side to which the display 2 is attached) of the panel 20 has higher rigidity. Thus, the lower portion generates smaller vibration than that generated by an upper portion (the side to which the piezoelectric element 7 is attached) of the panel 20. This can reduce sound leakage of an air conduction sound caused by the vibration of the panel 20 at the lower portion of the panel 20.

With vibration of the panel 20, the mobile phone 1A can transmit an air conduction sound and a vibration sound traveling via a part of the body of the user (e.g., the auricular cartilage) to the user. Thus, when outputting a sound at a volume equivalent to that of a dynamic receiver, the mobile phone 1A can reduce the amount of sound transmitted to the surroundings of the mobile phone 1A with vibration of the air compared with an electronic device including a dynamic speaker alone. This feature is effectively used to listen to a recorded message in a place where other people are present nearby like the inside of a train, for example.

Furthermore, the mobile phone 1A transmits the vibration sound to the user with the vibration of the panel 20. Thus, even when the user wears earphones or headphones, the user brings the mobile phone 1A into contact with the earphones or headphones, thereby listening to the vibration sound caused by the vibration of the panel 20 via the earphones or headphones and a part of the body.

Furthermore, the mobile phone 1A transmits a sound with the vibration of the panel 20. Thus, if the mobile phone 1A includes no separated dynamic receiver (e.g., the speaker 11), it is not necessary to form an opening (a sound emitting port) used to transmit the sound generated by the panel 20 to the outside in the housing 40.

Figure 5:
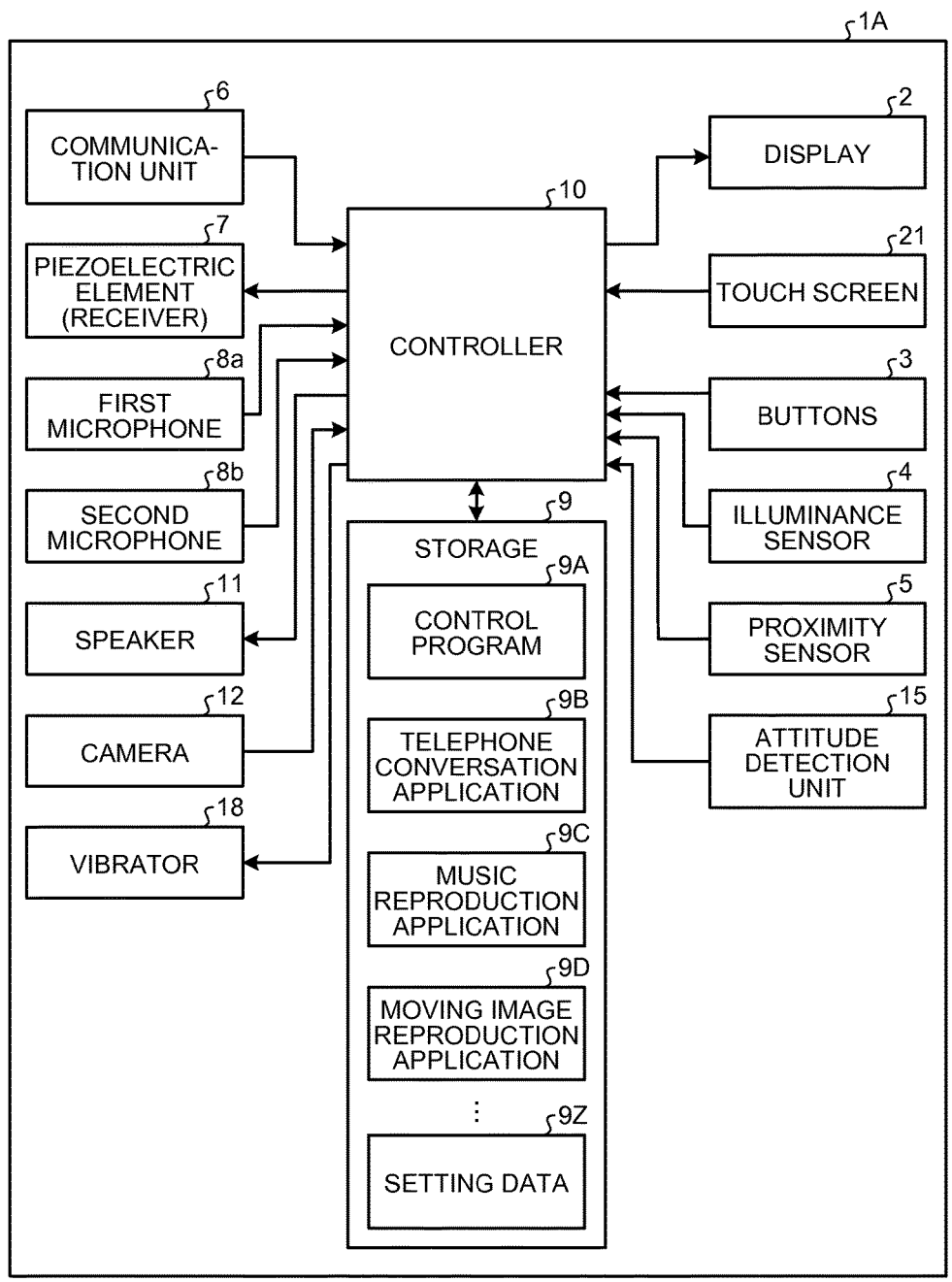
FIG. 5 is a block diagram of the mobile phone according to the embodiment.

The following describes the functional configuration of the mobile phone 1A with reference to FIG. 5. FIG. 5 is a block diagram of the mobile phone 1A. As illustrated in FIG. 5, the mobile phone 1A includes the display 2, the buttons 3, the illuminance sensor 4, the proximity sensor 5, the communication unit 6, the piezoelectric element 7, the first microphone 8a, the second microphone 8b, the storage 9, the controller 10, the speaker 11, the camera 12, an attitude detection unit 15, a vibrator 18, and the touch screen 21.

The communication unit 6 performs wireless communications. The communication unit 6 supports a communication method of a wireless communication standard. Examples of the wireless communication standard include, but are not limited to, a communication standard for a cellular phone of 2G, 3G, and/or 4G. Examples of the communication standard for a cellular phone include, but are not limited to, long term evolution (LTE), wideband code division multiple access (W-CDMA), CDMA 2000, personal digital cellular (PDC), global system for mobile communications (GSM) (registered trademark), and personal handy-phone system (PHS). Examples of the wireless communication standard further include, but are not limited to, worldwide interoperability for microwave access (Wi-MAX), IEEE 802.11, Bluetooth (registered trademark), infrared data association (IrDA), and near field communication (NFC). The communication unit 6 may support one or a plurality of the communication standards described above.

The storage 9 stores therein computer programs and data. The storage 9 is also used as a work area that temporarily stores therein a processing result of the controller 10. The storage 9 may include a desired non-transitory storage medium, such as a semiconductor storage medium and a magnetic storage medium. The storage 9 may include a plurality of types of storage media. The storage 9 may include a combination of a portable storage medium, such as a memory card, an optical disc, and a magneto-optical disc, and a reading device for the storage medium. The storage 9 may include a storage device used as a temporary storage area, such as a random access memory (RAM).

The computer programs stored in the storage 9 include an application executed in the foreground or the background and a control program that supports the operation of the application. The application, for example, causes the display 2 to display a screen and then causes the controller 10 to perform processing corresponding to a gesture detected through the touch screen 21. The control program is an operating system (OS), for example. The application and the control program may be installed on the storage 9 via wireless communications performed by the communication unit 6 or a non-transitory storage medium.

The storage 9 stores therein a control program 9A, a telephone conversation application 9B, a music reproduction application 9C, a moving image reproduction application 9D, and setting data 9Z. The telephone conversation application 9B provides a telephone conversation function for a telephone conversation made via wireless communications. The music reproduction application 9C provides a music reproduction function to reproduce a sound from music data. The moving image reproduction application 9D provides a moving image reproduction function to reproduce a moving image and a sound from moving image data. The setting data 9Z includes information on various types of settings and processing relating to the operation of the mobile phone 1A. The setting data 9Z includes the following information as the information on various types of settings and processing relating to the operation of the mobile phone 1A: information on a currently used output method of a telephone conversation voice; a threshold to be compared with the sound pressure of a sound received by the first microphone 8a; and information on instruction for switching the output method of the telephone conversation voice.

The control program 9A provides a function relating to various types of control to operate the mobile phone 1A. The control program 9A, for example, controls the communication unit 6, the piezoelectric element 7, the first microphone 8a, the second microphone 8b, and other components, thereby establishing a telephone conversation. The function provided by the control program 9A may be combined with a function provided by other computer programs, such as the telephone conversation application 9B.

The control program 9A includes a function to determine whether a switching instruction for the output method of a telephone conversation voice is given at the start of telephone conversation processing performed by the telephone conversation application 9B, for example. If a switching instruction is given, the output method of a telephone conversation voice is switched to the method corresponding to the switching instruction to output the telephone conversation voice. The control program 9A further includes a function to perform switching determination processing of the output method based on the sound pressure level when a calling operation using the buttons 3 or the like or an incoming call in the communication unit 6 is detected. In the first embodiment, the mobile phone 1A uses a first output method and a second output method as the output method of a telephone conversation voice. In the first output method, the telephone conversation voice is output from the speaker 11. In the second output method, the telephone conversation voice is output by vibrating the panel 20 at a frequency such that sound vibration of the voice is transmitted to an object (e.g., the ear of the user) in contact with the panel 20 with deformation of the piezoelectric element 7. In the description below, for convenience of the explanation, a dynamic speaker method indicates the first output method for outputting the telephone conversation voice from the speaker 11, and a human body conduction method indicates the second output method for outputting the telephone conversation voice by causing the panel 20 to vibrate at a frequency such that sound vibration of the voice is transmitted to an object (e.g., the ear of the user) in contact with the panel 20 with deformation of the piezoelectric element 7.

The controller 10 is a processing device. Examples of the processing device include, but are not limited to, a central processing unit (CPU), a system-on-a-chip (SoC), a micro control unit (MCU), and a field-programmable gate array (FPGA). The controller 10 integrally controls the operations of the mobile phone 1A, thereby providing various types of functions.

Specifically, the controller 10 executes instructions included in the computer programs stored in the storage 9 while referring to the data stored in the storage 9 as needed. The controller 10 controls functional units in accordance with the data and the instructions, thereby providing various types of functions. Examples of the functional units include, but are not limited to, the display 2, the communication unit 6, the piezoelectric element 7, the first microphone 8a, the second microphone 8b, and the speaker 11, the vibrator 18. The controller 10 may change the control based on a detection result of detecting units. Examples of the detecting units include, but are not limited to, the buttons 3, the illuminance sensor 4, the proximity sensor 5, the camera 12, the attitude detection unit 15, and the touch screen 21.

The controller 10 executes the control program 9A, for example, thereby performing switching of the output method of a telephone conversation voice at the start of telephone conversation processing performed by the telephone conversation application 9B. If a switching instruction for the output method of a telephone conversation voice is given at the start of telephone conversation processing, for example, the controller 10 reads the information on the current output method from the setting data 9Z stored in the storage 9. If the current output method is different from the output method corresponding to the switching instruction, the controller 10 switches the output method of a telephone conversation voice to the method corresponding to the switching instruction and then outputs the telephone conversation voice. The controller 10 updates the information on the output method in the setting data 9Z with the output method resulting from the switching.

The controller 10 executes the control program 9A, for example, thereby further performing switching determination processing of the output method based on the sound pressure level when a calling operation using the buttons 3 or the like or an incoming call in the communication unit 6 is detected. The controller 10, for example, selects at least one of the dynamic speaker method and the human body conduction method based on a result of comparison between the sound pressure of a sound received by the first microphone 8a and a threshold. Thus, the controller 10 performs control to transmit a telephone conversation voice received from a mobile phone of a communication partner to the user in a telephone conversation. More specifically, when a calling operation using the buttons 3 or the like or an incoming call in the communication unit 6 is detected, the controller 10 compares the sound pressure of a sound received by the first microphone 8a with the threshold. If the sound pressure of the sound received by the first microphone 8a is lower than the threshold, the controller 10 stores a switching instruction for the output method to transmit the telephone conversation voice to the user by the dynamic speaker method in the setting data 9Z of the storage 9. By contrast, if the sound pressure of the sound received by the first microphone 8a is not lower than the threshold, the controller 10 stores a switching instruction for the output method to transmit the telephone conversation voice to the user by the human body conduction method in the setting data 9Z of the storage 9.

The attitude detection unit 15 detects the attitude of the mobile phone 1A. The attitude detection unit 15 includes at least one of an acceleration sensor, an orientation sensor, and a gyroscope to detect the attitude. The vibrator 18 vibrates a part or the whole of the mobile phone 1A. The vibrator 18 includes a piezoelectric element or an eccentric motor to generate vibration, for example. The vibration generated by the vibrator 18 is used not to transmit a sound but to inform the user of various types of events, such as an incoming call.

A part or all of the computer programs and the data stored in the storage 9 illustrated in FIG. 5 may be downloaded from other devices via wireless communications performed by the communication unit 6. Alternatively, a part or all of the computer programs and the data stored in the storage 9 illustrated in FIG. 5 may be stored in a non-transitory storage medium readable by the reading device included in the storage 9. Examples of the non-transitory storage medium include, but are not limited to, an optical disc, such as a compact disc (CD) (registered trademark), a digital versatile disc (DVD) (registered trademark), and Blu-ray (registered trademark), a magneto-optical disc, a magnetic storage medium, a memory card, and a solid-state storage medium.

The configuration of the mobile phone 1A illustrated in FIG. 5 is given by way of example, and various changes may be made as needed without departing from the spirit of the present invention. The mobile phone 1A may include buttons in the numeric keypad layout or the QWERTY layout as buttons used for an operation, for example.

Figure 7:
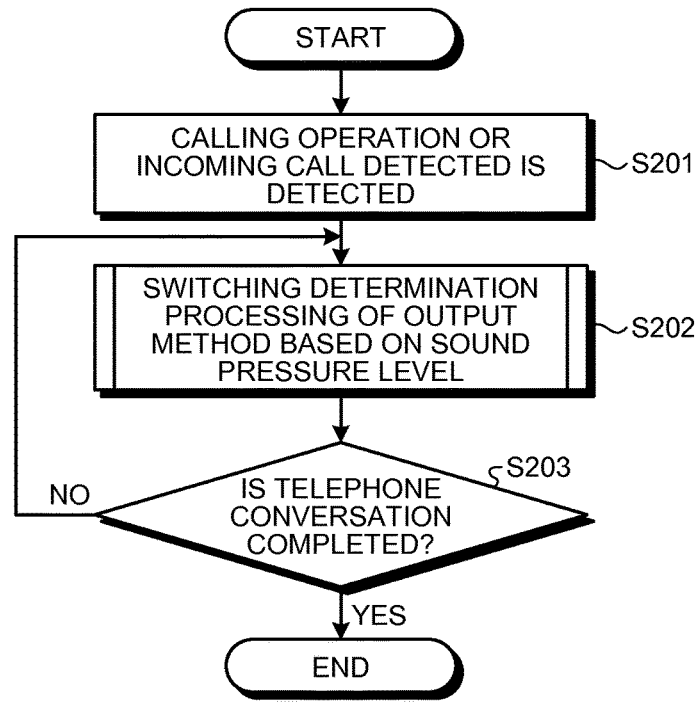
FIG. 7 is a flowchart of an exemplary process of switching determination processing of the output method based on a sound pressure level performed when a calling operation or an incoming call is detected in the mobile phone.
Figure 8:
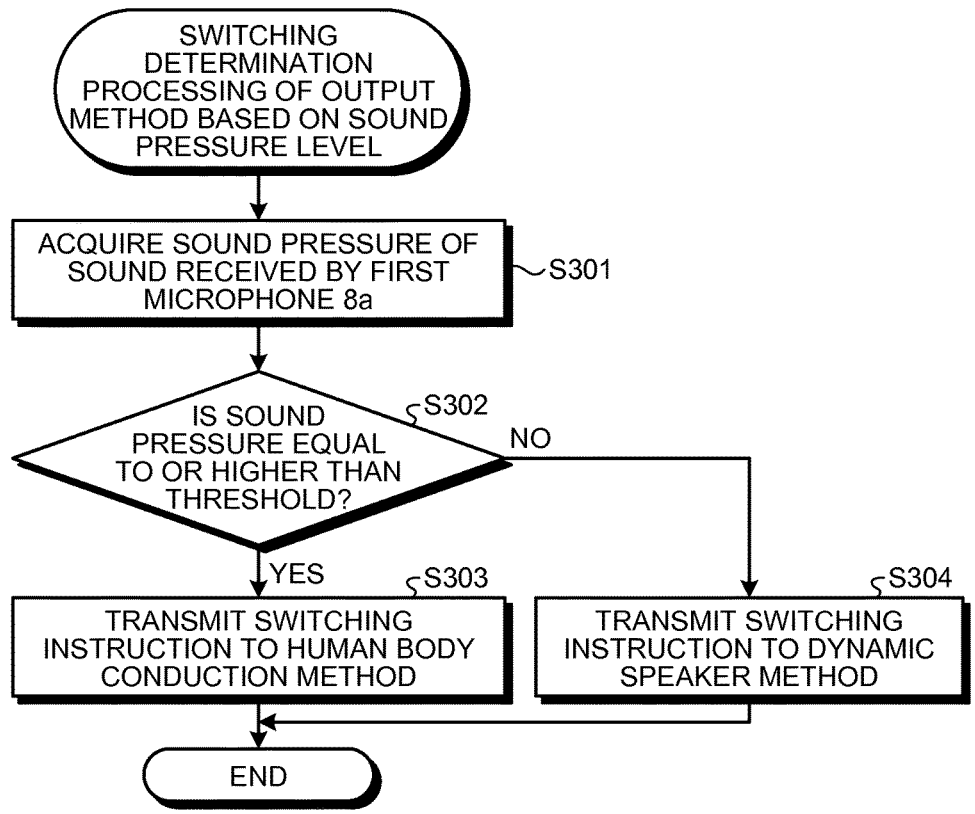
FIG. 8 is a flowchart of a detailed process of the switching determination processing of the output method based on the sound pressure level performed in the mobile phone.

The mobile phone 1A according to the first embodiment can output a sound from the speaker 11. The mobile phone 1A can also cause the piezoelectric element 7 to deform the panel 20, thereby generating an air conduction sound and a vibration sound transmitted via an object (e.g., a part of the human body) in contact with the panel 20 being deformed. The following describes the process performed by the mobile phone 1A according to the first embodiment with reference to FIG. 6 to FIG. 8. The process illustrated in FIG. 6 to FIG. 8 is performed by the controller 10 executing the control program 9A stored in the storage 9, for example.

Figure 6:
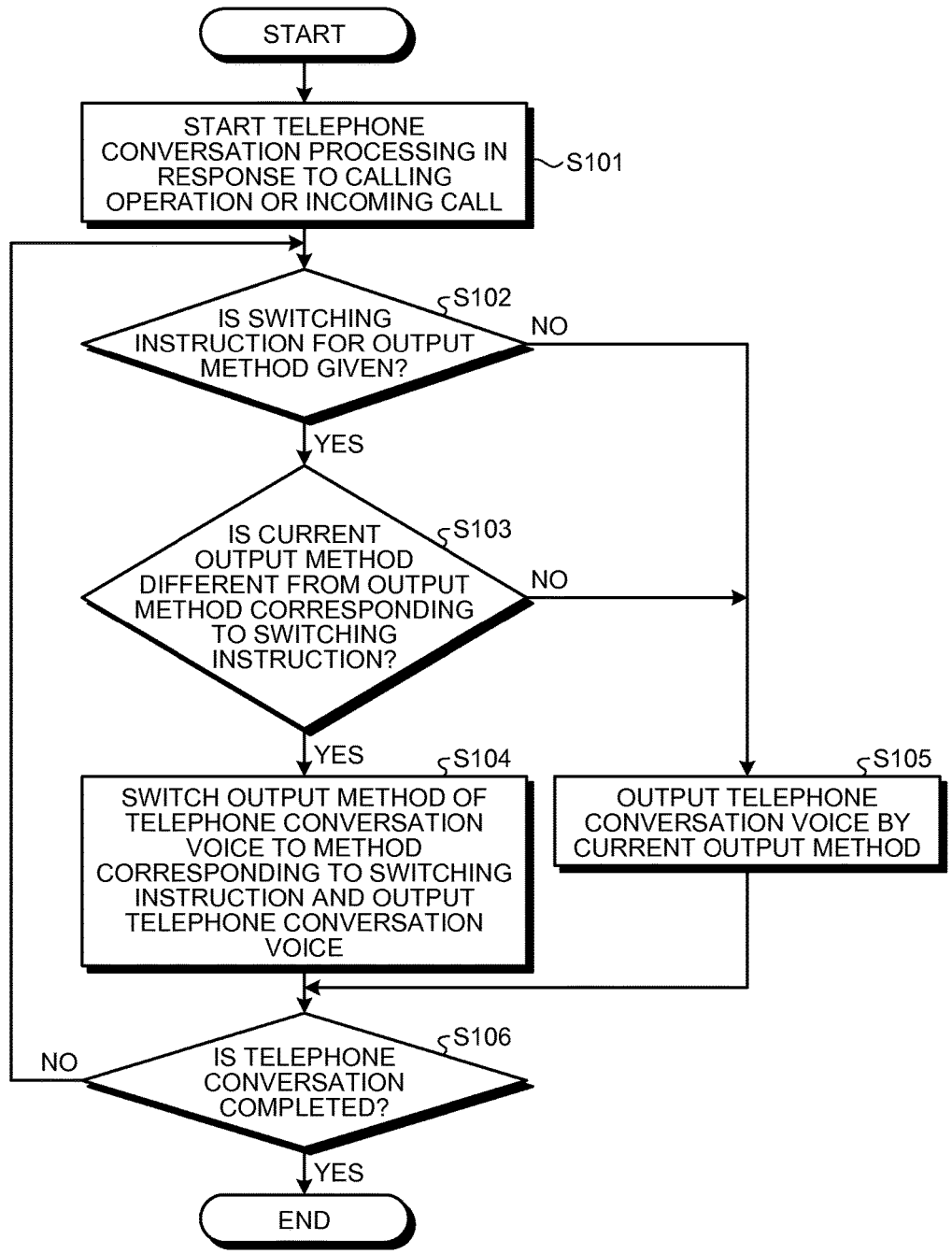
FIG. 6 is a flowchart of an exemplary process for switching the output method of a telephone conversation voice performed at the start of telephone conversation processing in the mobile phone.

FIG. 6 is a flowchart of an exemplary process for switching the output method of a telephone conversation voice performed at the start of telephone conversation processing carried out by the telephone conversation application 9B in the mobile phone 1A.

As illustrated in FIG. 6, the controller 10 starts telephone conversation processing in response to a calling operation using the buttons 3 or the like or an incoming call in the communication unit 6 at Step S101. Subsequently, the controller 10 determines, at Step S102, whether a switching instruction for the output method is given. The controller 10 reads the setting data 9Z stored in the storage 9, for example, thereby determining whether the setting data 9Z includes a switching instruction for the output method.

When it is determined that a switching instruction for the output method is given as a result of determination (Yes at Step S102), then at Step S103, the controller 10 reads the setting data 9Z in the storage 9 to determine whether the current output method included in the setting data 9Z is different from the output method corresponding to the switching instruction.

When it is determined that the current output method is different from the output method corresponding to the switching instruction as a result of determination (Yes at Step S103), then at Step S104, the controller 10 switches the output method of a telephone conversation voice to the method corresponding to the switching instruction and outputs the telephone conversation voice. The controller 10 updates the information on the output method in the setting data 9Z. By contrast, when it is determined that the current output method is not different from (is identical to) the output method corresponding to the switching instruction as a result of determination (No at Step S103), then at Step S105, the controller 10 outputs the telephone conversation voice by the current output method.

Subsequently, the controller 10 determines, at Step S106, whether completion of the telephone conversation is detected. The controller 10 determines whether an operation to terminate the telephone conversation is detected, for example, thereby detecting completion of the telephone conversation. When it is determined that completion of the telephone conversation is not detected as a result of determination (No at Step S106), the controller 10 is returned to Step S102 and continues the process illustrated in FIG. 6. By contrast, when it is determined that completion of the telephone conversation is detected as a result of determination (Yes at Step S106), the controller 10 terminates the process illustrated in FIG. 6.

When it is determined that no switching instruction for the output method is given as a result of determination at Step S102 (No at Step S102), the controller 10 proceeds to Step S105.

FIG. 7 is a flowchart of an exemplary process of switching determination processing of the output method based on the sound pressure level performed when a calling operation using the buttons 3 or the like or an incoming call in the communication unit 6 is detected in the mobile phone 1A.

As illustrated in FIG. 7, when a calling operation using the buttons 3 or the like or an incoming call in the communication unit 6 is detected at Step S201, then at Step S202, the controller 10 performs switching determination processing of the output method based on the sound pressure level. Subsequently, the controller 10 determines, at Step S203, whether completion of the telephone conversation is detected. When it is determined that completion of the telephone conversation is not detected as a result of determination (No at Step S203), the controller 10 is returned to Step S202 and continues the switching determination processing of the output method based on the sound pressure level. By contrast, when it is determined that completion of the telephone conversation is detected as a result of determination (Yes at Step S203), the controller 10 terminates the process illustrated in FIG. 7.

FIG. 8 is a flowchart of a detailed process of the switching determination processing of the output method based on the sound pressure level performed in the mobile phone 1A.

As illustrated in FIG. 8, the controller 10 acquires the sound pressure of a sound received by the first microphone 8a at Step S301. Subsequently, the controller 10 determines, at Step S302, whether the acquired sound pressure is equal to or higher than the threshold (whether the sound pressure is not lower than the threshold). The threshold is a desired value from 70 to 80 decibels, for example.

When it is determined that the acquired sound pressure is equal to or higher than the threshold (when the sound pressure is not lower than the threshold) as a result of determination (Yes at Step S302), then at Step S303, the controller 10 transmits a switching instruction to the human body conduction method to the storage 9 and is returned to Step S301. The storage 9 writes the switching instruction to the human body conduction method in the setting data 9Z. By contrast, when it is determined that the acquired sound pressure is not equal to or higher than the threshold (when the sound pressure is lower than the threshold) as a result of determination (No at Step S302), then at Step S304, the controller 10 transmits a switching instruction to the dynamic speaker method to the storage 9 and is returned to Step S301. The storage 9 writes the switching instruction to the dynamic speaker method in the setting data 9Z.

In the first embodiment, when the sound pressure (volume) of a sound generated around the mobile phone 1A, such as engine noise and tire noise of a car, BGM on the streets, voices of people, an announcement in a station yard, and rail noise caused by a train, is equal to or higher than the threshold, the mobile phone 1A outputs a telephone conversation voice by the human body conduction method. Thus, the first embodiment can transmit a voice of a communication partner clearly to the user in a telephone conversation by a simple way without performing complicated processing.

Second Embodiment

The first embodiment issues an instruction for switching the output method of the telephone conversation voice to the human body conduction method when the sound pressure of a sound generated around the mobile phone 1A is not lower than the threshold in the switching determination processing of the output method based on the sound pressure level. The sound pressure of the sound generated around the mobile phone 1A, however, may possibly fluctuate near the threshold, resulting in frequent switching of the output method. A second embodiment describes an example of control for returning, when a telephone conversation voice is transmitted to the user by the human body conduction method, the output method of the telephone conversation voice from the human body conduction method to the dynamic speaker method under the condition that a certain time has elapsed in a state where the sound pressure of a sound generated around a mobile phone 1A remains lower than the threshold.

A control program 9A stored in a storage 9 of the mobile phone 1A includes a function to switch, when a telephone conversation voice is transmitted to the user by the human body conduction method, the output method of the telephone conversation voice from the human body conduction method to the dynamic speaker method under the condition that the certain time has elapsed in the state where the sound pressure of a sound received by a first microphone 8a remains below the threshold.

A controller 10 of the mobile phone 1A executes the control program 9A, thereby performing processing for switching, when a telephone conversation voice is transmitted to the user by the human body conduction method, the output method of the telephone conversation voice from the human body conduction method to the dynamic speaker method under the condition that the certain time has elapsed in the state where the sound pressure of a sound received by the first microphone 8a remains below the threshold.

Figure 9:
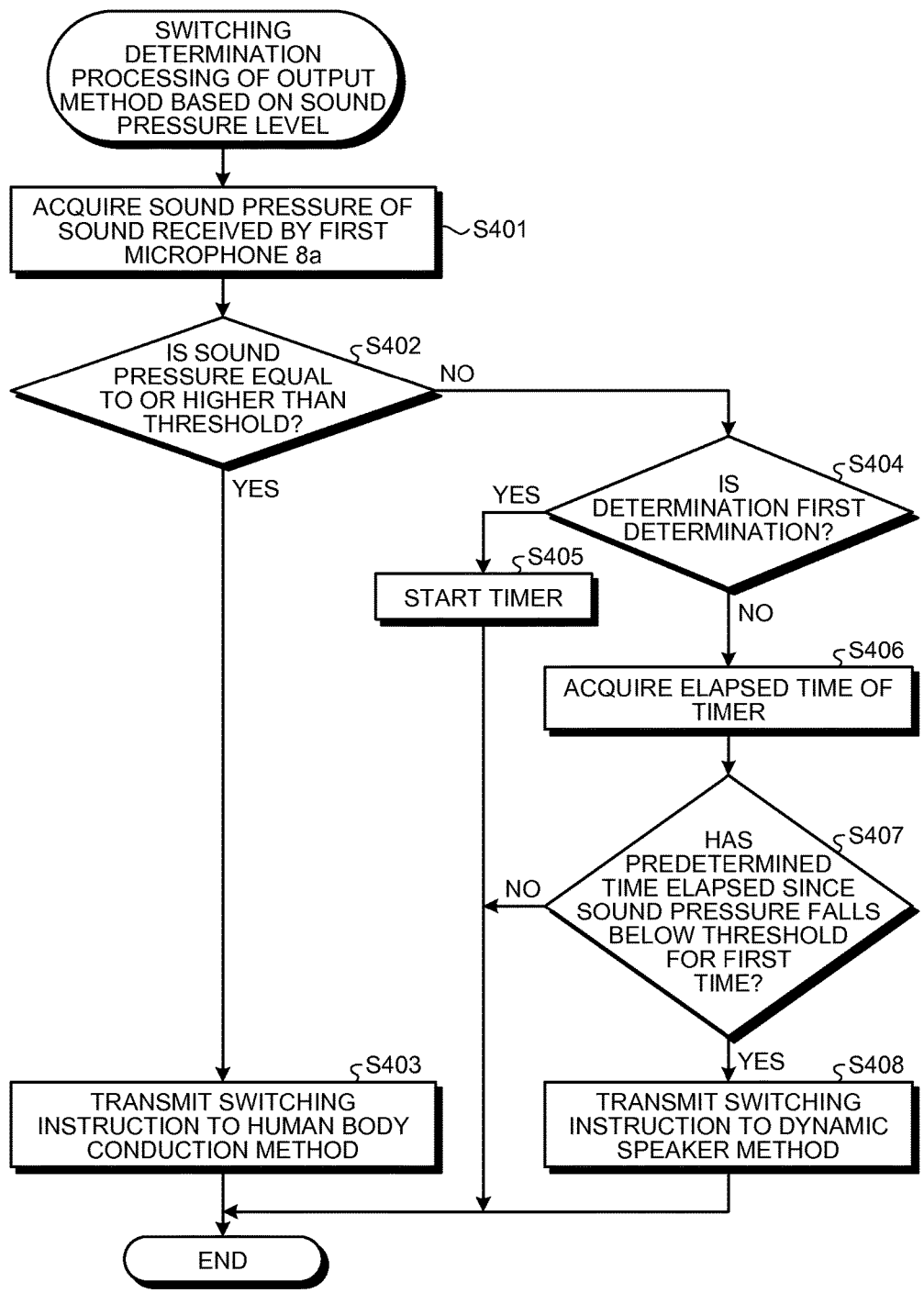
FIG. 9 is a flowchart of an exemplary process for returning, when the telephone conversation voice is output by a human body conduction method, the output method of the telephone conversation voice from the human body conduction method to a dynamic speaker method under the condition that a certain time has elapsed in a state where the sound pressure of the sound generated around the mobile phone remains below a threshold.

FIG. 9 is a flowchart of an exemplary process for returning, when a telephone conversation voice is output by the human body conduction method, the output method of the telephone conversation voice from the human body conduction method to the dynamic speaker method under the condition that the certain time has elapsed in the state where the sound pressure of the sound generated around the mobile phone 1A remains below the threshold. The process illustrated in FIG. 9 is performed by the controller 10 executing the control program 9A stored in the storage 9, for example.

As illustrated in FIG. 9, the controller 10 acquires the sound pressure of a sound received by the first microphone 8a at Step S401. Subsequently, the controller 10 determines, at Step S402, whether the sound pressure is equal to or higher than the threshold (whether the sound pressure is not lower than the threshold).

When it is determined that the sound pressure is equal to or higher than the threshold (when the sound pressure is not lower than the threshold) as a result of determination (Yes at Step S402), then at Step S403, the controller 10 transmits a switching instruction to the human body conduction method to the storage 9 and is returned to Step S401. By contrast, when it is determined that the sound pressure is not equal to or higher than the threshold (when the sound pressure is lower than the threshold) as a result of determination (No at Step S402), then at Step S404, the controller 10 determines whether the determination is the first determination of the fact that the sound pressure is not equal to or higher than the threshold (the sound pressure is lower than the threshold).

When it is determined that the determination is the first determination as a result of determination (Yes at Step S404), then at Step S405, the controller 10 starts a timer and is returned to Step S401. By contrast, when it is determined that the determination is not the first determination as a result of determination (when the determination is the second determination or a determination subsequent thereto) (No at Step S404), then at Step S406, the controller 10 acquires an elapsed time of the timer. Subsequently, the controller 10 determines, at Step S407, whether a predetermined time has elapsed since the sound pressure falls below the threshold for the first time based on the elapsed time of the timer.

When it is determined that the predetermined time has not elapsed since the sound pressure falls below the threshold for the first time as a result of determination (No at Step S407), the controller 10 is returned to Step S401. By contrast, when it is determined that the predetermined time has elapsed since the sound pressure falls below the threshold for the first time as a result of determination (Yes at Step S407), then at Step S408, the controller 10 transmits a switching instruction to the dynamic speaker method to the storage 9 and is returned to Step S401.

In the second embodiment, even when a sound generated around the mobile phone 1A falls below the threshold while the telephone conversation voice is output by the human body conduction method, the mobile phone 1A does not immediately issue a switching instruction to the dynamic speaker method. When the certain time has elapsed while the sound is remaining below the threshold, the mobile phone 1A issues a switching instruction to the dynamic speaker method. Thus, the second embodiment can prevent frequent switching of the output method.

Furthermore, the second embodiment can immediately switch the output method to the human body conduction method when the sound generated around the mobile phone 1A is equal to or higher than the threshold (when the sound pressure is not lower than the threshold), that is, when the surroundings are noisy, for example. Thus, the second embodiment can quickly respond to the situation of the surroundings so as to make the voice of the communication partner clear in the telephone conversation.

In the process illustrated in FIG. 9, the switching instruction from the human body conduction method to the dynamic speaker method is issued when the certain time has elapsed while the sound is remaining below the threshold. However, the embodiment is not limited thereto. The process may include setting of a first threshold used for switching from the human body conduction method to the dynamic speaker method and a second threshold used for switching from the dynamic speaker method to the human body conduction method, for example. This can also prevent frequent switching of the output method. By setting the first threshold to a value smaller than the second threshold and making the difference between the first threshold and the second threshold larger, for example, it is possible to prevent frequent switching of the output method.

Third Embodiment

While the explanation has been made of the switching determination processing of the output method based on the sound pressure level in the first embodiment and the second embodiment, switching determination of the output method may be made based on sound recognition. A third embodiment describes an example of control for switching between the switching determination of the output method based on the sound pressure level and the switching determination of the output method based on the sound recognition before and after the start of a telephone conversation.

Setting data 9Z stored in a storage 9 of a mobile phone 1A stores therein reference data for detecting a switching keyword to the human body conduction method and a switching keyword to the dynamic speaker method. The reference data is the amount of characteristics including the basic frequency (pitch) and the amplitude (volume) of a voice corresponding to the switching keyword to the human body conduction method and the switching keyword to the dynamic speaker method, for example. Examples of the switching keyword include, but are not limited to, "I'm having a trouble hearing your voice" and "I'd like you to speak louder".

A control program 9A stored in the storage 9 of the mobile phone 1A includes a function to perform switching determination processing of the output method based on the sound pressure level before the start of a telephone conversation and switching determination processing of the output method based on sound recognition after the start of the telephone conversation.

The control program 9A further includes a function to analyze a voice of the user as a function to perform the switching determination processing of the output method based on sound recognition. When a switching keyword to the human body conduction method is detected, the control program 9A issues a switching instruction to the human body conduction method. When a switching keyword to the dynamic speaker method is detected, the control program 9A issues a switching instruction to the dynamic speaker method.

A controller 10 of the mobile phone 1A executes the control program 9A, thereby performing the switching determination processing of the output method based on the sound pressure level before the start of a telephone conversation and the switching determination processing of the output method based on sound recognition after the start of the telephone conversation. In the switching determination processing of the output method based on sound recognition, the controller 10 issues a switching instruction to the human body conduction method when a switching keyword to the human body conduction method is detected from a voice of the user. By contrast, the controller 10 issues a switching instruction to the dynamic speaker method when a switching keyword to the dynamic speaker method is detected from a voice of the user.

Specifically, the controller 10 acquires a voice of the user received by a second microphone 8b at a sufficient sampling frequency to retrieve a switching keyword to the human body conduction method and a switching keyword to the dynamic speaker method. The controller 10 then uses the reference data included in the setting data 9Z to analyze the voice of the user. When a switching keyword to the human body conduction method is detected, the controller 10 issues a switching instruction to the human body conduction method. By contrast, when a switching keyword to the dynamic speaker method is detected, the controller 10 issues a switching instruction to the dynamic speaker method.

Figure 10:
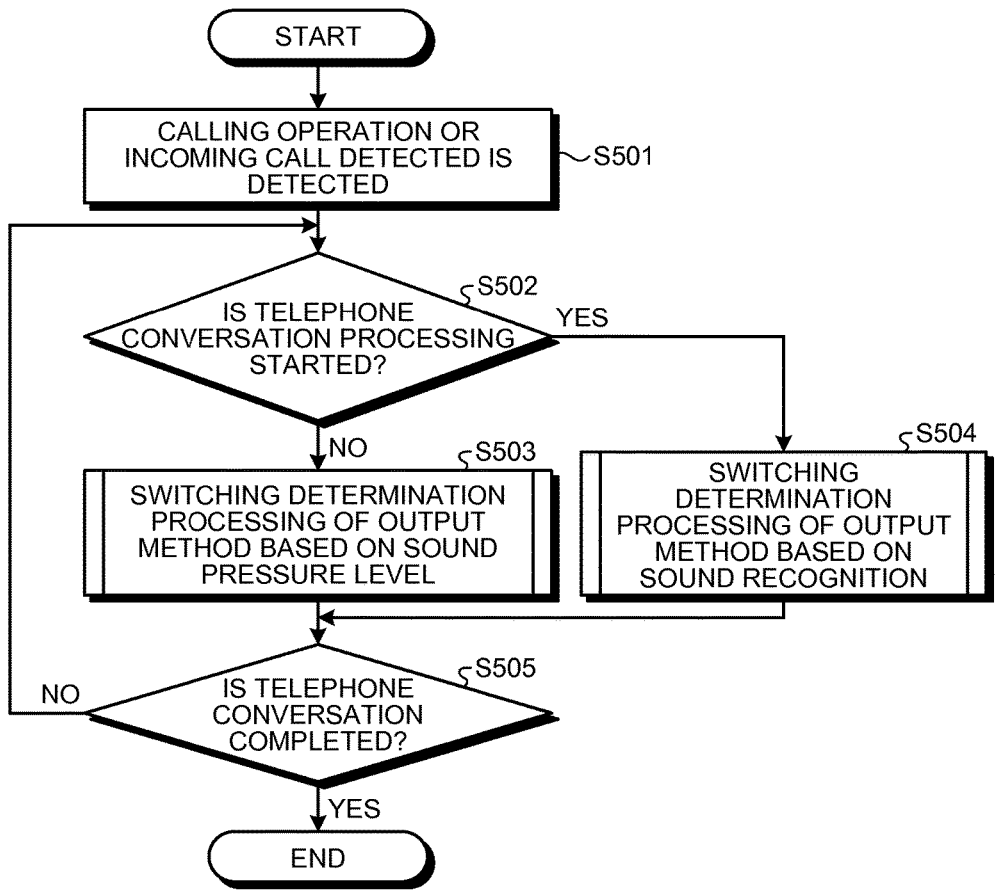
FIG. 10 is a flowchart of an exemplary process for switching between switching determination of the output method based on the sound pressure level and switching determination of the output method based on sound recognition before and after the start of a telephone conversation.

FIG. 10 is a flowchart of an exemplary process for switching between switching determination of the output method based on the sound pressure level and switching determination of the output method based on sound recognition before and after the start of a telephone conversation. The process illustrated in FIG. 10 is performed by the controller 10 executing the control program 9A stored in the storage 9, for example.

As illustrated in FIG. 10, when a calling operation using buttons 3 or the like or an incoming call in a communication unit 6 is detected at Step S501, then at Step S502, the controller 10 determines whether telephone conversation processing is started. When a calling operation is performed, for example, the controller 10 detects a response to the call request corresponding to the calling operation from the communication partner, thereby determining that telephone conversation processing is started. When an incoming call is made, for example, the controller 10 detects an operation to receive the incoming call using the buttons 3 or the like, thereby determining that telephone conversation processing is started.

When it is determined that telephone conversation processing is not started as a result of determination (No at Step S502), then at Step S503, the controller 10 performs the switching determination processing of the output method based on the sound pressure level. In other words, the switching determination processing of the output method based on the sound pressure level is performed at Step S503, thereby determining the output method of a telephone conversation voice at the start of the telephone conversation.

By contrast, when it is determined that telephone conversation processing is started as a result of determination (Yes at Step S502), then at Step S504, the controller 10 performs the switching determination processing of the output method based on sound recognition.

Subsequently, the controller 10 determines, at Step S505, whether completion of the telephone conversation is detected. When it is determined that completion of the telephone conversation is not detected (No at Step S505), the controller 10 is returned to Step S502. By contrast, when it is determined that completion of the telephone conversation is detected (Yes at Step S505), the controller 10 terminates the process illustrated in FIG. 10.

Figure 11:
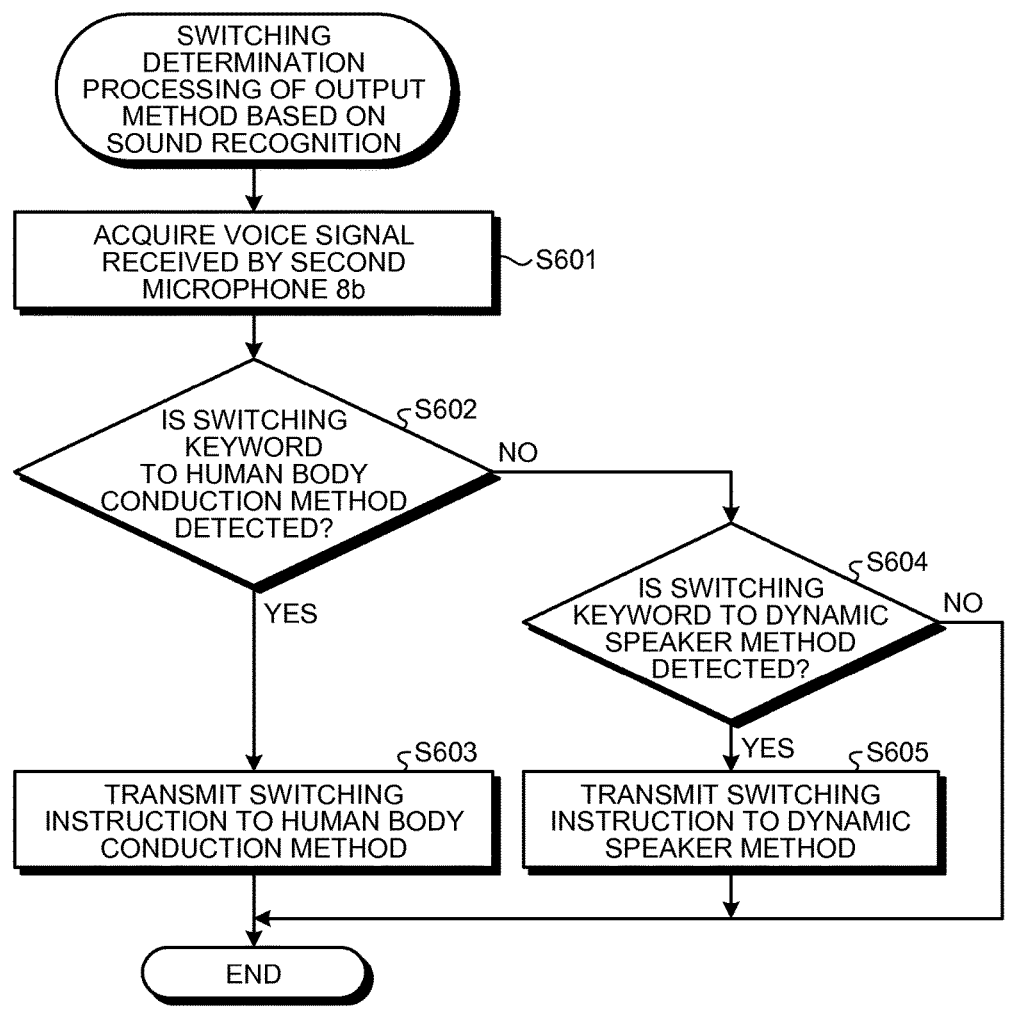
FIG. 11 is a flowchart of an exemplary process of the switching determination processing of the output method based on sound recognition.

FIG. 11 is a flowchart of an exemplary process of the switching determination processing of the output method based on sound recognition. The process illustrated in FIG. 11 is performed by the controller 10 executing the control program 9A stored in the storage 9, for example.

As illustrated in FIG. 11, the controller 10 acquires a voice signal (a voice of the user) received by the second microphone 8b at Step S601. Subsequently, the controller 10 analyzes the acquired voice signal and determines, at Step S602, whether a switching keyword to the human body conduction method is detected.

When it is determined that a switching keyword to the human body conduction method is detected as a result of determination (Yes at Step S602), then at Step S603, the controller 10 transmits a switching instruction to the human body conduction method and is returned to Step S601. By contrast, when it is determined that no switching keyword to the human body conduction method is detected as a result of determination (No at Step S602), then at Step S604, the controller 10 determines whether a switching keyword to the dynamic speaker method is detected.

When it is determined that a switching keyword to the dynamic speaker method is detected as a result of determination (Yes at Step S604), then at Step S605, the controller 10 transmits a switching instruction to the dynamic speaker method and is returned to Step S601. By contrast, when it is determined that no switching keyword to the dynamic speaker method is detected as a result of determination (No at Step S604), the controller 10 is directly returned to Step S601.

In the process illustrated in FIG. 11, the mobile phone 1A switches from the switching determination of the output method based on the sound pressure level to the switching determination of the output method based on sound recognition after the start of the telephone conversation. This enables switching of the output method giving priority to the intention of the user in the telephone conversation.

In the process illustrated in FIG. 11, the mobile phone 1A analyzes a voice of the user and detects a switching keyword to the human body conduction method or a switching keyword to the dynamic speaker method, thereby switching the output method. However, the embodiment is not limited thereto. The mobile phone 1A may perform switching to the human body conduction method when the mobile phone 1A finds itself under the environment suitable for the human body conduction method based on an analysis on the sound around the mobile phone 1A, for example.

The setting data 9Z stores therein reference data for detecting the environment where the human body conduction method is suitably used to transmit the telephone conversation voice to the user. The reference data is the amount of characteristics including the basic frequency (pitch) and the amplitude (volume) of engine noise of a car collected in the car and rail noise caused by a train collected in the train, for example.

The control program 9A includes a function to perform switching to the human body conduction method when the mobile phone 1A is determined to be under the environment where the human body conduction method is suitably used to transmit the telephone conversation voice to the user based on an analysis on the sound around the mobile phone 1A as a function to perform the switching determination processing of the output method based on sound recognition.

The controller 10 executes the control program 9A, thereby analyzing the sound around the mobile phone 1A. When it is determined that the mobile phone 1A is under the environment where the human body conduction method is suitably used to transmit the telephone conversation voice to the user, the controller 10 performs switching to the human body conduction method.

Specifically, the controller 10 acquires the sound around the mobile phone 1A received by a first microphone 8a. When it is determined that the user is in a car or on a train as a result of an analysis on the sound around the mobile phone 1A using the reference data included in the setting data 9Z, the controller 10 determines that the mobile phone 1A is under the environment where the human body conduction method is suitably used to transmit the telephone conversation voice to the user. The controller 10 then issues a switching instruction to the human body conduction method.

Figure 12:
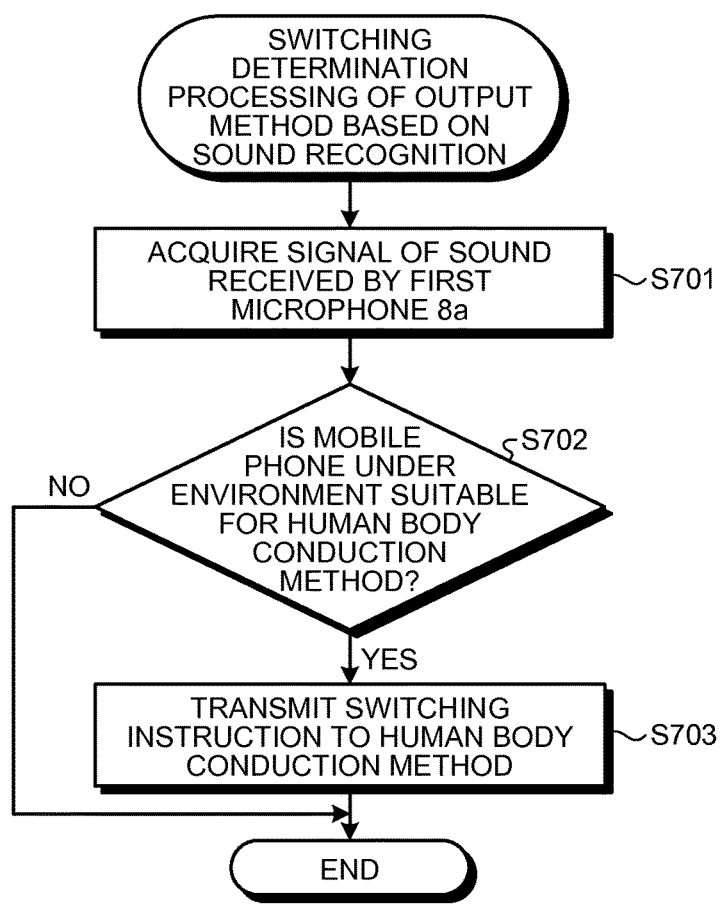
FIG. 12 is a flowchart of another exemplary process of the switching determination processing of the output method based on sound recognition.

FIG. 12 is a flowchart of another exemplary process of the switching determination processing of the output method based on sound recognition. The process illustrated in FIG. 12 is performed by the controller 10 executing the control program 9A stored in the storage 9, for example.

As illustrated in FIG. 12, the controller 10 acquires a sound signal (a sound around the mobile phone 1A) received by the first microphone 8a at Step S701. Subsequently, the controller 10 analyzes the sound signal received by the first microphone 8a and determines, at Step S702, whether the mobile phone 1A is under the environment suitable for the human body conduction method.

When it is determined that the mobile phone 1A is under the environment suitable for the human body conduction method as a result of determination (Yes at Step S702), then at Step S703, the controller 10 transmits a switching instruction to the human body conduction method and is returned to Step S701. By contrast, when it is determined that the mobile phone 1A is not under the environment suitable for the human body conduction method as a result of determination (No at Step S702), the controller 10 is directly returned to Step S701.

In the process of the switching determination of the output method based on sound recognition illustrated in FIG. 12, when it is determined that the user is in a car or on a train, for example, the mobile phone 1A determines that the mobile phone 1A is under the environment where the human body conduction method is suitably used to transmit the telephone conversation voice to the user. The mobile phone 1A then issues a switching instruction to the human body conduction method. Thus, the mobile phone 1A can transmit the voice of the communication partner clearly to the user in the telephone conversation without making the user conscious of the switching. In addition, the mobile phone 1A can prevent leakage of the telephone conversation voice to the surroundings.

Fourth Embodiment

While the explanation has been made of the switching determination processing of the output method based on the sound pressure level in the first embodiment, switching determination of the output method may be made based on the position of the mobile phone 1A. A fourth embodiment describes switching determination processing of the output method based on positional information.

A communication unit 6 of a mobile phone 1A receives radio signals in a predetermined frequency band from global positioning system (GPS) satellites, for example. The communication unit 6 performs demodulation processing on the received radio signals and transmits the signals subjected to the demodulation processing to a controller 10. The mobile phone 1A may include a communication unit for receiving the radio signals in the predetermined frequency band from the GPS satellites separately from the communication unit 6.

Setting data 9Z stored in a storage 9 of the mobile phone 1A includes output method information in which a plurality of areas specified by latitude and longitude are each associated with whether the area is a place where the human body conduction method is suitably used to transmit a telephone communication voice to the user, for example. The place where the human body conduction method is suitably used is a station or a stadium, for example.

A control program 9A stored in the storage 9 includes a function to perform position measurement processing based on the radio signals from the GPS satellites. The control program 9A further includes a function to perform switching determination processing of the output method based on the positional information.

The controller 10 of the mobile phone 1A executes the control program 9A, thereby performing the switching determination processing of the output method based on the positional information. The controller 10 performs the position measurement processing based on the signals received from the communication unit 6, for example. The controller 10 refers to the output method information included in the setting data 9Z. When the area corresponding to the measured position (latitude and longitude) is a place where the human body conduction method is suitably used to transmit the telephone communication voice to the user, the controller 10 issues a switching instruction to the human body conduction method.

Figure 13:
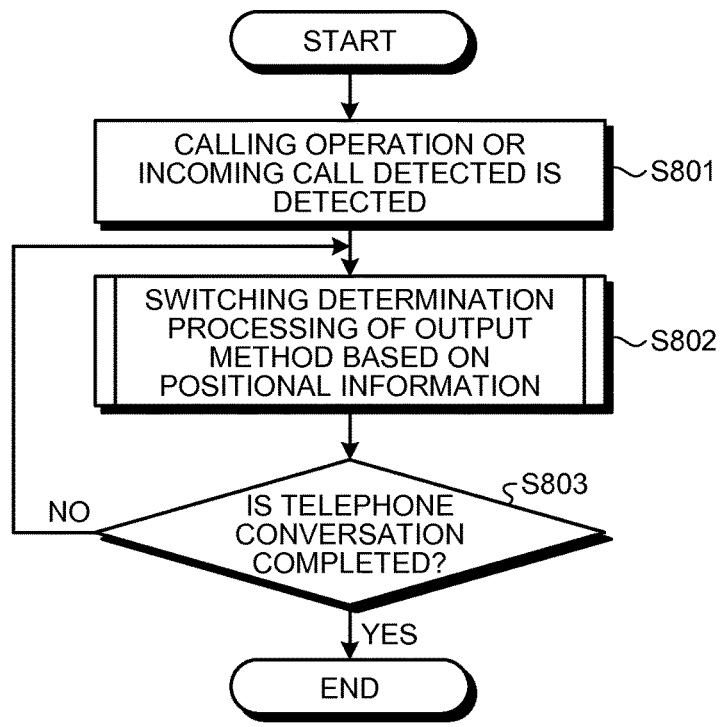
FIG. 13 is a flowchart of an exemplary process of the switching determination processing of the output method based on positional information performed when a calling operation or an incoming call is detected in the mobile phone.

FIG. 13 is a flowchart of an exemplary process of the switching determination processing of the output method based on the positional information performed when a calling operation using buttons 3 or the like or an incoming call in the communication unit 6 is detected in the mobile phone 1A.

As illustrated in FIG. 13, when a calling operation using the buttons 3 or the like or an incoming call in the communication unit 6 is detected at Step S801, then at Step S802, the controller 10 performs the switching determination processing of the output method based on the positional information. Subsequently, the controller 10 determines, at Step S803, whether completion of the telephone conversation is detected. When it is determined that completion of the telephone conversation is not detected as a result of determination (No at Step S803), the controller 10 is returned to Step S802 and continues the switching determination processing of the output method based on the positional information. By contrast, when it is determined that completion of the telephone conversation is detected as a result of determination (Yes at Step S803), the controller 10 terminates the process illustrated in FIG. 13.

Figure 14:
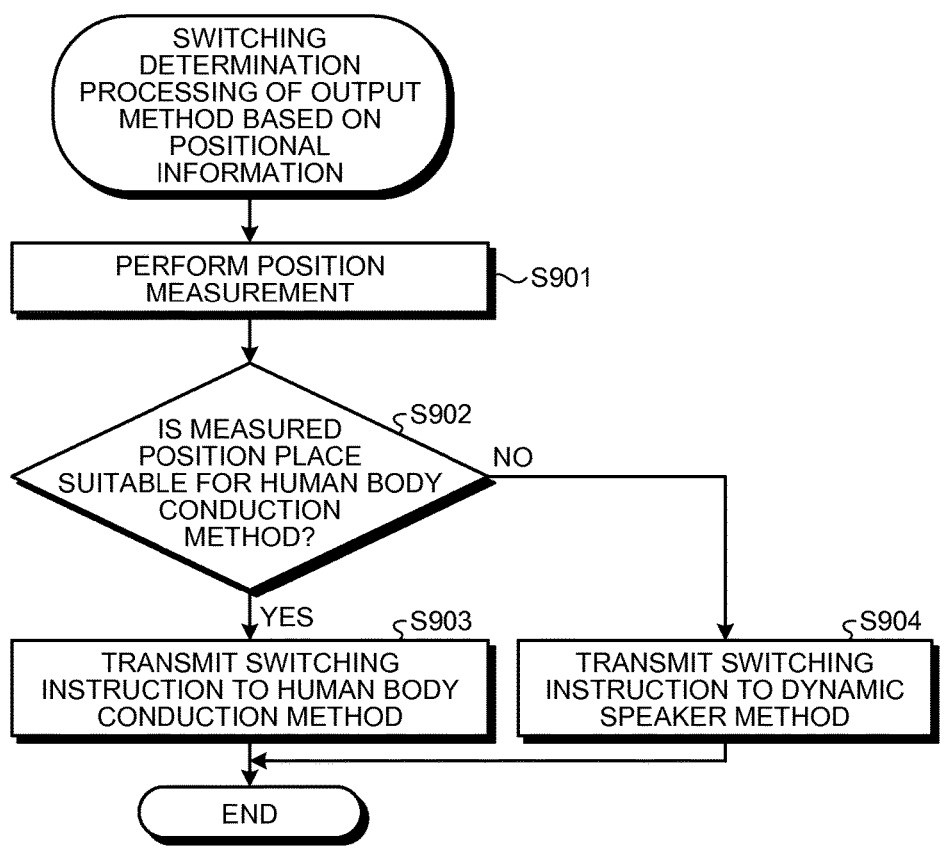
FIG. 14 is a flowchart of a detailed process of the switching determination processing of the output method based on the positional information performed in the mobile phone.

FIG. 14 is a flowchart of a detailed process of the switching determination processing of the output method based on the positional information performed in the mobile phone 1A.

As illustrated in FIG. 14, the controller 10 performs position measurement at Step S901. Subsequently, the controller 10 refers to the output method information included in the setting data 9Z and determines, at Step S902, whether the measured position is a place where the human body conduction method is suitably used to transmit the telephone communication voice to the user.

When it is determined that the measured position is a place where the human body conduction method is suitably used as a result of determination (Yes at Step S902), then at Step S903, the controller 10 transmits a switching instruction to the human body conduction method to the storage 9 and is returned to Step S901. The storage 9 writes the switching instruction to the human body conduction method in the setting data 9Z. By contrast, when it is determined that the measured position is not a place where the human body conduction method is suitably used as a result of determination (No at Step S902), then at Step S904, the controller 10 transmits a switching instruction to the dynamic speaker method to the storage 9 and is returned to Step S901. The storage 9 writes the switching instruction to the dynamic speaker method in the setting data 9Z.

The fourth embodiment switches the output method of the telephone conversation voice depending on the position of the mobile phone 1A. Thus, the fourth embodiment can transmit the voice of the communication partner clearly to the user in the telephone conversation by a simple way.

The explanations have been made of the examples of processing for transmitting the voice of the communication partner (telephone conversation voice) clearly to the user in the telephone conversation in the embodiments above. The present disclosure is also applicable to clear transmission of music contents (music) reproduced by the music reproduction application 9C. The sound output by the human body conduction method or the dynamic speaker method may be a voice used for a navigation function, for example.

Fifth Embodiment

Figure 15:
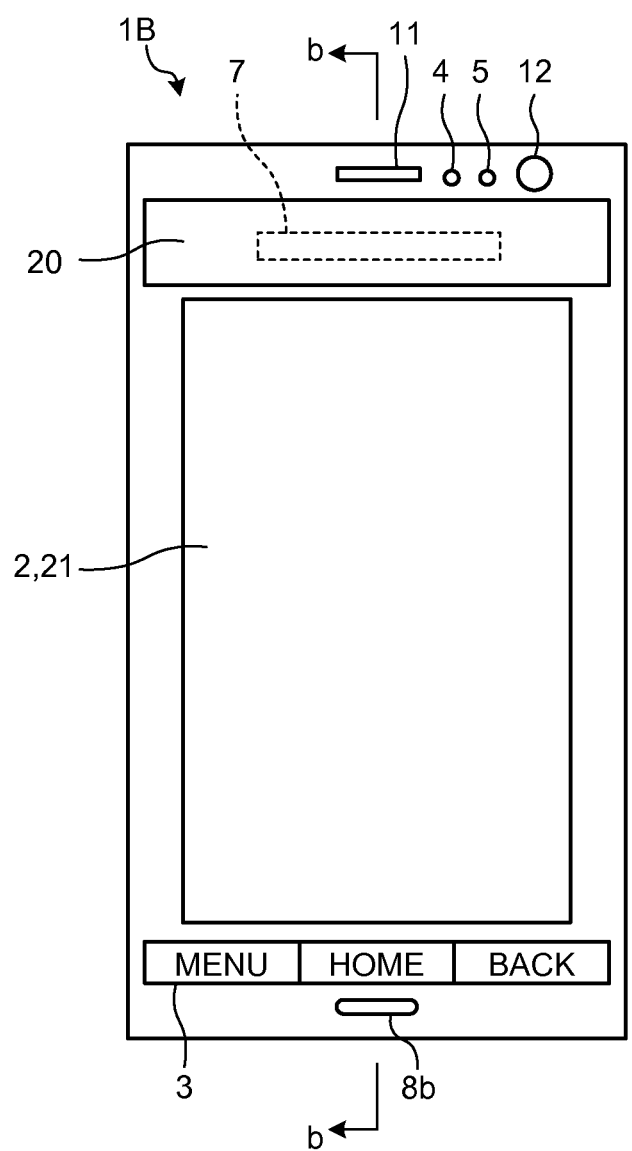
FIG. 15 is a front view of a mobile phone according to a fifth embodiment.
Figure 16:
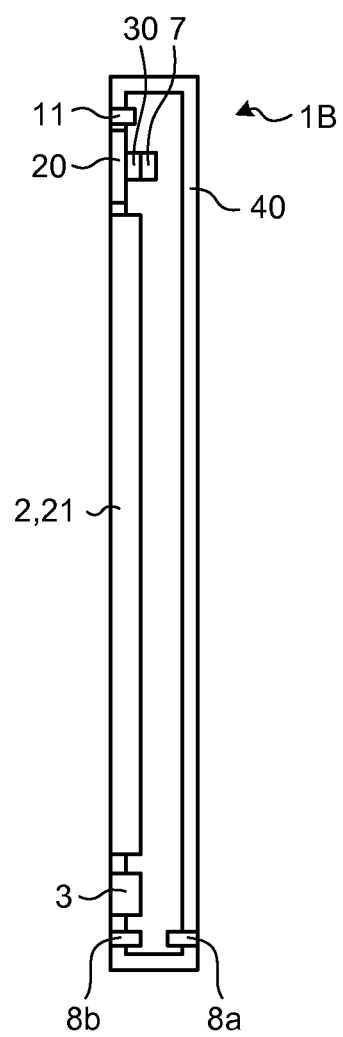
FIG. 16 is a sectional view of the mobile phone along line b-b in FIG. 15.

While the touch screen 21 is arranged on substantially the entire surface of the panel 20 in the embodiments above, the touch screen 21 may be arranged in a manner not overlapping with the panel 20. FIG. 15 is a front view of a mobile phone according to a fifth embodiment. FIG. 16 is a sectional view of the mobile phone along line b-b in FIG. 15. The following describes a mobile phone 1B in which a touch screen 21 is arranged in a manner not overlapping with a panel 20 with reference to FIG. 15 and FIG. 16.

In the mobile phone 1B, a display 2 is arranged side by side with the panel 20 not on the inner-side surface of the panel 20 but on the same plane as that of the panel 20 as illustrated in FIG. 15 and FIG. 16. The touch screen 21 is arranged in a manner covering substantially the entire front surface of the display 2. In other words, the touch screen 21 and the display 2 constitute what is called a touch panel (a touch screen display).

A piezoelectric element 7 is attached to substantially the center of the back surface of the panel 20 with a joining member 30. When an electrical signal is applied to the piezoelectric element 7, the panel 20 vibrates in association with deformation (expansion and contraction or bending) of the piezoelectric element 7. Thus, the panel 20 generates an air conduction sound and a vibration sound transmitted via a part of the human body (e.g., the auricular cartilage) in contact with the panel 20. Arrangement of the piezoelectric element 7 at the center of the panel 20 enables the vibration of the piezoelectric element 7 to be uniformly transmitted to the entire panel 20. This improves the quality of the sound transmitted to the user.

The touch screen 21 is not arranged on the front surface of the panel 20. The panel 20 is arranged near the display 2 provided with the touch screen 21.

In the case of the mobile phone 1B where the panel 20 is arranged in a manner not overlapping with the touch screen 21, a speaker 11 serving as a dynamic speaker is provided above the piezoelectric element 7 on the same side where the piezoelectric element 7 is arranged in a housing 40, thereby outputting a voice in the two modes similarly to the embodiments above. Thus, the mobile phone 1B can output the voice in a manner suitable for the user.

Sixth Embodiment

Figure 17:
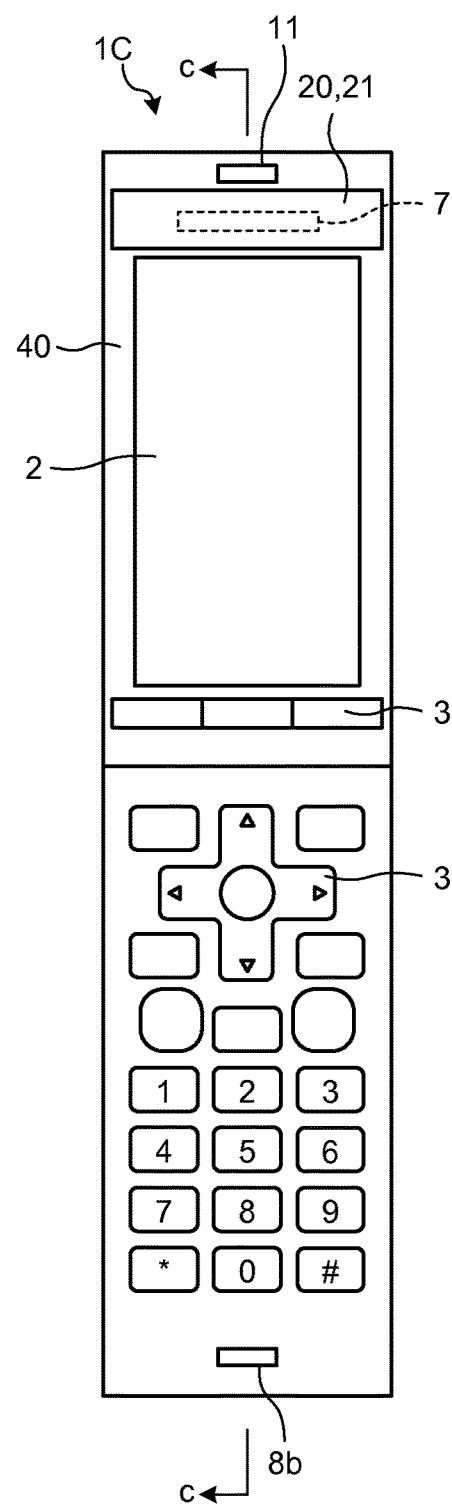
FIG. 17 is a front view of a mobile phone according to a sixth embodiment.
Figure 18:
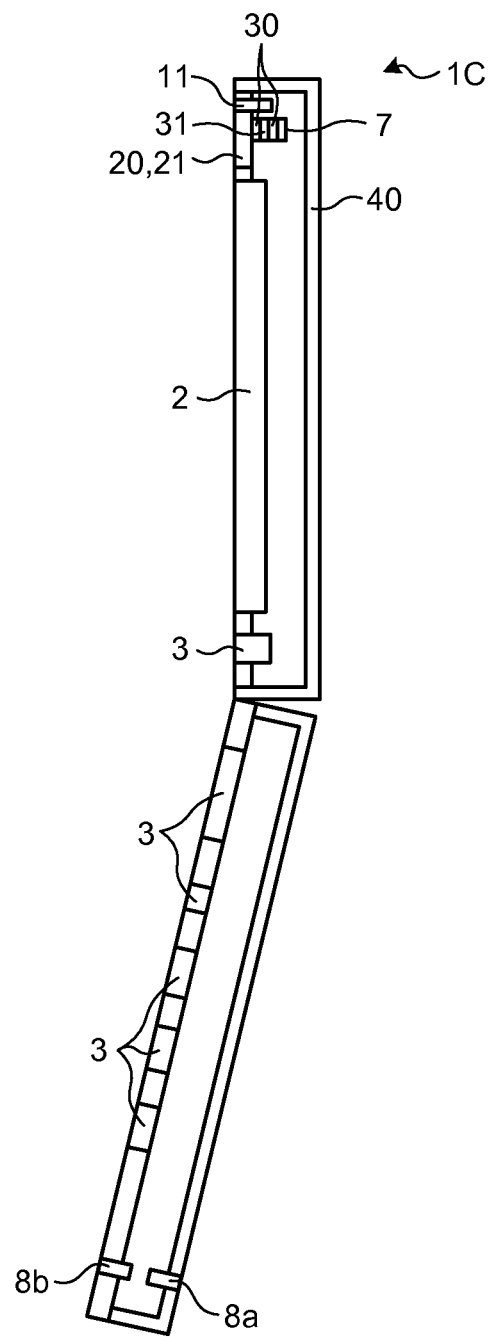
FIG. 18 is a sectional view of the mobile phone along line c-c in FIG. 17.

While the touch screen 21 is arranged with at least a part thereof overlapping with the display 2 in the embodiments above, the touch screen 21 may be arranged in a manner not overlapping with the display 2. FIG. 17 is a front view of a mobile phone according to a sixth embodiment. FIG. 18 is a sectional view of the mobile phone along line c-c in FIG. 17. The following describes a mobile phone 1C in which a touch screen 21 is arranged in a manner not overlapping with a display 2 with reference to FIG. 17 and FIG. 18. The mobile phone 1C illustrated in FIG. 17 and FIG. 18 is an example of what is called a folding mobile phone.

In the mobile phone 1C, the display 2 is arranged side by side with a panel 20 not on the inner-side surface of the panel 20 but on the same plane as that of the panel 20 as illustrated in FIG. 17 and FIG. 18.

A piezoelectric element 7 is attached to substantially the center of the back surface of the panel 20 with a joining member 30. A reinforcing member 31 is arranged between the panel 20 and the piezoelectric element 7. The reinforcing member 31 is a resin plate, sheet metal, or a plate including glass fibers, for example. In other words, the piezoelectric element 7 and the reinforcing member 31 are bonded by the joining member 30 in the mobile phone 1C, and the reinforcing member 31 and the panel 20 are bonded by the joining member 30. The piezoelectric element 7 is not necessarily arranged at the center of the panel 20.

The reinforcing member 31 is an elastic member made of rubber or silicon, for example. The reinforcing member 31 may be a metal plate made of aluminum or the like having a certain degree of elasticity, for example. The reinforcing member 31 may be a stainless plate of SUS304 or the like, for example. The thickness of the metal plate, such as a stainless plate, appropriately varies from 0.2 mm to 0.8 mm depending on the value of the voltage applied to the piezoelectric element 7, for example. The reinforcing member 31 may be a resin plate, for example. Examples of the resin forming the resin plate include, but are not limited to, polyamide resin. Examples of the polyamide resin include, but are not limited to, Reny (registered trademark) made of crystalline thermoplastic resin composed of m-xylylenediamine and adipic acid and having sufficient strength and elasticity. Such polyamide resin may be reinforced resin reinforced with glass fibers, metal fibers, or carbon fibers using itself as a base polymer, for example. The strength and the elasticity of the reinforced resin are appropriately adjusted depending on the amount of glass fibers, metal fibers, or carbon fibers added to the polyamide resin, for example. The reinforced resin is formed by impregnating resin into a base material made of knitted glass fibers, metal fibers, or carbon fibers and then curing the resin, for example. Alternatively, the reinforced resin may be formed by mixing finely cut fiber pieces into liquid resin and then curing the resin. Still alternatively, the reinforced resin may be formed by laminating a base material made of knitted fibers and a resin layer.

Arrangement of the reinforcing member 31 between the piezoelectric element 7 and the panel 20 provides the following advantageous effects. When external force is applied to the panel 20, the reinforcing member 31 can reduce the possibility of the external force being transmitted to the piezoelectric element 7 and damaging it. When the mobile phone 1C is dropped to the ground and external force is applied to the panel 20, the external force is transmitted to the reinforcing member 31 first. Because the reinforcing member 31 has a predetermined degree of elasticity, the reinforcing member 31 is elastically deformed by the external force transmitted from the panel 20. Thus, the reinforcing member 31 absorbs at least a part of the external force applied to the panel 20, thereby reducing the external force transmitted to the piezoelectric element 7. This can reduce the possibility of the piezoelectric element 7 being damaged. If the reinforcing member 31 is arranged between the piezoelectric element 7 and the housing 40, the reinforcing member 31 can reduce the possibility of the deformed housing 40 bumping into the piezoelectric element 7 and damaging it when the mobile phone 1C is dropped to the ground and a housing 40 is deformed.

The vibration caused by expansion and contraction or bending of the piezoelectric element 7 is transmitted to the reinforcing member 31 first and then to the panel 20. In other words, the piezoelectric element 7 vibrates the reinforcing member 31 having a larger elastic coefficient than that of the piezoelectric element 7 first and then vibrates the panel 20. Thus, the mobile phone 1C can suppress excessive deformation of the piezoelectric element 7 compared with a structure in which the piezoelectric element 7 is joined to the panel 20 by the joining member 30 without the reinforcing member 31. This makes it possible to adjust the amount of deformation (the degree of deformation) of the panel 20. This structure is effectively used particularly when the panel 20 has difficulty in preventing deformation of the piezoelectric element 7.

Figure 19:
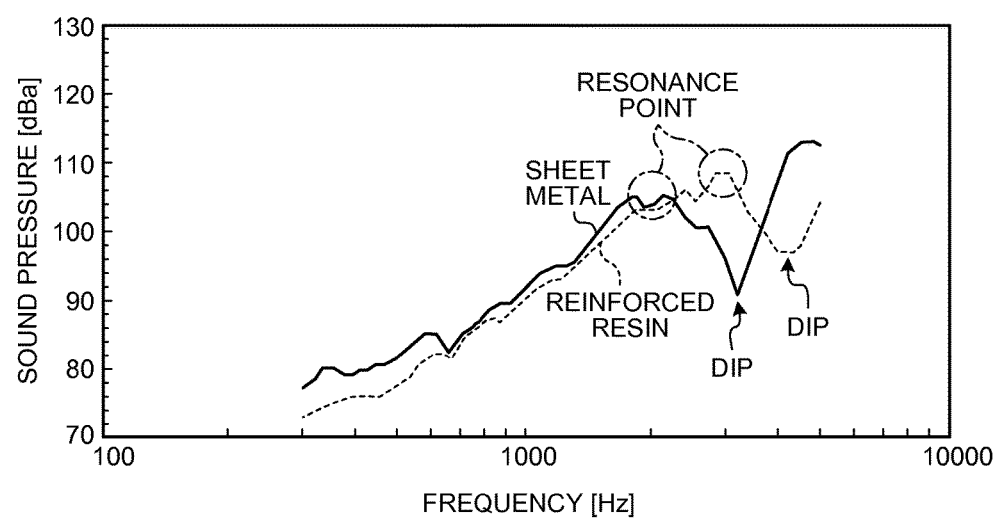
FIG. 19 is a diagram of an example of a change in frequency characteristics caused by a reinforcing member.

Furthermore, the reinforcing member 31 arranged between the piezoelectric element 7 and the panel 20 lowers the resonance frequency of the panel 20, thereby increasing the acoustic characteristics at a low frequency band as illustrated in FIG. 19. FIG. 19 is a diagram of an example of a change in the frequency characteristics caused by the reinforcing member 31. FIG. 19 illustrates the frequency characteristics obtained when sheet metal, such as SUS304, is used as the reinforcing member 31 and the frequency characteristics obtained when reinforced resin, such as Reny, is used as the reinforcing member 31. The abscissa represents the frequency, whereas the ordinate represents the sound pressure. The resonance point in the case of the reinforced resin is approximately 2 kHz, whereas the resonance point in the case of the sheet metal is approximately 1 kHz. The dip in the case of the reinforced resin is approximately 4 kHz, whereas the dip in the case of the sheet metal is approximately 3 kHz. In other words, when the reinforced resin is used, the resonance point of the panel 20 is positioned in a higher frequency domain, and the dip of the frequency characteristics is positioned in a higher frequency domain than those in the case where the sheet metal is used. The frequency band used for a voice call of a mobile phone falls within a range from 300 Hz to 3.4 kHz. Thus, the use of the reinforced resin as the reinforcing member 31 can prevent the dip from being included in the frequency band used by the mobile phone 1C. Even when the sheet metal is used as the reinforcing member 31, it is possible to prevent the dip from being included in the frequency band used by the mobile phone 1C by appropriately adjusting the types or the composition of the metals constituting the sheet metal or the thickness of the sheet metal, for example. In comparison between the sheet metal and the reinforced resin, the reinforced resin can reduce an influence on the antenna performance compared with the sheet metal. Because the reinforced resin is hardly plastically deformed compared with the sheet metal, the reinforced resin has an advantageous effect of making the acoustic characteristics less likely to change. The reinforced resin can suppress a rise in temperature occurring when a sound is generated compared with the sheet metal. Instead of the reinforcing member 31, a plate-like weight may be attached to the piezoelectric element 7 with the joining member 30.

When an electrical signal is applied to the piezoelectric element 7, the panel 20 vibrates in association with deformation (expansion and contraction or bending) of the piezoelectric element 7. Thus, the panel 20 generates an air conduction sound and a vibration sound transmitted via a part of the human body (e.g., the auricular cartilage) in contact with the panel 20. The touch screen 21 is arranged in a manner covering substantially the entire front surface of the panel 20.

Similarly to the embodiments above, the mobile phone 1C also includes a speaker 11, which is a dynamic speaker, above the piezoelectric element 7 on the same side at which the piezoelectric element 7 is arranged in the housing 40. A first microphone 8a is arranged at the back surface of the housing 40 on a side (end) opposite to the side where the piezoelectric element 7 is provided. A second microphone 8b is arranged on the side (end) of the housing 40 opposite to the side where the piezoelectric element 7 is provided.

In the embodiments above, the conditions for switching the method for outputting a sound are the ambient sound received by the first microphone 8a and the positional information acquired by the communication unit 6. The conditions may be a contact detected by the touch screen 21 or a result of detection performed by an attitude detection unit.

In the embodiments above, the panel 20 is deformed by the piezoelectric element 7, thereby generating an air conduction sound and a vibration sound. Alternatively, a part of the housing 40 may be deformed by the piezoelectric element 7, thereby generating an air conduction sound and a vibration sound. The part of the housing 40 may be a corner of the housing, for example. While the dynamic speaker serves as the second sound generating unit in the embodiments above, the second sound generating unit may be the panel 20 and a second piezoelectric element attached to the panel and different from the piezoelectric element 7. In this case, the second piezoelectric element may be arranged at an end opposite to the end where the piezoelectric element 7 is provided in the longitudinal direction of the panel 20.

In the embodiments above, the display 2 is attached to the back surface of the panel 20 with the joining member 30 in the mobile phone 1A. The mobile phone 1A may have a space between the panel 20 and the display 2. The space formed between the panel 20 and the display 2 facilitates vibration of the panel 20, thereby increasing the range in which the vibration sound is easy to hear on the panel 20.

While the piezoelectric element 7 is attached to the panel 20 in the embodiments above, the piezoelectric element 7 may be attached to another position. The piezoelectric element 7 may be attached to a battery lid, for example. The battery lid is a member attached to the housing 40 to cover a battery. The battery lid is frequently attached to a surface different from that on the display 2 side in a mobile electronic device including a mobile phone. This configuration enables the user to listen to a sound by bringing a part of the body (e.g., the ear) into contact with the surface different from that on the display 2 side. The piezoelectric element 7 may vibrate a corner of the housing 40 (e.g., at least one of the four corners). In this case, the piezoelectric element 7 may be attached to the inner surface of the corner of the housing 40. Alternatively, an intermediate member may be provided, and vibration of the piezoelectric element 7 may be transmitted to the corner of the housing 40 via the intermediate member. This configuration can make the range of vibration relatively small, thereby making an air conduction sound generated by the vibration less likely to leak to the surroundings. This configuration enables the user to receive the air conduction sound and the vibration sound by inserting the corner of the housing into the external auditory meatus, for example. This can make ambient noise less likely to enter the external auditory meatus of the user, thereby improving the quality of the sound transmitted to the user.

While the reinforcing member 31 is a plate-like member in the embodiments above, the shape of the reinforcing member 31 is not limited thereto. The reinforcing member 31 may be larger than the piezoelectric element 7 and have a shape whose end is curved toward the piezoelectric element 7 to cover the side portion of the piezoelectric element 7, for example. The reinforcing member 31 may include a plate-like portion and an extended portion extended from the plate-like portion to cover the side portion of the piezoelectric element 7, for example. In this case, the extended portion and the side portion of the piezoelectric element 7 are preferably separated from each other by a predetermined distance. This can make the extended portion less likely to prevent deformation of the piezoelectric element.

The panel 20 may be a part or all of any one of a display panel, an operation panel, a cover panel, and a lid panel that makes a rechargeable battery detachable. In the case of the panel 20 serving as a display panel, the piezoelectric element 7 is arranged outside of a display area for a display function. This configuration is less likely to obstruct display. The operation panel includes a touch panel. The operation panel further includes a sheet key, which is a member serving as a surface on the operating unit side of the housing integrated with key tops of operation keys in a folding mobile phone, for example.

In the description above, the joining member that bonds the panel 20 and the piezoelectric element 7 and the joining member that bonds the panel 20 and the housing 40 are referred to as the joining member 30 assigned with the same reference numeral. The joining members, however, may be different from each other as needed depending on the members to be joined.

Seventh Embodiment

Figure 20:
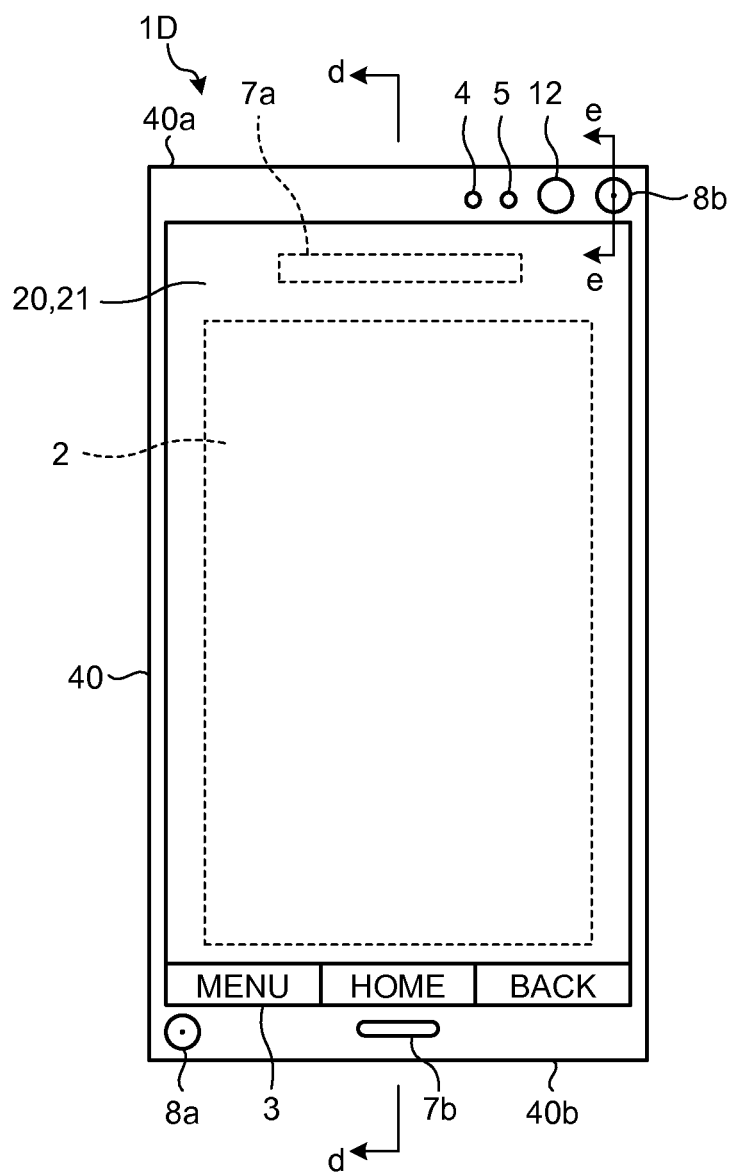
FIG. 20 is a front view of a mobile phone according to a seventh embodiment.
Figure 21:
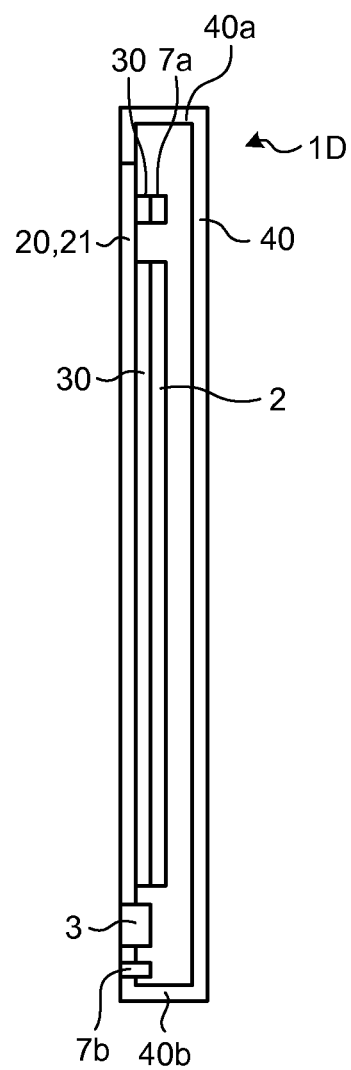
FIG. 21 is a sectional view of the mobile phone along line d-d in FIG. 20.

The following describes an overall configuration of a mobile phone 1D according to a seventh embodiment with reference to FIG. 20 and FIG. 21. FIG. 20 is a front view of the mobile phone 1D according to the seventh embodiment. FIG. 21 is a sectional view of the mobile phone 1D along line d-d in FIG. 20. As illustrated in FIG. 20 and FIG. 21, the mobile phone 1D includes a display 2, buttons 3, an illuminance sensor 4, a proximity sensor 5, a piezoelectric element 7a, a dynamic receiver (a second sound generating unit) 7b, a first microphone 8a, a second microphone 8b, a camera 12, a panel (a first sound generating unit) 20, and a housing 40.

The display 2 includes a display device, such as an LCD, an GELD, and an IELD. The display 2 displays a character, an image, a symbol, and a figure, for example.

The buttons 3 receive an operation input from the user. The number of buttons 3 is not limited to that in the example illustrated in FIG. 20 and FIG. 21.

The illuminance sensor 4 detects the illuminance of light surrounding the mobile phone 1D. The illuminance indicates the intensity, the brightness, or the luminance of light. The illuminance sensor 4 is used to adjust the luminance of the display 2, for example. The proximity sensor 5 detects the presence of a contiguous object in a non-contact manner. The proximity sensor 5 detects the presence of the object based on a change in a magnetic field or a change in a returning time of reflected waves of ultrasonic waves, for example. The proximity sensor 5, for example, detects that the display 2 is brought closer to the face. The illuminance sensor 4 and the proximity sensor 5 may be integrated as a single sensor. The illuminance sensor 4 may be used as a proximity sensor.

When an electrical signal (a voltage corresponding to a sound signal) is applied, the piezoelectric element 7a expands and contracts or bends based on the electromechanical coupling coefficient of the constituent material. In other words, the piezoelectric element 7a deforms when an electrical signal is applied thereto. The piezoelectric element 7a is attached to the panel 20 and is used as a vibration source to vibrate the panel 20. The piezoelectric element 7a is formed of ceramics or crystals, for example. The piezoelectric element 7a may be a unimorph, a bimorph, or a laminated piezoelectric element. Examples of the laminated piezoelectric element include, but are not limited to, a laminated bimorph element obtained by laminating bimorphs (e.g., 16 layers or 24 layers of bimorphs). The laminated piezoelectric element has a laminated structure including a plurality of dielectric layers made of lead zirconate titanate (PZT) and electrode layers each arranged between the dielectric layers. The unimorph expands and contracts when an electrical signal (a voltage) is applied thereto. The bimorph bends when an electrical signal (a voltage) is applied thereto.

The dynamic receiver 7b is a sound output unit that outputs a sound by the air conduction method. The dynamic receiver 7b can transmit a sound obtained by converting an electrical signal to a person who does not bring the ear into contact with the mobile phone 1D. The dynamic receiver 7b is a mechanism that outputs a voice by vibrating a diaphragm with a voice coil. The dynamic receiver 7b mainly includes a permanent magnet, the voice coil, and the diaphragm. When an electrical signal (a voltage corresponding to a sound signal) is applied to the voice coil in the dynamic receiver 7b, the voice coil serves as an electromagnet and vibrates in a predetermined direction with respect to the permanent magnet. The dynamic receiver 7b vibrates the voice coil, thereby vibrating the diaphragm coupled to the voice coil. Vibration of the diaphragm vibrates ambient air, thereby transmitting a sound to the surroundings. The dynamic receiver 7b serves as a receiver that outputs a telephone conversation voice in a state where the user presses the ear against the housing 40 in the telephone conversation. The dynamic receiver 7b also serves as a speaker that outputs a voice with a sufficient output to enable the user who keeps the ear away from the housing 40 to listen to a sound. The dynamic receiver 7b is used to output a ringtone and a telephone conversation voice in a speaker phone mode, for example.

The first microphone 8a and the second microphone 8b serve as sound input units. The first microphone 8a and the second microphone 8b convert a received sound into an electrical signal.

The camera 12 is an in-camera that photographs an object facing the display 2. The camera 12 converts the image obtained by the photographing into an electrical signal. The mobile phone 1D may include an out-camera that photographs an object facing the surface opposite to the display 2 besides the camera 12.

The panel 20 vibrates in association with deformation (expansion and contraction or bending) of the piezoelectric element 7a and transmits the vibration to the cartilage of the ear (e.g., the auricular cartilage) or the like brought into contact with the panel 20 by the user as sound vibration. The panel 20 also has a function to protect the display 2, the piezoelectric element 7a, and other components from external force. The panel 20 is made of glass or synthetic resin, such as acrylic, and has a plate shape, for example. The panel 20 may be a flat plate or a curved panel having a smoothly curved surface.

The display 2 and the piezoelectric element 7a are attached to the back surface of the panel 20 with a joining member 30. The piezoelectric element 7a are arranged on the back surface of the panel 20 in a manner separated from the inner surface of the housing 40 by a predetermined distance. The piezoelectric element 7a is preferably separated from the inner surface of the housing 40 even when it expands and contracts or bends. In other words, the distance between the piezoelectric element 7a and the inner surface of the housing 40 is preferably larger than the maximum deformation amount of the piezoelectric element 7a. The piezoelectric element 7a may be attached to the panel 20 via a reinforcing member (e.g., sheet metal or glass fiber reinforced resin). The joining member 30 is a double-sided tape or a thermosetting or ultraviolet curable adhesive, for example. The joining member 30 may be optical elastic resin, which is a colorless and transparent acrylic ultraviolet curable adhesive.

The display 2 is arranged at substantially the center of the panel 20 in the short direction. The piezoelectric element 7a is arranged at a position away from an end of the panel 20 in the longitudinal direction by a predetermined distance such that the longitudinal direction of the piezoelectric element 7a is parallel to the short direction of the panel 20. The display 2 and the piezoelectric element 7a are arranged side by side and parallel to each other on the inner-side surface of the panel 20.

Substantially the entire outer-side surface of the panel 20 is provided with a touch screen (a touch sensor) 21. The touch screen 21 detects a contact on the panel 20. The touch screen 21 is used to detect a contact operation performed by the user with a finger, a pen, or a stylus pen, for example. Examples of the gesture detected by the touch screen 21 include, but are not limited to, a touch, a long touch, a release, a swipe, a tap, a double-tap, a long tap, a drag, a flick, a pinch-in, and a pinch-out. The touch screen 21 may employ a desired detection system, including a capacitive system, a resistance film system, a surface acoustic wave system (or an ultrasonic wave system), an infrared system, an electromagnetic induction system, and a load detecting system.

The touch screen 21 is also used to detect the auricular cartilage or the like coming into contact with the panel 20 to listen to a sound.

The housing 40 is made of resin or metal. The housing 40 supports the buttons 3, the illuminance sensor 4, the proximity sensor 5, the dynamic receiver 7b, the first microphone 8a, the second microphone 8b, the camera 12, and the panel 20, for example. The housing 40 supports the piezoelectric element 7a via the panel 20.

The layout of the units arranged in the housing 40 will be described. The following particularly describes the arrangement of the piezoelectric element 7a, the dynamic receiver 7b, the first microphone 8a, and the second microphone 8b. In the mobile phone 1D, the housing 40 has a nearly rectangular parallelepiped shape with a small thickness. In the mobile phone 1D, the display 2 and the panel 20 are arranged in an overlapping manner on a surface of the housing 40. In the mobile phone 1D, the piezoelectric element 7a and the dynamic receiver 7b are arranged at positions facing each other with the display 2 and the panel 20 interposed therebetween on the surface of the housing 40. Specifically, the piezoelectric element 7a is arranged on a first end 40a side, which is one end of the surface of the housing 40 in the longitudinal direction. The dynamic receiver 7b is arranged on a second end 40b side, which is the other end of the surface of the housing 40 in the longitudinal direction. The surface of the housing 40 according to the present embodiment has a rectangular shape. The ends 40a and 40b, which are the ends in the longitudinal direction, correspond to short sides. Thus, in the mobile phone 1D, the piezoelectric element 7a is arranged at the first end 40a of the housing 40, whereas the dynamic receiver 7b is arranged at the second end 40b of the housing 40. Furthermore, the piezoelectric element 7a and the dynamic receiver 7b are arranged at the center of the surface of the housing 40 in the short direction. In other words, the piezoelectric element 7a and the dynamic receiver 7b are arranged at the respective ends in the longitudinal direction of the surface of the housing 40 and at the center in the short direction. By arranging the piezoelectric element 7a and the dynamic receiver 7b at the center in the short direction, it is possible to improve the usability as a receiver.

The mobile phone 1D has the illuminance sensor 4, the proximity sensor 5, the camera 12, and the second microphone 8b on the first end 40a side of the housing 40, that is, near the piezoelectric element 7a. The mobile phone 1D has the first microphone 8a on the second end 40b side of the housing 40, that is, near the dynamic receiver 7b. Thus, in the mobile phone 1D, the second microphone 8b is arranged at the first end 40a of the housing 40, whereas the first microphone 8a is arranged at the second end 40b of the housing 40. Consequently, the first microphone 8a is arranged at the end 40b opposite to the end 40a at which the piezoelectric element 7a is arranged. The second microphone 8b is arranged at the end 40a opposite to the end 40b at which the dynamic receiver 7b is arranged. The first microphone 8a and the second microphone 8b are arranged at different ends of the surface of the housing 40 also in the short direction. In other words, the first microphone 8a and the second microphone 8b are arranged near respective corners positioned farthest away from each other on a diagonal line on the surface of the housing 40.

Figure 22:
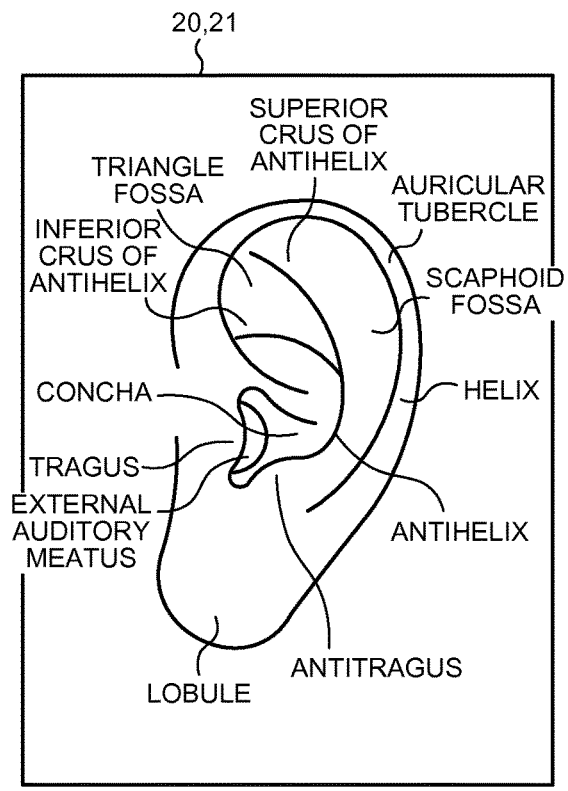
FIG. 22 is a schematic of an example of the shape of the panel.
Figure 23:
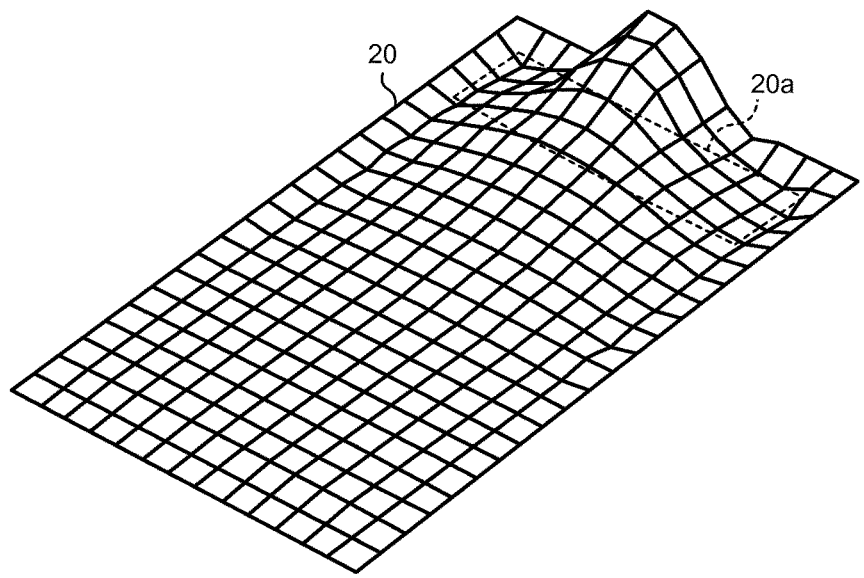
FIG. 23 is a schematic of an example of vibration of the panel.

The following describes output of a sound performed by the mobile phone 1D according to the embodiment in greater detail with reference to FIG. 20 to FIG. 23. FIG. 22 is a schematic of an example of the shape of the panel 20. FIG. 23 is a schematic of an example of vibration of the panel 20.

The piezoelectric element 7a is supplied with an electrical signal corresponding to a sound to be output. The piezoelectric element 7a may be supplied with a voltage of ±15 V, which is higher than a voltage of ±5 V applied to what is called a panel speaker that transmits a sound as an air conduction sound traveling through an external auditory meatus, for example. This enables the panel 20 to generate sufficient vibration even when the user presses a part of the body against the panel 20 with force of equal to or larger than 3 N (force of 5 N to 10 N), for example. Thus, the panel 20 can generate a vibration sound transmitted via the part of the body of the user. The voltage applied to the piezoelectric element 7a can be appropriately adjusted depending on the fixing strength of the panel 20 to the housing 40 or the performance of the piezoelectric element 7a, for example.

Application of an electrical signal causes the piezoelectric element 7a to expand and contract or bend in the longitudinal direction. The panel 20 to which the piezoelectric element 7a is attached deforms in association with expansion and contraction or bending of the piezoelectric element 7a. This causes the panel 20 to vibrate and generate an air conduction sound. Furthermore, when the user brings a part of the body (e.g., the auricular cartilage) into contact with the panel 20, the panel 20 generates an air conduction sound and a vibration sound conducted to the user via the part of the body. In other words, the panel 20 vibrates with respect to by an object in contact with the panel 20 in association with the deformation of the piezoelectric element 7a at a frequency such that the vibration is sensed as a vibration sound. The panel 20 is curved by expansion and contraction or bending of the piezoelectric element 7a. The panel 20 is directly bent by the piezoelectric element 7a. The phenomenon that "the panel 20 is directly bent by the piezoelectric element" is different from the phenomenon that a specific area of the panel is vibrated by inertial force of a piezoelectric actuator, which includes a piezoelectric element arranged in a casing as employed in a conventional panel speaker, and thereby a panel is deformed. The fact that "the panel 20 is directly bent by the piezoelectric element" means that expansion and contraction or bending (curve) of the piezoelectric element directly bends the panel via the joining member or via the joining member and a reinforcing member 31, which will be described later.

When an electrical signal corresponding to sound data of a voice of a communication partner in a telephone conversation, a ringtone, or music is applied to the piezoelectric element 7a, for example, the panel 20 generates an air conduction sound and a vibration sound corresponding to the electrical signal. The sound signal output via the piezoelectric element 7a and the panel 20 may be based on sound data stored in a storage 9, which will be described later. Alternatively, the sound signal output via the piezoelectric element 7a and the panel 20 may be based on sound data stored in an external server or the like and acquired via a network by a communication unit 6, which will be described later.

In the present embodiment, the panel 20 may have substantially the same size as that of the ear of the user. Alternatively, the panel 20 may have a size larger than that of the ear of the user as illustrated in FIG. 22. This enables the user to bring substantially the entire outer rim of the ear into contact with the panel 20 to listen to a sound. Listening to a sound in this manner can make an ambient sound (noise) less likely to enter the external auditory meatus. In the present embodiment, the panel 20 vibrates in at least a larger area than an area having the length in the longitudinal direction (or the short direction) corresponding to the distance from the lower crus of the antihelix (inferior crus of the antihelix) of a human to the antitragus and the length in the short direction (or the longitudinal direction) corresponding to the distance from the tragus to the antihelix. Alternatively, the panel 20 may vibrate in an area having the length in the longitudinal direction (or the short direction) corresponding to the distance from a part near the upper crus of the antihelix (superior crus of the antihelix) in the helix to the lobule and the length in the short direction (or the longitudinal direction) corresponding to the distance from the tragus to a part near the antihelix in the helix. The area having the length and the width described above may be a rectangular area or an elliptical area having the length in the longitudinal direction described above as the major axis and the length in the short direction as the minor axis. The average size of a human ear can be understood by referring to the Japanese body size database (1992 to 1994) by the Research Institute of Human Engineering for Quality Life (HQL), for example.

As illustrated in FIG. 23, the panel 20 vibrates not only in an attachment area 20a to which the piezoelectric element 7a is attached but also in an area away from the attachment area 20a. The panel 20 has a plurality of points that vibrate in a direction intersecting with the principal surface of the panel 20 in the vibration area. In each of the points, the value of amplitude of the vibration changes from plus to minus or minus to plus with time. The panel 20 generates vibration as follows: portions having relatively large amplitude of vibration and portions having relatively small amplitude of vibration are distributed seemingly at random or regularly on substantially the whole of the panel 20 at each moment. In other words, a plurality of vibration waves are detected all over the panel 20. Applying a voltage of ±15 V to the piezoelectric element 7a as described above can make the vibration of the panel 20 less likely to attenuate even when the user presses the panel 20 against the body with force of 5 N to 10 N, for example. This enables the user to listen to the vibration sound even when the user brings the ear into contact with an area away from the attachment area 20a on the panel 20. An upper portion of the panel 20 is directly bent by the piezoelectric element 7a, and the vibration attenuates in a lower portion compared with the upper portion. The panel 20 is bent by the piezoelectric element 7a such that an area just above the piezoelectric element 7a with respect to the long-side direction of the piezoelectric element 7a protrudes the most compared with the peripheral area.

In the present embodiment, the display 2 is attached to the panel 20. With this configuration, a lower portion (the side to which the display 2 is attached) of the panel 20 has higher rigidity. Thus, the lower portion generates smaller vibration than that generated by an upper portion (the side to which the piezoelectric element 7a is attached) of the panel 20. This can reduce sound leakage of an air conduction sound caused by the vibration of the panel 20 at the lower portion of the panel 20.

With vibration of the panel 20, the mobile phone 1D can transmit a sound as an air conduction sound and a vibration sound traveling via a part of the body of the user (e.g., the auricular cartilage) to the user. Thus, when outputting a sound at a volume equivalent to that of the dynamic receiver 7b, the mobile phone 1D can reduce the amount of sound transmitted to the surroundings of the mobile phone 1D with vibration of the air compared with an electronic device including a dynamic speaker alone. This feature is effectively used to listen to a recorded message in a place where other people are present nearby like the inside of a train, for example.

Furthermore, the mobile phone 1D transmits the vibration sound to the user with the vibration of the panel 20. Thus, even when the user wears earphones or headphones, the user brings the mobile phone 1D into contact with the earphones or headphones, thereby listening to the vibration sound caused by the vibration of the panel 20 via the earphones or headphones and a part of the body.

Furthermore, the mobile phone 1D transmits a sound with the vibration of the panel 20. Thus, it is not necessary to form an opening (a sound emitting port) used to transmit the sound generated by the panel 20 to the outside in the housing 40. This can simplify the structure in terms of waterproofing. To make the structure waterproof, the mobile phone 1D may block an opening including a sound emitting port of the dynamic receiver 7b with a member that allows a gas to pass therethrough but not a liquid. Examples of the member that allows a gas to pass therethrough but not a liquid include, but are not limited to, Gore-Tex (registered trademark).

Figure 24:
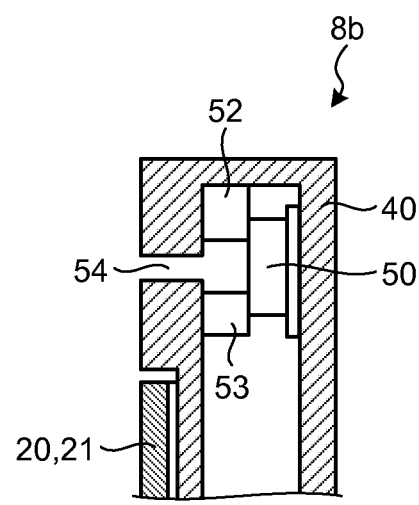
FIG. 24 is a sectional view of the mobile phone along line e-e in FIG. 20.

The configuration of the second microphone 8b will be described with reference to FIG. 24. While the following describes the second microphone 8b with reference to FIG. 24, the first microphone 8a has the same configuration. FIG. 24 is a sectional view of the mobile phone 1D along line e-e in FIG. 20. The second microphone 8b is arranged in the housing 40. The second microphone 8b includes a microphone main body 50 and sound insulating members 52 and 53. The housing 40 has a microphone hole 54 in the surface on which the panel 20 and the touch screen 21 are arranged. The microphone hole 54 is formed at a position facing the microphone main body 50. The microphone hole 54 communicates a space near the microphone main body 50 in the housing 40 and a space outside of the housing 40. A sound traveling in the space outside of the housing 40 reaches the microphone main body 50 through the microphone hole 54.

The microphone main body 50 is a portion that collects a sound, that is, detects a sound. The microphone main body 50 is arranged at a position facing the microphone hole 54 in the housing 40. The microphone main body 50 is arranged at a position separated from the microphone hole 54. The sound insulating member 52 is arranged between the microphone main body 50 and the microphone hole 54 in the housing 40. The sound insulating member 52 is arranged so as to surround the space between the microphone main body 50 and the microphone hole 54 and blocks the space between the microphone main body 50 and the microphone hole 54 from the inside of the housing 40. Thus, the sound insulating member 52 makes a sound in the housing 40 less likely to reach the microphone main body 50. The second microphone 8b detects a sound that passes through the microphone hole 54 from the outside of the housing 40 and reaches the microphone main body 50.

While the microphone hole 54 is formed in the surface on which the panel 20 and the touch screen 21 are arranged in the housing 40 in FIG. 24, the embodiment is not limited thereto. The microphone hole 54 may be formed in a side surface of the housing 40, that is, a surface extending in the thickness direction of the housing 40.

Figure 25:
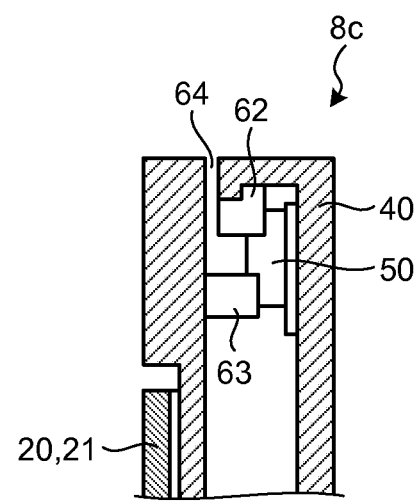
FIG. 25 is a sectional view schematically illustrating another configuration of a second microphone.

FIG. 25 is a sectional view schematically illustrating another configuration of the second microphone. A second microphone 8c illustrated in FIG. 25 is arranged in the housing 40. The second microphone 8c includes a microphone main body 50 and sound insulating members 62 and 63. The housing 40 has a microphone hole 64 in the side surface. The side surface of the housing 40 is connected to the surface on which the panel 20 and the touch screen 21 are arranged and serves as the end 40a in the longitudinal direction.

The microphone main body 50 is a portion that detects a sound. The microphone main body 50 is arranged on the side opposite to the surface on which the panel 20 and the touch screen 21 are arranged in the housing 40. The microphone main body 50 is arranged at a position not visible from the outside of the housing 40 through the microphone hole 64. The microphone main body 50 is arranged at a position separated from the microphone hole 64. The sound insulating members 62 and 63 are arranged between the microphone main body 50 and the microphone hole 64 in the housing 40. The sound insulating members 62 and 63 are arranged so as to surround the space between the microphone main body 50 and the microphone hole 64. The sound insulating members 62 and 63 block the space between the microphone main body 50 and the microphone hole 64 from the inside of the housing 40. Thus, the sound insulating members 62 and 63 make a sound in the housing 40 less likely to reach the microphone main body 50. The sound insulating members 62 and 63 guide a sound that passes through the microphone hole 64 to the microphone main body 50 arranged at the position not visible from the outside through the microphone hole 64. The second microphone 8c detects a sound that passes through the microphone hole 64 from the outside of the housing 40 and reaches the microphone main body 50. Because the microphone hole 64 is arranged in the side surface of the housing 40, the second microphone 8c is less likely to be blocked when it is used. This enables more reliable detection of a sound.

Figure 26:
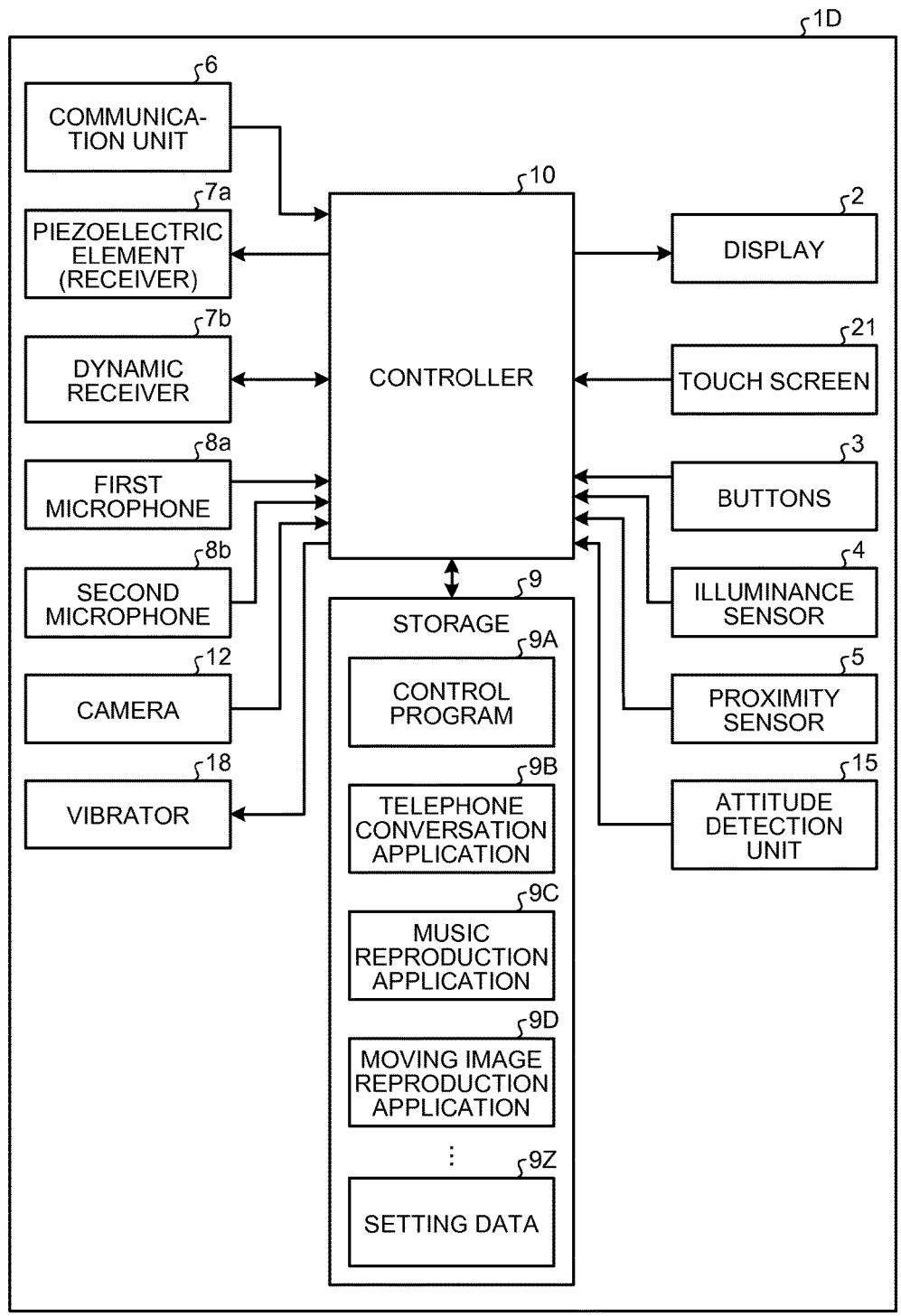
FIG. 26 is a block diagram of the mobile phone according to the seventh embodiment.

The following describes the functional configuration of the mobile phone 1D with reference to FIG. 26. FIG. 26 is a block diagram of the mobile phone 1D according to the seventh embodiment. As illustrated in FIG. 26, the mobile phone 1D includes the display 2, the buttons 3, the illuminance sensor 4, the proximity sensor 5, the communication unit 6, the piezoelectric element 7a, the dynamic receiver 7b, the first microphone 8a, the second microphone 8b, the storage 9, a controller 10, the camera 12, an attitude detection unit 15, a vibrator 18, and the touch screen 21.

The communication unit 6 performs wireless communications. The communication unit 6 supports a communication method of a wireless communication standard. Examples of the wireless communication standard include, but are not limited to, a communication standard for a cellular phone of 2G, 3G, and/or 4G. Examples of the communication standard for a cellular phone include, but are not limited to, LTE, W-CDMA, CDMA 2000, PDC, GSM (registered trademark), and PHS. Examples of the wireless communication standard further include, but are not limited to, WiMAX, IEEE 802.11, Bluetooth (registered trademark), IrDA, and NFC. The communication unit 6 may support one or a plurality of the communication standards described above.

The storage 9 stores therein computer programs and data. The storage 9 is also used as a work area that temporarily stores therein a processing result of the controller 10. The storage 9 may include a desired non-transitory storage medium, such as a semiconductor storage medium and a magnetic storage medium. The storage 9 may include a plurality of types of storage media. The storage 9 may include a combination of a portable storage medium, such as a memory card, an optical disc, and a magneto-optical disc, and a reading device for the storage medium. The storage 9 may include a storage device used as a temporary storage area, such as a RAM.

The computer programs stored in the storage 9 include an application executed in the foreground or the background and a control program that supports the operation of the application. The application, for example, causes the display 2 to display a screen and then causes the controller 10 to perform processing corresponding to a gesture detected through the touch screen 21. The control program is an OS, for example. The application and the control program may be installed on the storage 9 via wireless communications performed by the communication unit 6 or a non-transitory storage medium.

The storage 9 stores therein a control program 9A, a telephone conversation application 9B, a music reproduction application 9C, a moving image reproduction application 9D, and setting data 9Z. The telephone conversation application 9B provides a telephone conversation function for a telephone conversation made via wireless communications. The music reproduction application 9C provides a music reproduction function to reproduce a sound from music data. The moving image reproduction application 9D provides a moving image reproduction function to reproduce a moving image and a sound from moving image data. The setting data 9Z includes information on various types of settings relating to the operation of the mobile phone 1D.

The control program 9A provides a function relating to various types of control to operate the mobile phone 1D. The control program 9A, for example, determines an operation performed by the user based on a contact detected by the touch screen 21, thereby activating a computer program corresponding to the determined operation. The function provided by the control program 9A includes a function to perform control for determining a control mode used to output a voice and a function to control the piezoelectric element 7a, the dynamic receiver 7b, the first microphone 8a, and the second microphone 8b based on the determined control mode. The function provided by the control program 9A may be combined with a function provided by other computer programs, such as the telephone conversation application 9B.

The controller 10 is a processing device. Examples of the processing device include, but are not limited to, a CPU, a SoC, a MCU, and a FPGA. The controller 10 integrally controls the operations of the mobile phone 1D, thereby providing various types of functions.

Specifically, the controller 10 executes instructions included in the computer programs stored in the storage 9 while referring to the data stored in the storage 9 as needed. The controller 10 controls functional units in accordance with the data and the instructions, thereby providing various types of functions. Examples of the functional units include, but are not limited to, the display 2, the communication unit 6, the piezoelectric element 7a, the dynamic receiver 7b, the first microphone 8a, the second microphone 8b, and the vibrator 18. The controller 10 may change the control based on a detection result of detecting units. Examples of the detecting units include, but are not limited to, the buttons 3, the illuminance sensor 4, the proximity sensor 5, the camera 12, the attitude detection unit 15, and the touch screen 21.

The controller 10 executes the control program 9A, for example, thereby performing control for determining the control mode used to output a voice. The controller 10 executes the control program 9A, for example, thereby controlling the piezoelectric element 7a, the dynamic receiver 7b, the first microphone 8a, and the second microphone 8b based on the determined control mode.

The attitude detection unit 15 detects the attitude of the mobile phone 1D. The attitude detection unit 15 includes at least one of an acceleration sensor, an orientation sensor, and a gyroscope to detect the attitude. The vibrator 18 vibrates a part or the whole of the mobile phone 1D. The vibrator 18 includes a piezoelectric element or an eccentric motor to generate vibration, for example. The vibration generated by the vibrator 18 is used not to transmit a sound but to inform the user of various types of events, such as an incoming call.

A part or all of the computer programs and the data stored in the storage 9 illustrated in FIG. 26 may be downloaded from other devices via wireless communications performed by the communication unit 6. Alternatively, a part or all of the computer programs and the data stored in the storage 9 illustrated in FIG. 26 may be stored in a non-transitory storage medium readable by the reading device included in the storage 9. Examples of the non-transitory storage medium include, but are not limited to, an optical disc, such as a CD (registered trademark), a DVD (registered trademark), and Blu-ray (registered trademark), a magneto-optical disc, a magnetic storage medium, a memory card, and a solid-state storage medium.

The configuration of the mobile phone 1D illustrated in FIG. 26 is given by way of example, and various changes may be made as needed without departing from the spirit of the present invention. The mobile phone 1D may include buttons in the numeric keypad layout or the QWERTY layout as buttons used for an operation, for example.

Figure 27:
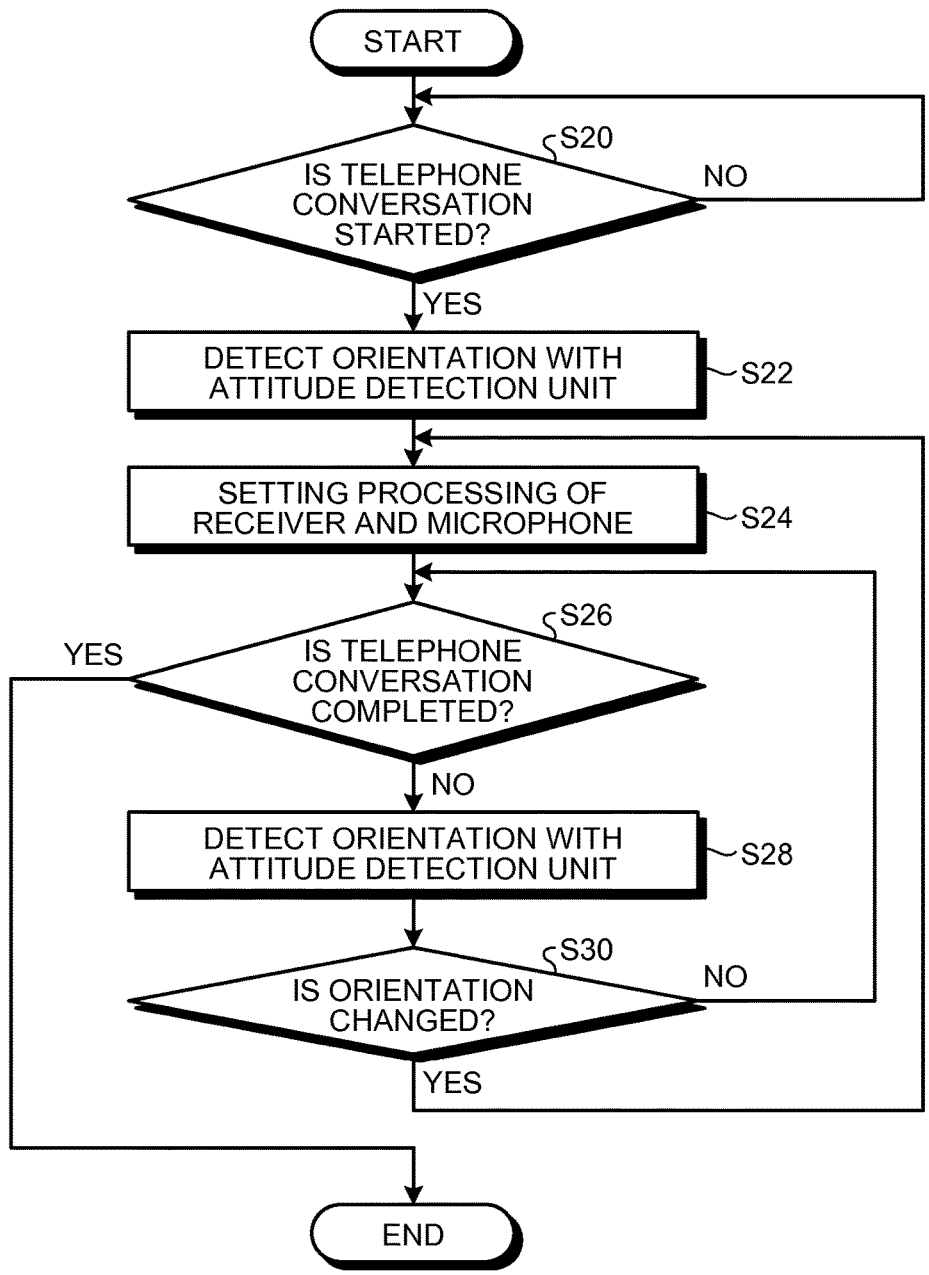
FIG. 27 is a flowchart of a process of control performed in a telephone conversation.
Figure 28:
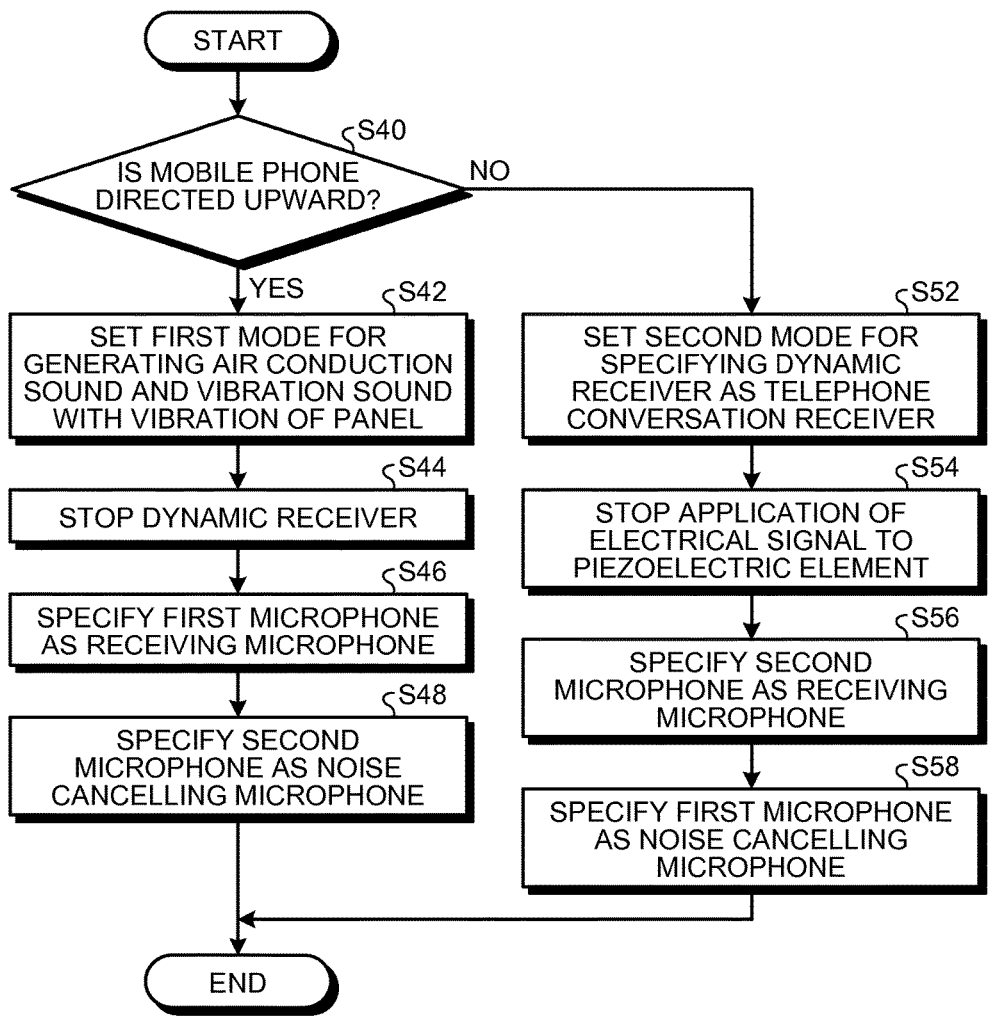
FIG. 28 is a flowchart of a process for controlling the output mode of a voice.
Figure 29:
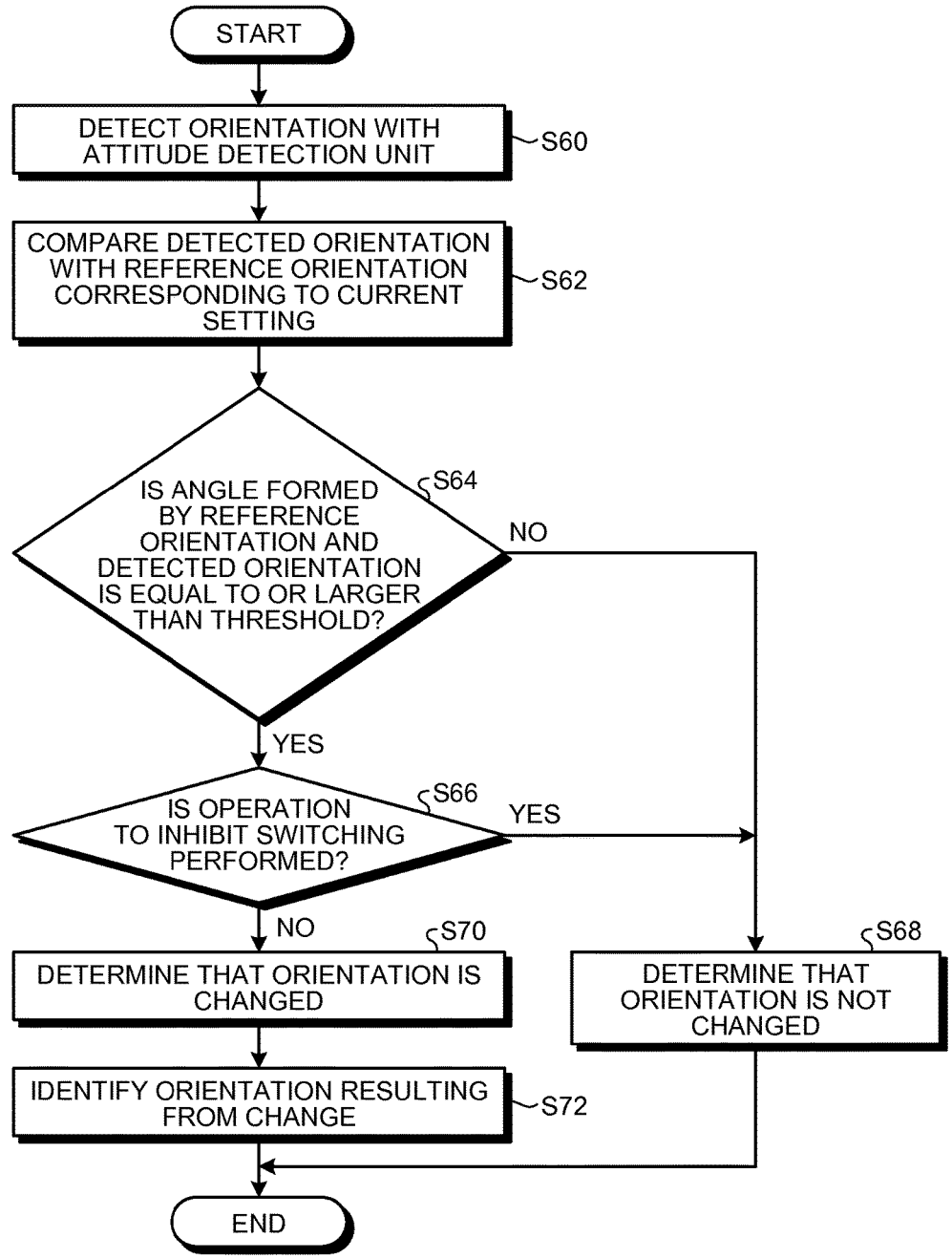
FIG. 29 is a flowchart of a process of control performed during the telephone conversation.

The following describes the control for determining the control mode used to output a voice and the control of the piezoelectric element 7a, the dynamic receiver 7b, the first microphone 8a, and the second microphone 8b performed based on the determined control mode with reference to FIG. 27 to FIG. 29. FIG. 27 is a flowchart of a process of control performed in a telephone conversation. FIG. 28 is a flowchart of a process for controlling the output mode of a voice. FIG. 29 is a flowchart of a process of control performed during the telephone conversation. The process illustrated in FIG. 27 to FIG. 29 is performed by the controller 10 executing the control program 9A. FIG. 27 to FIG. 29 will be explained as processing performed to make a voice call with another communication device. Various types of processing in the voice call are performed by the controller 10 executing the telephone conversation application 9B and using the communication unit 6.

The controller 10 determines, at Step S20, whether a telephone conversation is started. When it is determined that no telephone conversation is started at Step S20 (No at Step S20), the controller 10 proceeds to Step S20. When it is determined that a telephone conversation is started at Step S20 (Yes at Step S20), then at Step S22, the controller 10 detects an orientation, that is, an orientation of the mobile phone 1D with the attitude detection unit 15. After detecting the orientation at Step S22, then at Step 24, the controller 10 performs setting processing of a receiver and a microphone. The controller 10 then proceeds to Step S26.

The processing at Step S24 will be described with reference to FIG. 28. The controller 10 performs setting processing of the receiver and the microphone based on the orientation of the mobile phone 1D detected at Step S24. The controller 10 determines, at Step S40, whether the mobile phone 1D is directed upward. In the present embodiment, upward is an orientation in which the end 40a of the housing 40 is positioned above the end 40b in the vertical direction.

When it is determined that the mobile phone 1D is directed upward at Step S40 (Yes at Step S40), then at Step S42, the controller 10 selects the system to generate the air conduction sound and the vibration sound with the piezoelectric element 7a and the panel 20 (a first mode). Subsequently, the controller 10 stops the dynamic receiver 7b at Step S44 and specifies the first microphone 8a as a receiving microphone at Step S46. The controller 10 specifies the second microphone 8b as a noise cancelling microphone at Step S48 and then terminates the processing. After terminating the processing, the controller 10 proceeds to Step S26.

By performing the processing from Step S42 to Step S48, the controller 10 generates the air conduction sound and the vibration sound with the piezoelectric element 7a and panel 20 and uses the first microphone 8a arranged on the side opposite to the piezoelectric element 7a as a microphone to make a telephone conversation. The controller 10 uses a sound detected by the second microphone 8*b* arranged near the piezoelectric element 7*a* for noise cancellation.

When it is determined that the mobile phone 1D is not directed upward at Step S40 (No at Step S40), then at Step S52, the controller 10 specifies the dynamic receiver 7*b* as a telephone conversation receiver (a second mode). Subsequently, the controller 10 stops application of an electrical signal to the piezoelectric element 7*a* at Step S54 and specifies the second microphone 8*b* as a receiving microphone at Step S56. The controller 10 specifies the first microphone 8*a* as a noise cancelling microphone at Step S58 and then terminates the processing. After terminating the processing, the controller 10 proceeds to Step S26.

By performing the processing from Step S52 to Step S58, the controller 10 uses the dynamic receiver 7*b* as a receiver and uses the second microphone 8*b* arranged on the side opposite to the dynamic receiver 7*b* as a microphone to make a telephone conversation. The controller 10 uses a sound detected by the first microphone 8*a* arranged near the dynamic receiver 7*b* for noise cancellation.

After performing the setting processing illustrated in FIG. 28 at Step S24, the controller 10 processes a telephone conversation voice based on the determined setting parallel to the processing illustrated in FIG. 27. After performing the setting processing at Step S24, the controller 10 determines, at Step S26, whether the telephone conversation is completed.

When it is determined that the telephone conversation is not completed yet at Step S26 (No at Step S26), then at Step S28, the controller 10 detects the orientation with the attitude detection unit 15. Subsequently, the controller 10 determines, at Step S30, whether the orientation is changed. In other words, the controller 10 determines whether the orientation is changed from upward to downward or from downward to upward.

When it is determined that the orientation is not changed at Step S30, that is, when it is determined that the detected orientation is the same as that of the current setting (No at Step S30), the controller 10 proceeds to Step S26. When it is determined that the orientation is changed at Step S30, that is, when it is determined that the detected orientation is different from that of the current setting (Yes at Step S30), the controller 10 proceeds to Step S24 and performs setting processing of the receiver and the microphone.

When it is determined that the telephone conversation is completed at Step S26 (Yes at Step S26), the controller 10 terminates the processing.

As illustrated in FIG. 27 and FIG. 28, the mobile phone 1D can make a telephone conversation in the following two modes: the first mode in which the air conduction sound and the vibration sound are generated by the piezoelectric element 7*a* and the panel 20, which the first mode is selected by the setting processing from Step S42 to Step S48; and the second mode in which the dynamic receiver 7*b* is used as the telephone conversation receiver, which the second mode is selected by the setting processing from Step S52 to Step S58. This enables the user to switch the receiver to be used depending on the surrounding environment and usage. If a voice output from the dynamic receiver 7*b* is mixed with ambient noise and is hard to hear in noisy surroundings, for example, the user causes the mobile phone 1D to output the voice in the first mode. This enables the user to listen to the telephone conversation voice reliably in the noisy surroundings. In a quiet environment, the user causes the mobile phone 1D to output a voice at an appropriate volume in the second mode, thereby suppressing sound leakage reliably. In other words, the user causes the dynamic receiver 7*b* to output a sound at a volume appropriate for the ear by the air conduction method in the second mode, thereby suppressing transmission of the sound to a position away from the ear of the user by the air conduction method. This can suppress sound leakage.

The mobile phone 1D determines whether to make a telephone conversation in the first mode or the second mode based on the orientation of the mobile phone 1D. This enables the user to switch the mode for outputting a voice simply by changing the orientation of the mobile phone 1D.

In the mobile phone 1D, the first microphone 8*a* and the second microphone 8*b* are arranged near the dynamic receiver 7*b* and the piezoelectric element 7*a*, respectively. With this configuration, the mobile phone 1D can use one of the microphones as a telephone conversation microphone and the other as a noise cancelling microphone. This enables the mobile phone 1D to perform noise cancellation and make a telephone conversation both in the first mode and the second mode.

In the mobile phone 1D, the piezoelectric element 7*a* and the dynamic receiver 7*b* are arranged at the ends opposite to each other in the housing 40, and the first microphone 8*a* and the second microphone 8*b* are arranged at the ends opposite to each other in the housing 40. With this configuration, the mobile phone 1D can appropriately switch the receiver and the microphone both in the first mode and the second mode.

The mobile phone 1D preferably performs the setting processing of the first mode and the second mode during a telephone conversation like the present embodiment. This enables the mobile phone 1D to selectively perform the processing when needed, resulting in reduced power consumption.

When the dynamic receiver 7*b* is not used as a receiver, the mobile phone 1D preferably uses the dynamic receiver 7*b* as a speaker. Thus, the mobile phone 1D can provide a function of a receiver that outputs a sound by the air conduction method and a function of a speaker that notifies the user of a ringtone or the like with the dynamic receiver 7*b* alone. With this configuration, the mobile phone 1D can have a receiver including a plurality of output systems without increasing the number of mounted devices.

While the start of a telephone conversation is used as a trigger in FIG. 27, detection of any one of a call request and an incoming call may be used as a trigger to start the processing at Step S22 and that subsequent thereto.

The mobile phone 1D may add other conditions for determination of switching of the orientation. The following describes other conditions with reference to FIG. 29. The controller 10 may perform the processing illustrated in FIG. 29 instead of the processing at Step S28 in FIG. 27.

The controller 10 detects an orientation with the attitude detection unit 15 at Step S60 and compares the detected orientation with a reference orientation corresponding to the current setting at Step S62. After making the comparison at Step S62, the controller 10 determines, at Step S64, whether an angle formed by the reference orientation and the detected orientation is equal to or larger than a threshold. In other words, at Step S64, the controller 10 detects an angle formed by the reference orientation and the orientation detected at Step S60. The formed angle corresponds to an angle between the reference orientation and the orientation detected at Step S60 in a plane extending in the vertical direction.

When it is determined that the formed angle is not equal to or larger than the threshold at Step S64 (No at Step S64), the controller 10 proceeds to Step S68. When it is determined that the formed angle is equal to or larger than the threshold at Step S64 (Yes at Step S64), then at Step S66, the controller 10 determines whether an operation to inhibit switching is performed. The operation to inhibit switching is an operation to inhibit switching of the mode for outputting a voice in a telephone conversation. Examples of the operation include, but are not limited to, pressing a predetermined button and settings made in advance. When it is determined that the operation is performed at Step S66 (Yes at Step S66), the controller 10 proceeds to Step S68. When it is determined that the operation is not performed at Step S66 (No at Step S66), the controller 10 proceeds to Step S70.

When the determination at Step S64 is negative or when the determination at Step S66 is positive, then at Step S68, the controller 10 determines that the orientation is not changed. The controller 10 then terminates the processing. When the determination at Step S66 is negative, then at Step S70, the controller 10 determines that the orientation is changed. The controller 10 identifies the orientation resulting from the change, that is, the current orientation obtained after the change at Step S72 and then terminates the processing.

As illustrated in FIG. 29, the mobile phone 1D uses the threshold as a reference to determine whether the orientation is changed, thereby adjusting the switchability of the mode for outputting a voice in a telephone conversation. The threshold used by the controller 10 is preferably an angle larger than 90 degrees and more preferably an angle larger than 135 degrees. This can make the current mode less likely to be switched, thereby suppressing switching of the mode at a timing not desired by the user in the use of the mobile phone 1D. In other words, a certain buffer region is provided to the attitude in which the mode is switched. In the mobile phone 1D, a threshold at which the output mode is switched from the first mode to the second mode may be different from a threshold at which the output mode is switched from the second mode to the first mode. This enables switching of the mode in a manner intended by the user.

When the operation to inhibit switching is performed, the mobile phone 1D does not switch the mode for outputting a voice, thereby continuing output of the voice in the mode intended by the user. When the user is making a telephone conversation while lying down, for example, the mobile phone 1D can suppress switching of the mode simply by the user's rolling-over.

The mobile phone 1D may determine that the orientation is changed when a state of the orientation being changed continues for a certain time or longer or when the change in the angle decreases while the orientation is being changed. The mobile phone 1D may also use the acceleration of the change in the orientation as a reference for determination.

Eighth Embodiment

Figure 30:
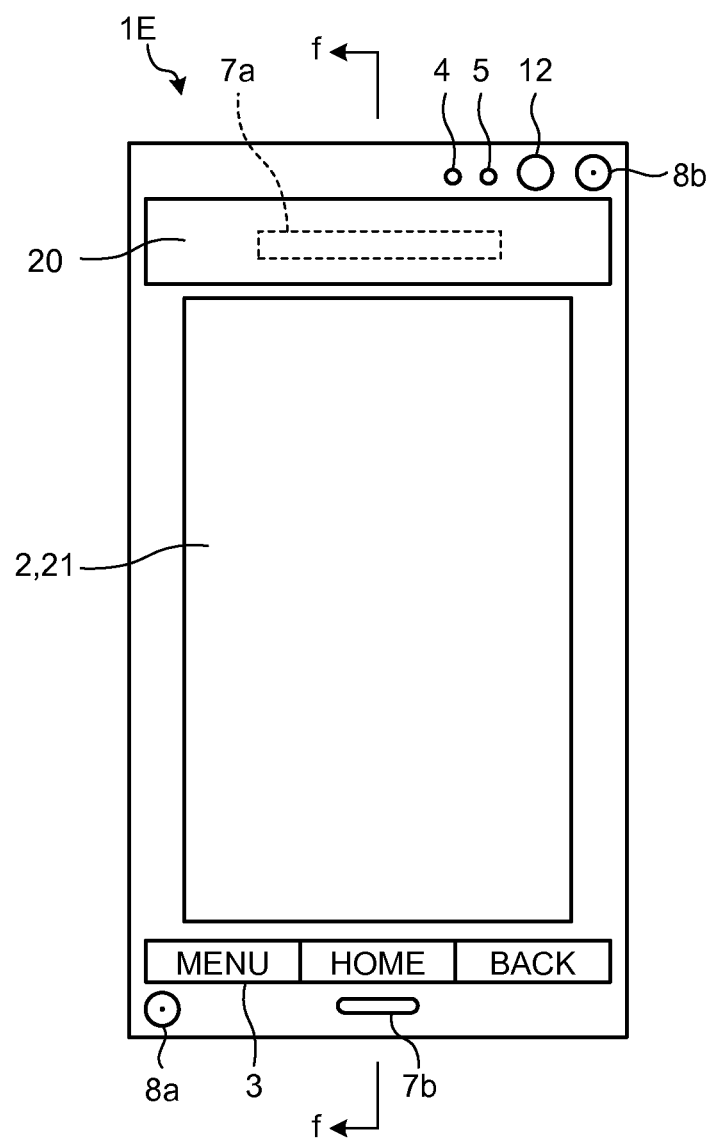
FIG. 30 is a front view of a mobile phone according to an eighth embodiment.
Figure 31:
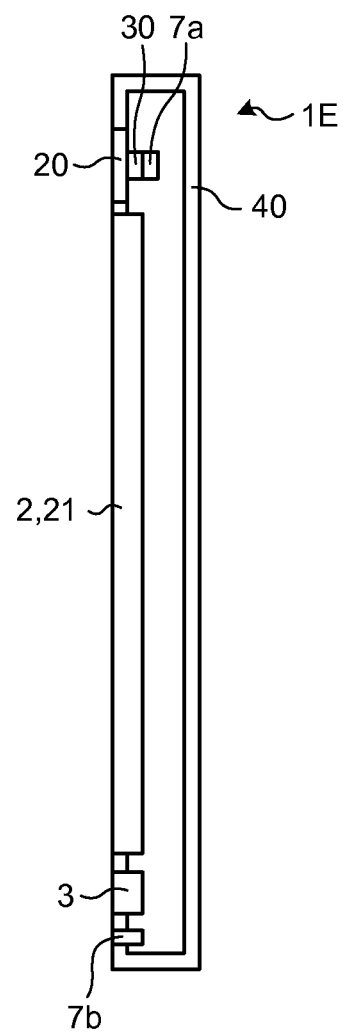
FIG. 31 is a sectional view of the mobile phone along line f-f in FIG. 30.

While the touch screen 21 is arranged on substantially the entire surface of the panel 20 in the seventh embodiment, the touch screen 21 may be arranged in a manner not overlapping with the panel 20. FIG. 30 is a front view of a mobile phone according to an eighth embodiment. FIG. 31 is a sectional view of the mobile phone along line f-f in FIG. 30. The following describes a mobile phone 1E in which a touch screen 21 is arranged in a manner not overlapping with a panel 20 with reference to FIG. 30 and FIG. 31.

In the mobile phone 1E, a display 2 is arranged side by side with the panel 20 not on the inner-side surface of the panel 20 but on the same plane as that of the panel 20 as illustrated in FIG. 30 and FIG. 31. The touch screen 21 is arranged in a manner covering substantially the entire front surface of the display 2. In other words, the touch screen 21 and the display 2 constitute what is called a touch panel (a touch screen display).

A piezoelectric element 7a is attached to substantially the center of the back surface of the panel 20 with a joining member 30. When an electrical signal is applied to the piezoelectric element 7a, the panel 20 vibrates in association with deformation (expansion and contraction or bending) of the piezoelectric element 7a. Thus, the panel 20 generates an air conduction sound and a vibration sound transmitted via a part of the human body (e.g., the auricular cartilage) in contact with the panel 20. Arrangement of the piezoelectric element 7a at the center of the panel 20 enables the vibration of the piezoelectric element 7a to be uniformly transmitted to the entire panel 20. This improves the quality of the air conduction sound and the vibration sound.

The touch screen 21 is not arranged on the front surface of the panel 20. The panel 20 is arranged near the display 2 provided with the touch screen 21.

In the case of the mobile phone 1E in which the panel 20 is arranged in a manner not overlapping with the touch screen 21, a dynamic receiver 7b is provided to an end opposite to the end where the piezoelectric element 7a is arranged on a surface of a housing 40. Thus, the mobile phone 1E can output a voice in the two modes similarly to the seventh embodiment and output the voice in a manner suitable for the user.

Ninth Embodiment

Figure 32:
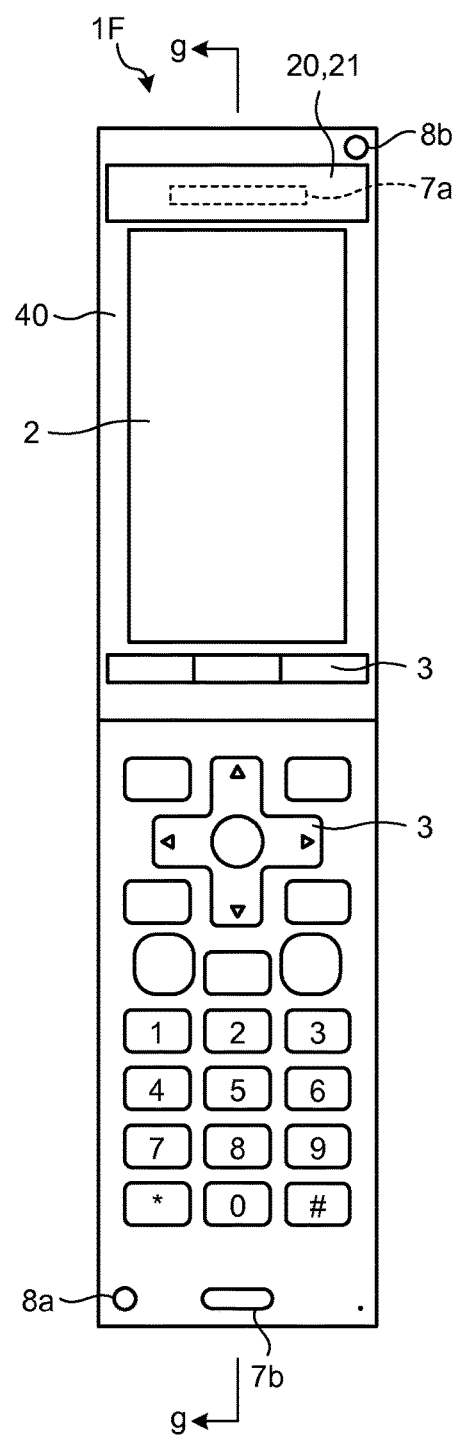
FIG. 32 is a front view of a mobile phone according to a ninth embodiment.
Figure 33:
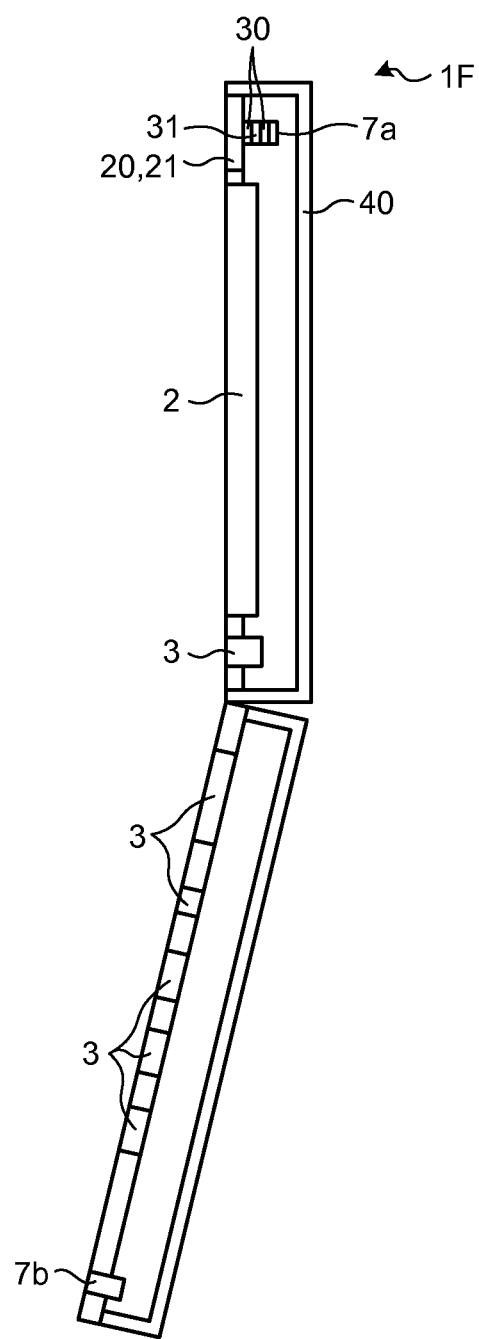
FIG. 33 is a sectional view of the mobile phone along line g-g in FIG. 32.

While the touch screen 21 is arranged with at least a part thereof overlapping with the display 2 in the seventh and the eighth embodiments, the touch screen 21 may be arranged in a manner not overlapping with the display 2. FIG. 32 is a front view of a mobile phone according to a ninth embodiment. FIG. 33 is a sectional view of the mobile phone along line g-g in FIG. 32. The following describes a mobile phone 1F in which a touch screen 21 is arranged in a manner not overlapping with the display 2 with reference to FIG. 32 and FIG. 33.

In the mobile phone 1F, the display 2 is arranged side by side with the panel 20 not on the inner-side surface of the panel 20 but on the same plane as that of the panel 20 as illustrated in FIG. 32 and FIG. 33.

A piezoelectric element 7a is attached to substantially the center of the back surface of the panel 20 with a joining member 30. A reinforcing member 31 is arranged between the panel 20 and the piezoelectric element 7a. The reinforcing member 31 is a resin plate, sheet metal, or a plate including glass fibers, for example. In other words, the piezoelectric element 7a and the reinforcing member 31 are bonded by the joining member 30 in the mobile phone 1F, and the reinforcing member 31 and the panel 20 are bonded by the joining member 30. The piezoelectric element 7a is not necessarily arranged at the center of the panel 20.

The reinforcing member 31 is an elastic member made of rubber or silicon, for example. The reinforcing member 31 may be a metal plate made of aluminum having a certain degree of elasticity, for example. The reinforcing member 31 may be a stainless plate of SUS304, for example. The thickness of the metal plate, such as a stainless plate, appropriately varies from 0.2 mm to 0.8 mm depending on the value of the voltage applied to the piezoelectric element 7a, for example. The reinforcing member 31 may be a resin plate, for example. Examples of the resin forming the resin plate include, but are not limited to, polyamide resin. Examples of the polyamide resin include, but are not limited to, Reny (registered trademark) made of crystalline thermoplastic resin composed of m-xylylenediamine and adipic acid and having sufficient strength and elasticity. Such polyamide resin may be reinforced resin reinforced with glass fibers, metal fibers, or carbon fibers using itself as a base polymer, for example. The strength and the elasticity of the reinforced resin are appropriately adjusted depending on the amount of glass fibers, metal fibers, or carbon fibers added to the polyamide resin, for example. The reinforced resin is formed by impregnating resin into a base material made of knitted glass fibers, metal fibers, or carbon fibers and then curing the resin, for example. Alternatively, the reinforced resin may be formed by mixing finely cut fiber pieces into liquid resin and then curing the resin. Still alternatively, the reinforced resin may be formed by laminating a base material made of knitted fibers and a resin layer.

Arrangement of the reinforcing member 31 between the piezoelectric element 7a and the panel 20 provides the following advantageous effects. When external force is applied to the panel 20, the reinforcing member 31 can reduce the possibility of the external force being transmitted to the piezoelectric element and damaging it. When the mobile phone 1F is dropped to the ground and external force is applied to the panel 20, the external force is transmitted to the reinforcing member 31 first. Because the reinforcing member 31 has a predetermined degree of elasticity, the reinforcing member 31 is elastically deformed by the external force transmitted from the panel 20. Thus, the reinforcing member 31 absorbs at least a part of the external force applied to the panel 20, thereby reducing the external force transmitted to the piezoelectric element 7a. This can reduce the possibility of the piezoelectric element 7a being damaged. If the reinforcing member 31 is arranged between the piezoelectric element 7a and the housing 40, the reinforcing member 31 can reduce the possibility of the deformed housing 40 bumping into the piezoelectric element 7a and damaging it when the mobile phone 1F is dropped to the ground and a housing 40 is deformed.

The vibration caused by expansion and contraction or bending of the piezoelectric element 7a is transmitted to the reinforcing member 31 first and then to the panel 20. In other words, the piezoelectric element 7a vibrates the reinforcing member 31 having a larger elastic coefficient than that of the piezoelectric element 7a first and then vibrates the panel 20. Thus, the mobile phone 1F can suppress excessive deformation of the piezoelectric element 7a compared with a structure in which the piezoelectric element 7a is joined to the panel 20 by the joining member 30 without the reinforcing member 31. This makes it possible to adjust the amount of deformation (the degree of deformation) of the panel 20. The structure according to the present embodiment is effectively used particularly when the panel 20 has difficulty in preventing deformation of the piezoelectric element 7a.

Figure 34:
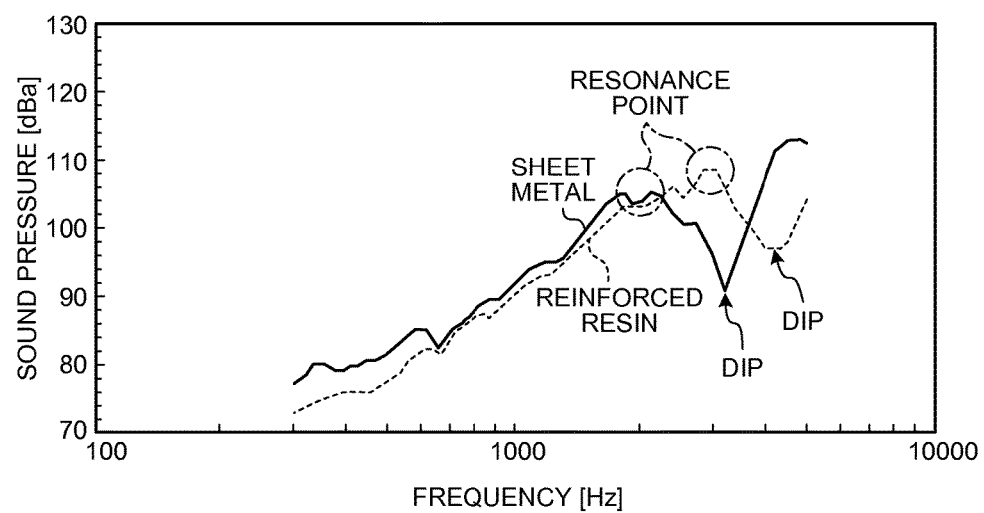
FIG. 34 is a diagram of an example of a change in frequency characteristics caused by a reinforcing member.

Furthermore, the reinforcing member 31 arranged between the piezoelectric element 7a and the panel 20 lowers the resonance frequency of the panel 20, thereby increasing the acoustic characteristics at a low frequency band as illustrated in FIG. 34. FIG. 34 is a diagram of an example of a change in the frequency characteristics caused by the reinforcing member 31. FIG. 34 illustrates the frequency characteristics obtained when sheet metal, such as SUS304, is used as the reinforcing member 31 and the frequency characteristics obtained when reinforced resin, such as Reny, is used as the reinforcing member 31. The abscissa represents the frequency, whereas the ordinate represents the sound pressure. The resonance point in the case of the reinforced resin is approximately 2 kHz, whereas the resonance point in the case of the sheet metal is approximately 1 kHz. The dip in the case of the reinforced resin is approximately 4 kHz, whereas the dip in the case of the sheet metal is approximately 3 kHz. In other words, when the reinforced resin is used, the resonance point of the panel 20 is positioned in a higher frequency domain, and the dip of the frequency characteristics is positioned in a higher frequency domain than those in the case where the sheet metal is used. The frequency band used for a voice call of a mobile phone falls within a range from 300 Hz to 3.4 kHz. Thus, the use of the reinforced resin as the reinforcing member 31 can prevent the dip from being included in the frequency band used by the mobile phone 1F. Even when the sheet metal is used as the reinforcing member 31, it is possible to prevent the dip from being included in the frequency band used by the mobile phone 1F by appropriately adjusting the types or the composition of the metals constituting the sheet metal or the thickness of the sheet metal, for example. In comparison between the sheet metal and the reinforced resin, the reinforced resin can reduce an influence on the antenna performance compared with the sheet metal. Because the reinforced resin is hardly plastically deformed compared with the sheet metal, the reinforced resin has an advantageous effect of making the acoustic characteristics less likely to change. The reinforced resin can suppress a rise in temperature occurring when a sound is generated compared with the sheet metal. Instead of the reinforcing member 31, a plate-like weight may be attached to the piezoelectric element 7a with the joining member 30.

When an electrical signal is applied to the piezoelectric element 7a, the panel 20 vibrates in association with deformation (expansion and contraction or bending) of the piezoelectric element 7a. Thus, the panel 20 generates an air conduction sound and a vibration sound transmitted via a part of the human body (e.g., the auricular cartilage) in contact with the panel 20. The touch screen 21 is arranged in a manner covering substantially the entire front surface of the panel 20.

Similarly to the seventh and the eighth embodiments, the mobile phone 1F also includes a dynamic receiver 7b at an end opposite to an end 40a where the piezoelectric element 7a is arranged. A first microphone 8a is arranged near the dynamic receiver 7b. A second microphone 8b is arranged near the piezoelectric element 7a.

Also in the mobile phone 1F, the dynamic receiver 7b is provided to an end opposite to the end where the piezoelectric element 7a is arranged on a surface of the housing 40. Thus, the mobile phone 1F can output a voice in the two modes similarly to the seventh and the eighth embodiments and output the voice in a manner suitable for the user.

The embodiments disclosed in the present application may include matters apparent to those skilled in the art, and various changes and modifications may be made without departing from the spirit and scope of the invention. The embodiments and the modifications disclosed in the present application may be combined as appropriate. The embodiments above, for example, may be modified as follows.

The computer programs illustrated in FIG. 26, for example, may be divided into a plurality of modules or combined with other computer programs.

While the piezoelectric element 7a and the dynamic receiver 7b are arranged at one end and the other end, respectively, of the housing 40 in the seventh to the ninth embodiments, the embodiments are not limited thereto. In the mobile phones, the piezoelectric element 7a and the dynamic receiver 7b may be arranged close to each other.

While the microphones 8a and 8b are arranged near the dynamic receiver 7b and the piezoelectric element 7a, respectively, in the seventh to the ninth embodiments, the embodiments are not limited thereto. The mobile phones may use the same microphone as a receiving microphone. In this case, the mobile phones may include a single microphone alone. The mobile phones may further include another microphone used for noise cancellation both in the first mode and the second mode. In the seventh to the ninth embodiments, the first microphone 8a and the second microphone 8b are not necessarily used for noise cancellation.

While the piezoelectric element 7a and the dynamic receiver 7b are arranged near the respective ends in the longitudinal direction of the housing 40 in the seventh to the ninth embodiments, the embodiments are not limited thereto. The piezoelectric element 7a and the dynamic receiver 7b may be arranged near respective ends in the short direction of the housing 40. In the case of the housing 40 having not a rectangular shape but a square shape, the piezoelectric element 7a and the dynamic receiver 7b may be arranged near respective ends opposite to each other.

While the first microphone 8a and the second microphone 8b are arranged at respective positions on a diagonal line on the principal surface of the housing 40 in the seventh to the ninth embodiments, the embodiments are not limited thereto. The first microphone 8a and the second microphone 8b may be arranged at the same end in the short direction on a surface of the housing 40.

While it is determined whether to perform the first mode or the second mode based on the orientation of the mobile phones in the seventh to the ninth embodiments, the embodiments are not limited thereto. The mobile phones may determine the mode based on control conditions other than the orientation. The mobile phones may determine whether to perform the first mode or the second mode based on a voice or an input operation, for example.

The mobile phones may detect the shape or the orientation and the position of the ear with the touch screen 21, thereby determining whether to perform the first mode or the second mode based on the shape or the orientation and the position of the ear, for example. The mobile phones may determine the mode so as to output a voice using a receiver to which the upper part of the ear is directed, for example.

In the example above, the shape or the orientation and the position of the ear in contact with the panel 20 are detected using the touch screen 21. The detecting unit that detects the position of an object is not limited to the touch screen 21. The detecting unit that detects the position of an object may be the camera 12, for example. In this case, the position of an object is detected based on an image acquired by the camera 12.

In the mobile phone 1D according to the seventh embodiment, the display 2 is attached to the back surface of the panel 20 with the joining member 30. The mobile phone 1D may have a space between the panel 20 and the display 2. The space formed between the panel 20 and the display 2 facilitates vibration of the panel 20, thereby increasing the range in which the vibration sound is easy to hear on the panel 20.

While the piezoelectric element 7a is attached to the panel 20 in the seventh to the ninth embodiments, the piezoelectric element 7a may be attached to another position. The piezoelectric element 7a may be attached to a battery lid, for example. The battery lid is a member attached to the housing 40 to cover a battery. The battery lid is frequently attached to a surface different from that on the display 2 side in a mobile electronic device including a mobile phone. This configuration enables the user to listen to a sound by bringing a part of the body (e.g., the ear) into contact with the surface different from that on the display 2 side.

In the mobile phones, the piezoelectric element 7a may vibrate a corner of the housing 40 (e.g., at least one of the four corners). In this case, the piezoelectric element 7a may be attached to the inner surface of the corner of the housing 40. Alternatively, an intermediate member may be provided, and vibration of the piezoelectric element 7a may be transmitted to the corner of the housing 40 via the intermediate member. This configuration can make the range of vibration relatively small, thereby making an air conduction sound generated by the vibration less likely to leak to the surroundings. This configuration enables the user to receive the air conduction sound and the vibration sound by inserting the corner of the housing into the external auditory meatus, for example. This can make ambient noise less likely to enter the external auditory meatus of the user, thereby improving the quality of the sound transmitted to the user.

While the reinforcing member 31 is a plate-like member in the ninth embodiment, the shape of the reinforcing member 31 is not limited thereto. The reinforcing member 31 may be larger than the piezoelectric element 7a and have a shape whose end is curved toward the piezoelectric element 7a to cover the side portion of the piezoelectric element 7a, for example. The reinforcing member 31 may include a plate-like portion and an extended portion extended from the plate-like portion to cover the side portion of the piezoelectric element 7a, for example. In this case, the extended portion and the side portion of the piezoelectric element 7a are preferably separated from each other by a predetermined distance. This can make the extended portion less likely to prevent deformation of the piezoelectric element.

The panel 20 may be a part or all of any one of a display panel, an operation panel, a cover panel, and a lid panel that makes a rechargeable battery detachable. In the case of the panel 20 serving as a display panel, the piezoelectric element 7a is arranged outside of a display area for a display function. This configuration is less likely to obstruct display. The operation panel includes a touch panel. The operation panel further includes a sheet key, which is a member serving as a surface on the operating unit side of the housing integrated with key tops of operation keys in a folding mobile phone, for example.

In the description above, the joining member that bonds the panel 20 and the piezoelectric element 7a and the joining member that bonds the panel 20 and the housing 40 are referred to as the joining member 30 assigned with the same reference numeral. The joining members, however, may be different from each other as needed depending on the members to be joined. While the dynamic speaker serves as the second sound generating unit in the embodiments above, the second sound generating unit may be the panel 20 and a second piezoelectric element attached to the panel and different from the piezoelectric element 7a. In this case, the second piezoelectric element may be arranged at an end opposite to the end where the piezoelectric element 7a is provided in the longitudinal direction of the panel 20.

Tenth Embodiment

Figure 35:
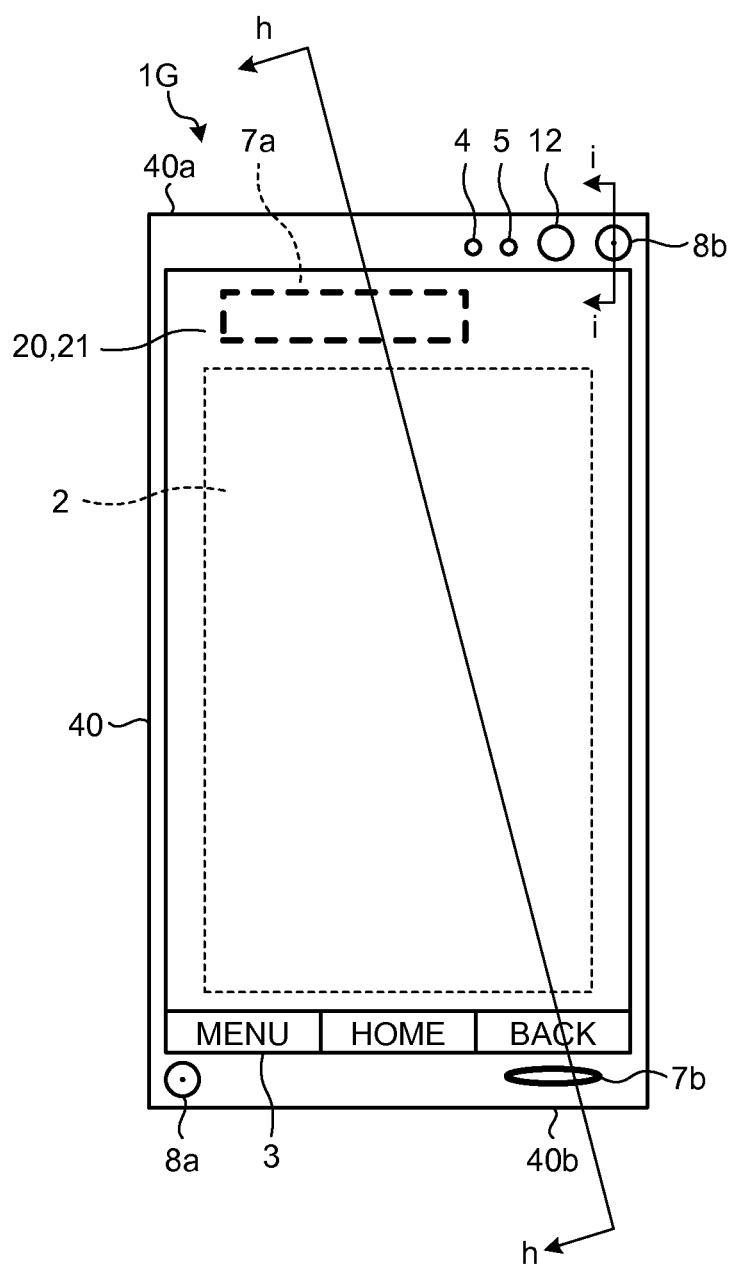
FIG. 35 is a front view of a mobile phone according to a tenth embodiment.
Figure 36:
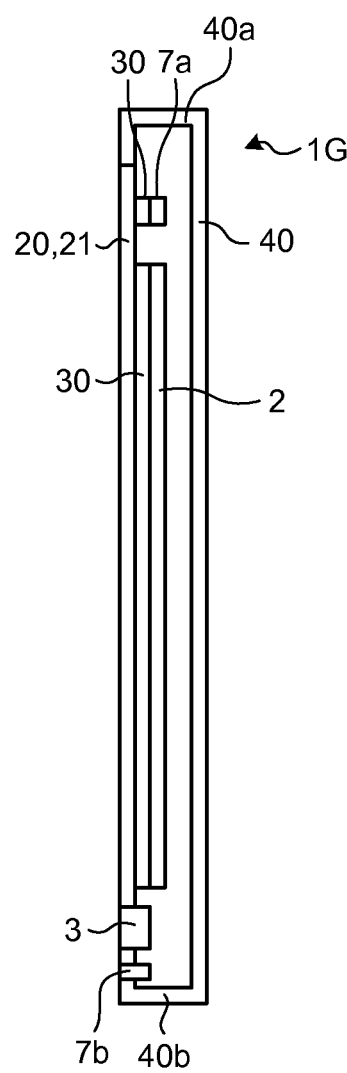
FIG. 36 is a sectional view of the mobile phone along line h-h in FIG. 35.

The following describes an overall configuration of a mobile phone 1G according to a tenth embodiment with reference to FIG. 35 and FIG. 36. FIG. 35 is a front view of the mobile phone 1G according to the tenth embodiment. FIG. 36 is a sectional view of the mobile phone 1G along line h-h in FIG. 35. As illustrated in FIG. 35 and FIG. 36, the mobile phone 1G includes a display 2, buttons 3, an illuminance sensor 4, a proximity sensor 5, a piezoelectric element 7a, a dynamic receiver (a second sound generating unit) 7b, a first microphone 8a, a second microphone 8b, a camera 12, a panel (a first sound generating unit) 20, and a housing 40.

The display 2 includes a display device, such as an LCD, an GELD, and an IELD. The display 2 displays a character, an image, a symbol, and a figure, for example.

The buttons 3 receive an operation input from the user. The number of buttons 3 is not limited to that in the example illustrated in FIG. 35 and FIG. 36.

The illuminance sensor 4 detects the illuminance of light surrounding the mobile phone 1G. The illuminance indicates the intensity, the brightness, or the luminance of light. The illuminance sensor 4 is used to adjust the luminance of the display 2, for example. The proximity sensor 5 detects the presence of a contiguous object in a non-contact manner. The proximity sensor 5 detects the presence of the object based on a change in a magnetic field or a change in a returning time of reflected waves of ultrasonic waves, for example. The proximity sensor 5, for example, detects that the display 2 is brought closer to the face. The illuminance sensor 4 and the proximity sensor 5 may be integrated as a single sensor. The illuminance sensor 4 may be used as a proximity sensor.

When an electrical signal (a voltage corresponding to a sound signal) is applied, the piezoelectric element 7a expands and contracts or bends based on the electromechanical coupling coefficient of the constituent material. In other words, the piezoelectric element 7a deforms when an electrical signal is applied thereto. The piezoelectric element 7a is attached to the panel 20 and is used as a vibration source to vibrate the panel 20. The piezoelectric element 7a is formed of ceramics or crystals, for example. The piezoelectric element 7a may be a unimorph, a bimorph, or a laminated piezoelectric element. Examples of the laminated piezoelectric element include, but are not limited to, a laminated bimorph element obtained by laminating bimorphs (e.g., 16 layers or 24 layers of bimorphs). The laminated piezoelectric element has a laminated structure including a plurality of dielectric layers made of lead zirconate titanate (PZT) and electrode layers each arranged between the dielectric layers. The unimorph expands and contracts when an electrical signal (a voltage) is applied thereto. The bimorph bends when an electrical signal (a voltage) is applied thereto.

The dynamic receiver 7b is a sound output unit that outputs a sound by the air conduction method. The dynamic receiver 7b can transmit a sound obtained by converting an electrical signal to a person who does not bring the ear into contact with the mobile phone 1G. The dynamic receiver 7b is a mechanism that outputs a voice by vibrating a diaphragm with a voice coil. The dynamic receiver 7b mainly includes a permanent magnet, the voice coil, and the diaphragm. When an electrical signal (a voltage corresponding to a sound signal) is applied to the voice coil in the dynamic receiver 7b, the voice coil serves as an electromagnet and vibrates in a predetermined direction with respect to the permanent magnet. The dynamic receiver 7b vibrates the voice coil, thereby vibrating the diaphragm coupled to the voice coil. Vibration of the diaphragm vibrates ambient air, thereby transmitting a sound to the surroundings. The dynamic receiver 7b serves as a receiver that outputs a telephone conversation voice in a state where the user presses the ear against the housing 40 in the telephone conversation. The dynamic receiver 7b also serves as a speaker that outputs a voice with a sufficient output to enable the user who keeps the ear away from the housing 40 to listen to a sound. The dynamic receiver 7b is used to output a ringtone and a telephone conversation voice in a speaker phone mode, for example.

The first microphone 8a and the second microphone 8B serve as sound input units. The first microphone 8a and the second microphone 8b convert a received sound into an electrical signal.

The camera 12 is an in-camera that photographs an object facing the display 2. The camera 12 converts the image obtained by the photographing into an electrical signal. The mobile phone 1G may include an out-camera that photographs an object facing the surface opposite to the display 2 besides the camera 12.

The panel 20 vibrates in association with deformation (expansion and contraction or bending) of the piezoelectric element 7a and transmits the vibration to the cartilage of the ear (e.g., the auricular cartilage) or the like brought into contact with the panel 20 by the user as sound vibration. The panel 20 also has a function to protect the display 2, the piezoelectric element 7a, and other components from external force. The panel 20 is made of glass or synthetic resin, such as acrylic, and has a plate shape, for example. The panel 20 may be a flat plate or a curved panel having a smoothly curved surface.

The display 2 and the piezoelectric element 7a are attached to the back surface of the panel 20 with a joining member 30. The piezoelectric element 7a are arranged on the back surface of the panel 20 in a manner separated from the inner surface of the housing 40 by a predetermined distance. The piezoelectric element 7a is preferably separated from the inner surface of the housing 40 even when it expands and contracts or bends. In other words, the distance between the piezoelectric element 7a and the inner surface of the housing 40 is preferably larger than the maximum deformation amount of the piezoelectric element 7a. The piezoelectric element 7a may be attached to the panel 20 via a reinforcing member (e.g., sheet metal or glass fiber reinforced resin). The joining member 30 is a double-sided tape or a thermosetting or ultraviolet curable adhesive, for example. The joining member 30 may be optical elastic resin, which is a colorless and transparent acrylic ultraviolet curable adhesive.

The display 2 is arranged at substantially the center of the panel 20 in the short direction. The piezoelectric element 7a is arranged at a position away from an end of the panel 20 in the longitudinal direction by a predetermined distance such that the longitudinal direction of the piezoelectric element 7a is parallel to the short direction of the panel 20. The display 2 and the piezoelectric element 7a are arranged side by side and parallel to each other on the inner-side surface of the panel 20.

Substantially the entire outer-side surface of the panel 20 is provided with a touch screen (a touch sensor) 21. The touch screen 21 detects a contact on the panel 20. The touch screen 21 is used to detect a contact operation performed by the user with a finger, a pen, or a stylus pen, for example. Examples of the gesture detected by the touch screen 21 include, but are not limited to, a touch, a long touch, a release, a swipe, a tap, a double-tap, a long tap, a drag, a flick, a pinch-in, and a pinch-out. The touch screen 21 may employ a desired detection system, including a capacitive system, a resistance film system, a surface acoustic wave system (or an ultrasonic wave system), an infrared system, an electromagnetic induction system, and a load detecting system.

The touch screen 21 is also used to detect the auricular cartilage or the like coming into contact with the panel 20 to listen to a sound.

The housing 40 is made of resin or metal. The housing 40 supports the buttons 3, the illuminance sensor 4, the proximity sensor 5, the dynamic receiver 7b, the first microphone 8a, the second microphone 8b, the camera 12, and the panel 20, for example. The housing 40 supports the piezoelectric element 7a via the panel 20.

The layout of the units arranged in the housing 40 will be described. The following particularly describes the arrangement of the piezoelectric element 7a, the dynamic receiver 7b, the first microphone 8a, and the second microphone 8b. In the mobile phone 1G, the housing 40 has a nearly rectangular parallelepiped shape with a small thickness. In the mobile phone 1G, the display 2 and the panel 20 are arranged in an overlapping manner on a surface of the housing 40. In the mobile phone 1G, the piezoelectric element 7a and the dynamic receiver 7b are arranged at positions facing each other with the display 2 and the panel 20 interposed therebetween on the surface of the housing 40. Specifically, the piezoelectric element 7a is arranged on a first end 40a side, which is one end of the surface of the housing 40 in the longitudinal direction. The dynamic receiver 7b is arranged on a second end 40b side, which is the other end of the surface of the housing 40 in the longitudinal direction. The surface of the housing 40 according to the present embodiment has a rectangular shape. The ends 40a and 40b, which are the ends in the longitudinal direction, correspond to short sides. Thus, in the mobile phone 1G, the piezoelectric element 7a is arranged at the first end 40a of the housing 40, whereas the dynamic receiver 7b is arranged at the second end 40b of the housing 40. Furthermore, the piezoelectric element 7a is arranged from the center of the surface of the housing 40 to a position near one end in the short direction. The dynamic receiver 7b is arranged at the other end of the surface of the housing 40 in the short direction. The piezoelectric element 7a and the dynamic receiver 7b are arranged at the different ends of the surface of the housing 40 also in the short direction. In other words, the piezoelectric element 7a and the dynamic receiver 7b are arranged at the different ends of the surface of the housing 40 in the longitudinal direction and the short direction.

The mobile phone 1G has the illuminance sensor 4, the proximity sensor 5, the camera 12, and the second microphone 8b on the first end 40a side of the housing 40, that is, near the piezoelectric element 7a. The mobile phone 1G has the first microphone 8a on the second end 40b side of the housing 40. Thus, in the mobile phone 1G, the second microphone 8b is arranged at the first end 40a of the housing 40, whereas the first microphone 8a is arranged at the second end 40b of the housing 40. Consequently, the first microphone 8a is arranged at the end 40b opposite to the end 40a at which the piezoelectric element 7a is arranged. The second microphone 8b is arranged at the end 40a opposite to the end 40b at which the dynamic receiver 7b is arranged. The first microphone 8a and the second microphone 8b are arranged at different ends of the surface of the housing 40 also in the short direction. In other words, the first microphone 8a and the second microphone 8b are arranged near respective corners positioned farthest away from each other on a diagonal line on the surface of the housing 40.

Figure 37:
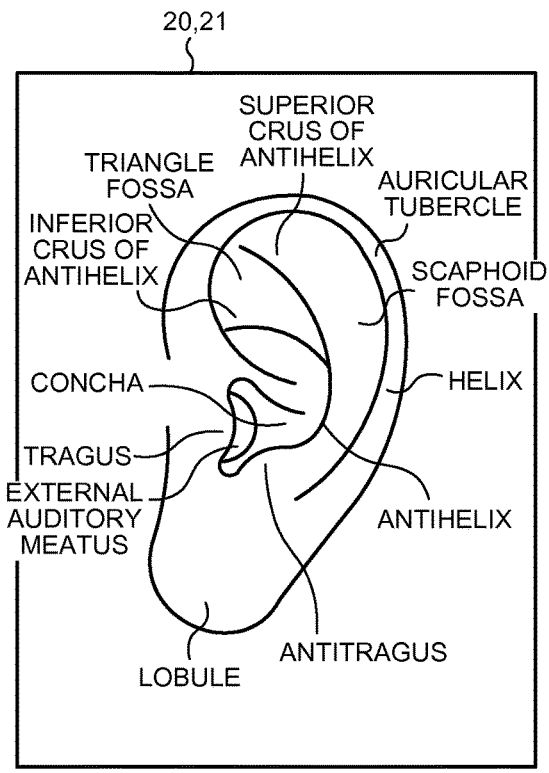
FIG. 37 is a schematic of an example of the shape of the panel.
Figure 38:
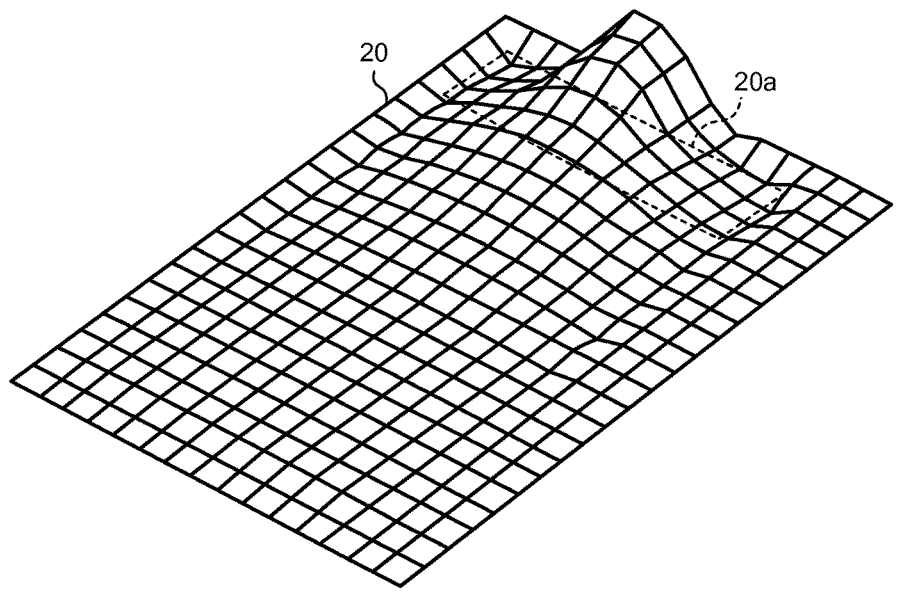
FIG. 38 is a schematic of an example of vibration of the panel.

The following describes output of a sound performed by the mobile phone 1G according to the tenth embodiment in greater detail with reference to FIG. 35 to FIG. 38. FIG. 37 is a schematic of an example of the shape of the panel 20. FIG. 38 is a schematic of an example of vibration of the panel 20.

The piezoelectric element 7a is supplied with an electrical signal corresponding to a sound to be output. The piezoelectric element 7a may be supplied with a voltage of ±15 V, which is higher than a voltage of ±5 V applied to what is called a panel speaker that transmits a sound as an air conduction sound traveling through an external auditory meatus, for example. This enables the panel 20 to generate sufficient vibration even when the user presses a part of the body against the panel 20 with force of equal to or larger than 3 N (force of 5 N to 10 N), for example. Thus, the panel 20 can generate a vibration sound transmitted via the part of the body of the user. The voltage applied to the piezoelectric element 7a can be appropriately adjusted depending on the fixing strength of the panel 20 to the housing 40 or the performance of the piezoelectric element 7a, for example.

Application of an electrical signal causes the piezoelectric element 7a to expand and contract or bend in the longitudinal direction. The panel 20 to which the piezoelectric element 7a is attached deforms in association with expansion and contraction or bending of the piezoelectric element 7a. This causes the panel 20 to vibrate and generate an air conduction sound. Furthermore, when the user brings a part of the body (e.g., the auricular cartilage) into contact with the panel 20, the panel 20 generates an air conduction sound and a vibration sound conducted to the user via the part of the body. In other words, the panel 20 vibrates with respect to by an object in contact with the panel 20 in association with the deformation of the piezoelectric element 7a at a frequency such that the vibration is sensed as a vibration sound. The panel 20 is curved by expansion and contraction or bending of the piezoelectric element 7a. The panel 20 is directly bent by the piezoelectric element 7a. The phenomenon that "the panel 20 is directly bent by the piezoelectric element" is different from the phenomenon that a specific area of the panel is vibrated by inertial force of a piezoelectric actuator, which includes a piezoelectric element arranged in a casing as employed in a conventional panel speaker, and thereby a panel is deformed. The fact that "the panel 20 is directly bent by the piezoelectric element" means that expansion and contraction or bending (curve) of the piezoelectric element directly bends the panel via the joining member or via the joining member and a reinforcing member 31, which will be described later.

When an electrical signal corresponding to sound data of a voice of a communication partner in a telephone conversation, a ringtone, or music is applied to the piezoelectric element 7a, for example, the panel 20 generates an air conduction sound and a vibration sound corresponding to the electrical signal. The sound signal output via the piezoelectric element 7a and the panel 20 may be based on sound data stored in a storage 9, which will be described later. Alternatively, the sound signal output via the piezoelectric element 7a and the panel 20 may be based on sound data stored in an external server or the like and acquired via a network by a communication unit 6, which will be described later.

In the present embodiment, the panel 20 may have substantially the same size as that of the ear of the user. Alternatively, the panel 20 may have a size larger than that of the ear of the user as illustrated in FIG. 37. This enables the user to bring substantially the entire outer rim of the ear into contact with the panel 20 to listen to a sound. Listening to a sound in this manner can make an ambient sound (noise) less likely to enter the external auditory meatus. In the present embodiment, the panel 20 vibrates in at least a larger area than an area having the length in the longitudinal direction (or the short direction) corresponding to the distance from the lower crus of the antihelix (inferior crus of the antihelix) of a human to the antitragus and the length in the short direction (or the longitudinal direction) corresponding to the distance from the tragus to the antihelix. Alternatively, the panel 20 may vibrate in an area having the length in the longitudinal direction (or the short direction) corresponding to the distance from a part near the upper crus of the antihelix (superior crus of the antihelix) in the helix to the lobule and the length in the short direction (or the longitudinal direction) corresponding to the distance from the tragus to a part near the antihelix in the helix. The area having the length and the width described above may be a rectangular area or an elliptical area having the length in the longitudinal direction described above as the major axis and the length in the short direction as the minor axis. The average size of a human ear can be understood by referring to the Japanese body size database (1992 to 1994) by the Research Institute of Human Engineering for Quality Life (HQL), for example.

As illustrated in FIG. 38, the panel 20 vibrates not only in an attachment area 20a to which the piezoelectric element 7a is attached but also in an area away from the attachment area 20a. The panel 20 has a plurality of points that vibrate in a direction intersecting with the principal surface of the panel 20 in the vibration area. In each of the points, the value of amplitude of the vibration changes from plus to minus or minus to plus with time. The panel 20 generates vibration as follows: portions having relatively large amplitude of vibration and portions having relatively small amplitude of vibration are distributed seemingly at random or regularly on substantially the whole of the panel 20 at each moment. In other words, a plurality of vibration waves are detected all over the panel 20. Applying a voltage of ±15 V to the piezoelectric element 7a as described above can make the vibration of the panel 20 less likely to attenuate even when the user presses the panel 20 against the body with force of 5 N to 10 N, for example. This enables the user to listen to the vibration sound even when the user brings the ear into contact with an area away from the attachment area 20a on the panel 20. An upper portion of the panel 20 is directly bent by the piezoelectric element 7a, and the vibration attenuates in a lower portion compared with the upper portion. The panel 20 is bent by the piezoelectric element 7a such that an area just above the piezoelectric element 7a with respect to the long-side direction of the piezoelectric element 7a protrudes the most compared with the peripheral area.

In the present embodiment, the display 2 is attached to the panel 20. With this configuration, a lower portion (the side to which the display 2 is attached) of the panel 20 has higher rigidity. Thus, the lower portion generates smaller vibration than that generated by an upper portion (the side to which the piezoelectric element 7a is attached) of the panel 20. This can reduce sound leakage of an air conduction sound caused by the vibration of the panel 20 at the lower portion of the panel 20.

With vibration of the panel 20, the mobile phone 1G can transmit a sound as an air conduction sound and a vibration sound traveling via a part of the body of the user (e.g., the auricular cartilage) to the user. Thus, when outputting a sound at a volume equivalent to that of the dynamic receiver 7b, the mobile phone 1G can reduce the amount of sound transmitted to the surroundings of the mobile phone 1G with vibration of the air compared with an electronic device including a dynamic speaker alone. This feature is effectively used to listen to a recorded message in a place where other people are present nearby like the inside of a train, for example.

Furthermore, the mobile phone 1G transmits the vibration sound to the user with the vibration of the panel 20. Thus, even when the user wears earphones or headphones, the user brings the mobile phone 1G into contact with the earphones or headphones, thereby listening to the vibration sound caused by the vibration of the panel 20 via the earphones or headphones and a part of the body.

Furthermore, the mobile phone 1G transmits a sound with the vibration of the panel 20. Thus, it is not necessary to form an opening (a sound emitting port) used to transmit the sound generated by the panel 20 to the outside in the housing 40. This can simplify the structure in terms of waterproofing. To make the structure waterproof, the mobile phone 1G may block an opening including a sound emitting port of the dynamic receiver 7b with a member that allows a gas to pass therethrough but not a liquid. Examples of the member that allows a gas to pass therethrough but not a liquid include, but are not limited to, Gore-Tex (registered trademark).

Figure 39:
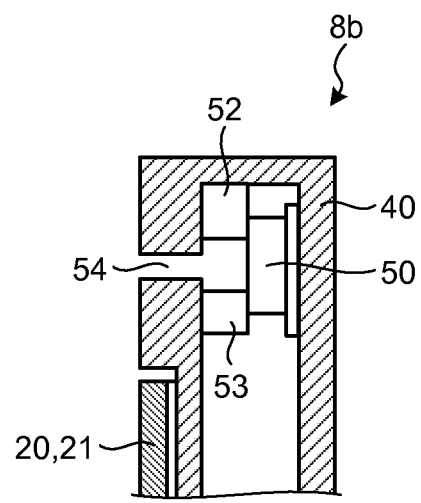
FIG. 39 is a sectional view of the mobile phone along line i-i in FIG. 35.

The configuration of the second microphone 8b will be described with reference to FIG. 39. While the following describes the second microphone 8b with reference to FIG. 39, the first microphone 8a has the same configuration. FIG. 39 is a sectional view of the mobile phone 1G along line i-i in FIG. 35. The second microphone 8b is arranged in the housing 40. The second microphone 8b includes a microphone main body 50 and sound insulating members 52 and 53. The housing 40 has a microphone hole 54 in the surface on which the panel 20 and the touch screen 21 are arranged. The microphone hole 54 is formed at a position facing the microphone main body 50. The microphone hole 54 communicates a space near the microphone main body 50 in the housing 40 and a space outside of the housing 40. A sound traveling in the space outside of the housing 40 reaches the microphone main body 50 through the microphone hole 54.

The microphone main body 50 is a portion that collects a sound, that is, detects a sound. The microphone main body 50 is arranged at a position facing the microphone hole 54 in the housing 40. The microphone main body 50 is arranged at a position separated from the microphone hole 54. The sound insulating member 52 is arranged between the microphone main body 50 and the microphone hole 54 in the housing 40. The sound insulating member 52 is arranged so as to surround the space between the microphone main body 50 and the microphone hole 54 and blocks the space between the microphone main body 50 and the microphone hole 54 from the inside of the housing 40. Thus, the sound insulating member 52 makes a sound in the housing 40 less likely to reach the microphone main body 50. The second microphone 8b detects a sound that passes through the microphone hole 54 from the outside of the housing 40 and reaches the microphone main body 50.

While the microphone hole 54 is formed in the surface on which the panel 20 and the touch screen 21 are arranged in the housing 40 in FIG. 39, the embodiment is not limited thereto. The microphone hole 54 may be formed in a side surface of the housing 40, that is, a surface extending in the thickness direction of the housing 40.

Figure 40:
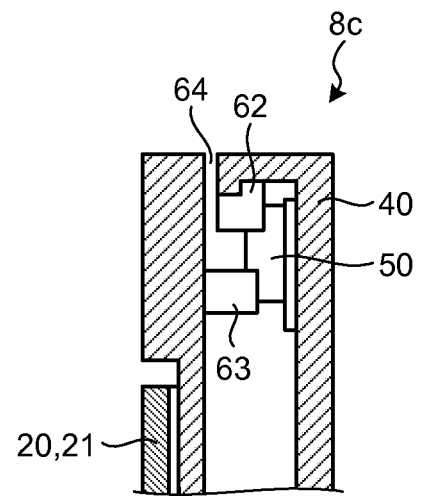
FIG. 40 is a sectional view schematically illustrating another configuration of a second microphone.

FIG. 40 is a sectional view schematically illustrating another configuration of the second microphone. A second microphone 8c illustrated in FIG. 40 is arranged in the housing 40. The second microphone 8c includes a microphone main body 50 and sound insulating members 62 and 63. The housing 40 has a microphone hole 64 in the side surface. The side surface of the housing 40 is connected to the surface on which the panel 20 and the touch screen 21 are arranged and serves as the end 40a in the longitudinal direction.

The microphone main body 50 is a portion that detects a sound. The microphone main body 50 is arranged on the side opposite to the surface on which the panel 20 and the touch screen 21 are arranged in the housing 40. The microphone main body 50 is arranged at a position not visible from the outside of the housing 40 through the microphone hole 64. The microphone main body 50 is arranged at a position separated from the microphone hole 64. The sound insulating members 62 and 63 are arranged between the microphone main body 50 and the microphone hole 64 in the housing 40. The sound insulating members 62 and 63 are arranged so as to surround the space between the microphone main body 50 and the microphone hole 64. The sound insulating members 62 and 63 block the space between the microphone main body 50 and the microphone hole 64 from the inside of the housing 40. Thus, the sound insulating members 62 and 63 make a sound in the housing 40 less likely to reach the microphone main body 50. The sound insulating members 62 and 63 guide a sound that passes through the microphone hole 64 to the microphone main body 50 arranged at the position not visible from the outside through the microphone hole 64. The second microphone 8c detects a sound that passes through the microphone hole 64 from the outside of the housing 40 and reaches the microphone main body 50. Because the microphone hole 64 is arranged in the side surface of the housing 40, the second microphone 8c is less likely to be blocked when it is used. This enables more reliable detection of a sound.

Figure 41:
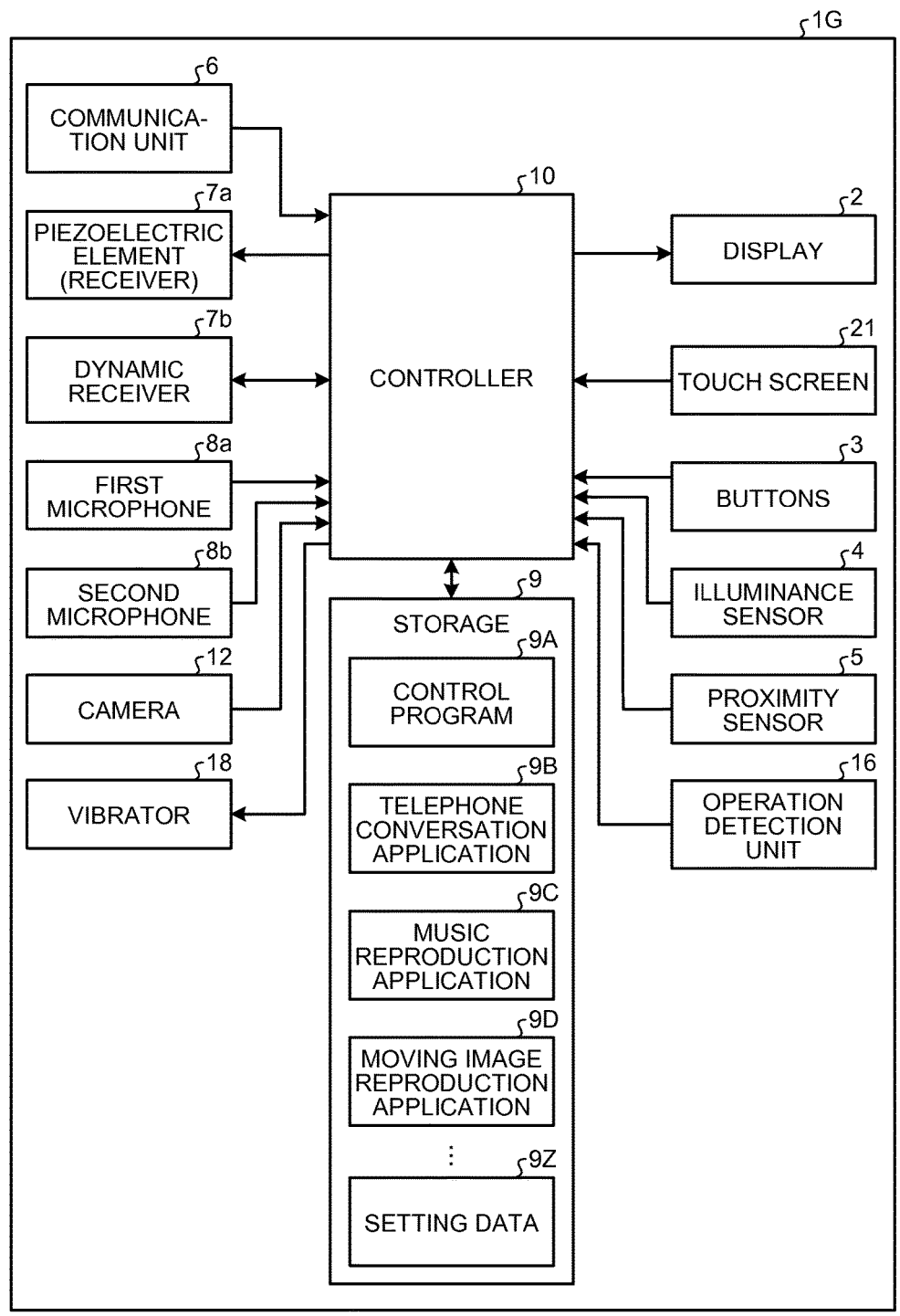
FIG. 41 is a block diagram of the mobile phone according to the tenth embodiment.

The following describes the functional configuration of the mobile phone 1G with reference to FIG. 41. FIG. 41 is a block diagram of the mobile phone 1G. As illustrated in FIG. 41, the mobile phone 1G includes the display 2, the buttons 3, the illuminance sensor 4, the proximity sensor 5, the communication unit 6, the piezoelectric element 7a, the dynamic receiver 7b, the first microphone 8a, the second microphone 8b, the storage 9, a controller 10, the camera 12, an operation detection unit 16, a vibrator 18, and the touch screen 21.

The communication unit 6 performs wireless communications. The communication unit 6 supports a communication method of a wireless communication standard. Examples of the wireless communication standard include, but are not limited to, a communication standard for a cellular phone of 2G, 3G, and/or 4G. Examples of the communication standard for a cellular phone include, but are not limited to, LTE, W-CDMA, CDMA 2000, PDC, GSM (registered trademark), and PHS. Examples of the wireless communication standard further include, but are not limited to, WiMAX, IEEE 802.11, Bluetooth (registered trademark), IrDA, and NFC. The communication unit 6 may support one or a plurality of the communication standards described above.

The storage 9 stores therein computer programs and data. The storage 9 is also used as a work area that temporarily stores therein a processing result of the controller 10. The storage 9 may include a desired non-transitory storage medium, such as a semiconductor storage medium and a magnetic storage medium. The storage 9 may include a plurality of types of storage media. The storage 9 may include a combination of a portable storage medium, such as a memory card, an optical disc, and a magneto-optical disc, and a reading device for the storage medium. The storage 9 may include a storage device used as a temporary storage area, such as a RAM.

The computer programs stored in the storage 9 include an application executed in the foreground or the background and a control program that supports the operation of the application. The application, for example, causes the display 2 to display a screen and then causes the controller 10 to perform processing corresponding to a gesture detected through the touch screen 21. The control program is an OS, for example. The application and the control program may be installed on the storage 9 via wireless communications performed by the communication unit 6 or a non-transitory storage medium.

The storage 9 stores therein a control program 9A, a telephone conversation application 9B, a music reproduction application 9C, a moving image reproduction application 9D, and setting data 9Z. The telephone conversation application 9B provides a telephone conversation function for a telephone conversation made via wireless communications. The music reproduction application 9C provides a music reproduction function to reproduce a sound from music data. The moving image reproduction application 9D provides a moving image reproduction function to reproduce a moving image and a sound from moving image data. The setting data 9Z includes information on various types of settings relating to the operation of the mobile phone 1G.

The control program 9A provides a function relating to various types of control to operate the mobile phone 1G. The control program 9A, for example, determines an operation performed by the user based on a contact detected by the touch screen 21, thereby activating a computer program corresponding to the determined operation. The function provided by the control program 9A includes a function to perform control for determining a control mode used to output a voice and a function to control the piezoelectric element 7a, the dynamic receiver 7b, the first microphone 8a, and the second microphone 8b based on the determined control mode. The function provided by the control program 9A may be combined with a function provided by other computer programs, such as the telephone conversation application 9B.

The controller 10 is a processing device. Examples of the processing device include, but are not limited to, a CPU, a SoC, a MCU, and a FPGA. The controller 10 integrally controls the operations of the mobile phone 1G, thereby providing various types of functions.

Specifically, the controller 10 executes instructions included in the computer programs stored in the storage 9 while referring to the data stored in the storage 9 as needed. The controller 10 controls functional units in accordance with the data and the instructions, thereby providing various types of functions. Examples of the functional units include, but are not limited to, the display 2, the communication unit 6, the piezoelectric element 7a, the dynamic receiver 7b, the first microphone 8a, the second microphone 8b, and the vibrator 18. The controller 10 may change the control based on a detection result of detecting units. Examples of the detecting units include, but are not limited to, the buttons 3, the illuminance sensor 4, the proximity sensor 5, the camera 12, the operation detection unit 16, and the touch screen 21.

The controller 10 executes the control program 9A, for example, thereby performing control for determining the control mode used to output a voice. The controller 10 executes the control program 9A, for example, thereby controlling the piezoelectric element 7a, the dynamic receiver 7*b*, the first microphone 8*a*, and the second microphone 8*b* based on the determined control mode.

The operation detection unit 16 detects a contact operation and a pressing operation performed on the mobile phone 1G, for example. The operation detection unit 16 includes a touch sensor or a key structure to detect an operation. The vibrator 18 vibrates a part or the whole of the mobile phone 1G. The vibrator 18 includes a piezoelectric element or an eccentric motor to generate vibration, for example. The vibration generated by the vibrator 18 is used not to transmit a sound but to inform the user of various types of events, such as an incoming call.

A part or all of the computer programs and the data stored in the storage 9 illustrated in FIG. 41 may be downloaded from other devices via wireless communications performed by the communication unit 6. Alternatively, a part or all of the computer programs and the data stored in the storage 9 illustrated in FIG. 41 may be stored in a non-transitory storage medium readable by the reading device included in the storage 9. Examples of the non-transitory storage medium include, but are not limited to, an optical disc, such as a CD (registered trademark), a DVD (registered trademark), and Blu-ray (registered trademark), a magneto-optical disc, a magnetic storage medium, a memory card, and a solid-state storage medium.

The configuration of the mobile phone 1G illustrated in FIG. 41 is given by way of example, and various changes may be made as needed without departing from the spirit of the present invention. The mobile phone 1G may include buttons in the numeric keypad layout or the QWERTY layout as buttons used for an operation, for example.

Figure 42:
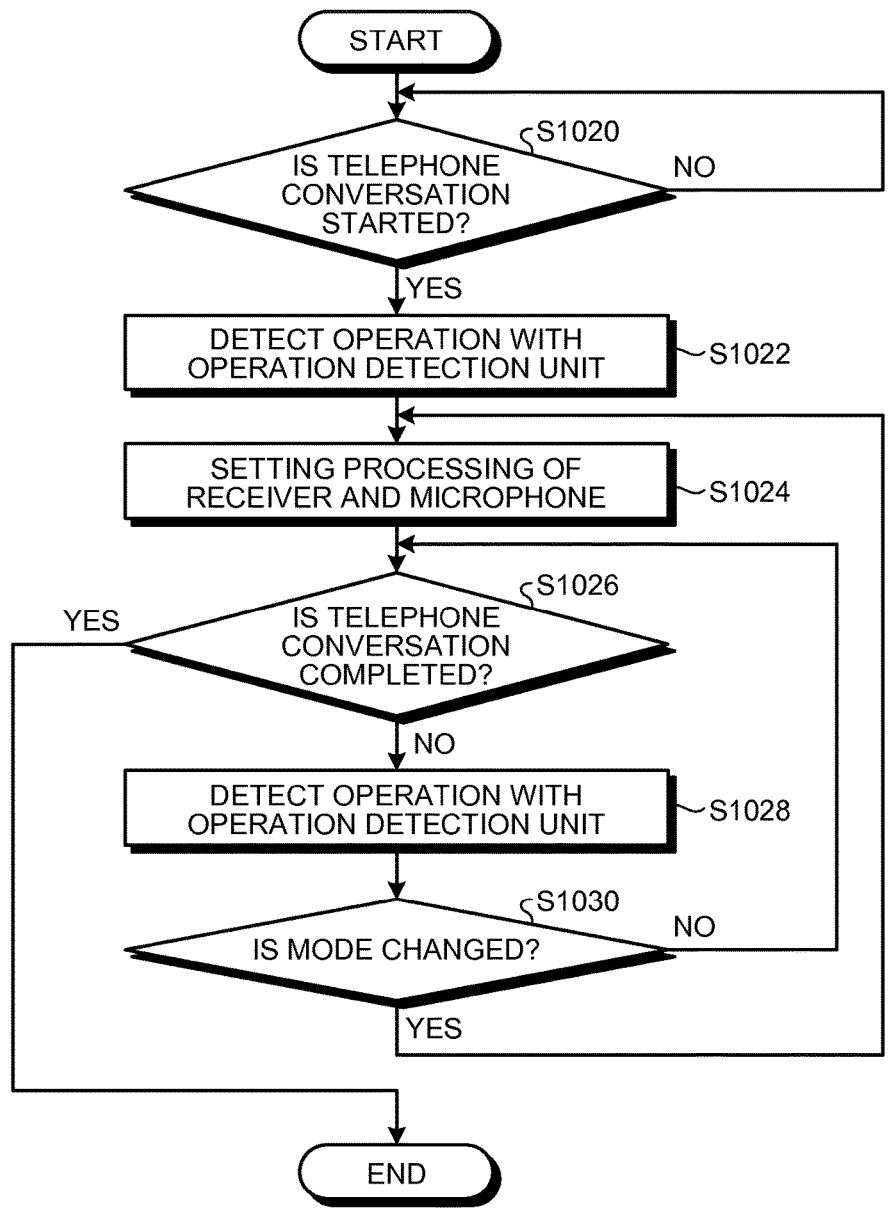
FIG. 42 is a flowchart of a process of control performed in a telephone conversation.
Figure 43:
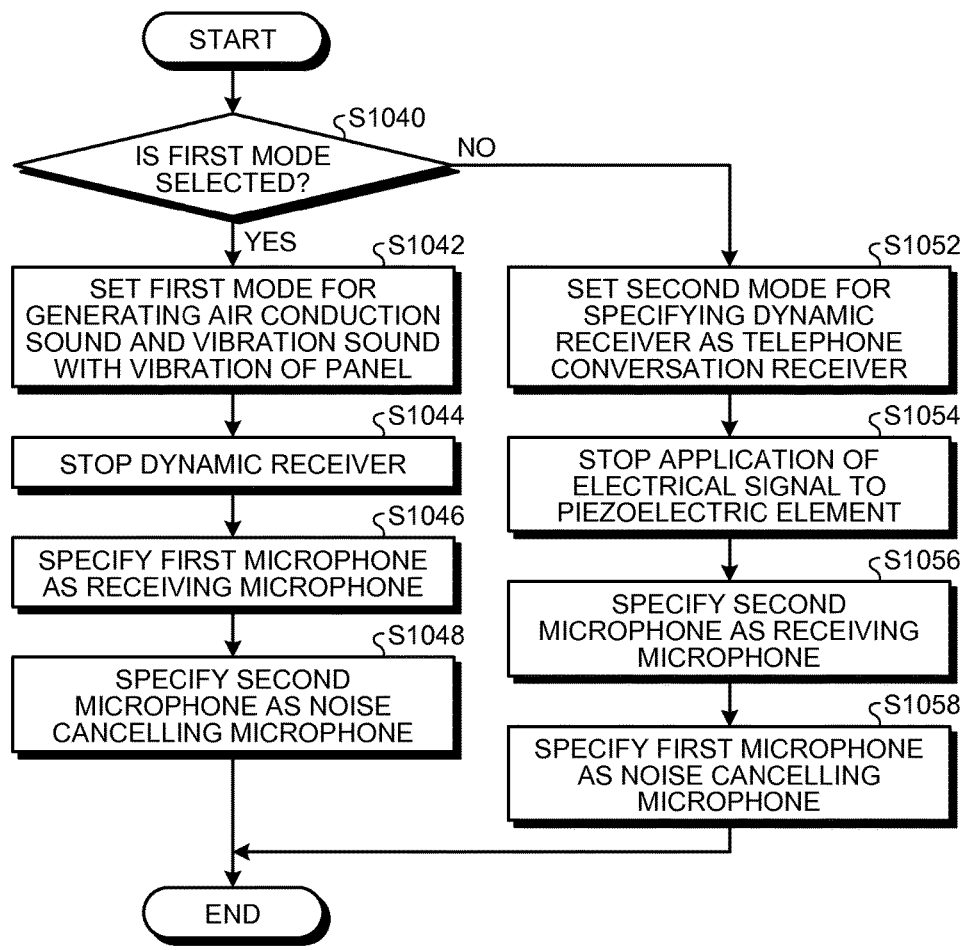
FIG. 43 is a flowchart of a process of control performed on the output mode of a voice.

The following describes the control for determining the control mode used to output a voice and the control of the piezoelectric element 7*a*, the dynamic receiver 7*b*, the first microphone 8*a*, and the second microphone 8*b* performed based on the determined control mode with reference to FIG. 42 and FIG. 43. FIG. 42 is a flowchart of a process of control performed in a telephone conversation. FIG. 43 is a flowchart of a process for controlling the output mode of a voice. The process illustrated in FIG. 42 and FIG. 43 is performed by the controller 10 executing the control program 9A. FIG. 42 and FIG. 43 will be explained processing performed to make a voice call with another communication device. Various types of processing in the voice call are performed by the controller 10 executing the telephone conversation application 9B and using the communication unit 6.

The controller 10 determines, at Step S1020, whether a telephone conversation is started. When it is determined that no telephone conversation is started at Step S1020 (No at Step S1020), the controller 10 proceeds to Step S1020. When it is determined that a telephone conversation is started at Step S1020 (Yes at Step S1020), then at Step S1022, the controller 10 detects an operation with the operation detection unit 16. After detecting an operation at Step S1022, then at Step 1024, the controller 10 performs setting processing of a receiver and a microphone. The controller 10 then proceeds to Step S1026.

The processing at Step S1024 will be described with reference to FIG. 43. The controller 10 performs setting processing of the receiver and the microphone based on the detected operation of the mobile phone 1G at Step S1024. The controller 10 determines, at Step S1040, whether the detected operation is an operation to select the first mode.

When it is determined that the detected operation is an operation to select the first mode at Step S1040 (Yes at Step S1040), then at Step S1042, the controller 10 selects the system to generate the air conduction sound and the vibration sound with the piezoelectric element 7*a* and the panel 20 (the first mode). Subsequently, the controller 10 stops the dynamic receiver 7*b* at Step S1044 and specifies the first microphone 8*a* as a receiving microphone at Step S1046. The controller 10 specifies the second microphone 8*b* as a noise cancelling microphone at Step S1048 and then terminates the processing. After terminating the processing, the controller 10 proceeds to Step S1026.

By performing the processing from Step S1042 to Step S1048, the controller 10 generates the air conduction sound and the vibration sound with the piezoelectric element 7*a* and the panel 20 and uses the first microphone 8*a* arranged on the side opposite to the piezoelectric element 7*a* as a microphone to make a telephone conversation. The controller 10 uses a sound detected by the second microphone 8*b* arranged near the piezoelectric element 7*a* for noise cancellation.

When it is determined that the detected operation is not an operation to select the first mode (No at Step S1040) or when it is determined that the detected operation is an operation to select the second mode at Step S1040, then at Step S1052, the controller 10 specifies the dynamic receiver 7*b* as a telephone conversation receiver (the second mode). Subsequently, the controller 10 stops application of an electrical signal to the piezoelectric element 7*a* at Step S1054 and specifies the second microphone 8*b* as a receiving microphone at Step S1056. The controller 10 specifies the first microphone 8*a* as a noise cancelling microphone at Step S1058 and then terminates the processing. After terminating the processing, the controller 10 proceeds to Step S1026.

By performing the processing from Step S1052 to Step S1058, the controller 10 uses the dynamic receiver 7*b* as a receiver and uses the second microphone 8*b* arranged on the side opposite to the dynamic receiver 7*b* as a microphone to make a telephone conversation. The controller 10 uses a sound detected by the first microphone 8*a* arranged near the dynamic receiver 7*b* for noise cancellation.

After performing the setting processing illustrated in FIG. 43 at Step S1024, the controller 10 processes a telephone conversation voice based on the determined setting parallel to the processing illustrated in FIG. 42. After performing the setting processing at Step S1024, the controller 10 determines, at Step S1026, whether the telephone conversation is completed.

When it is determined that the telephone conversation is not completed yet at Step S1026 (No at Step S1026), then at Step S1028, the controller 10 detects an operation with the operation detection unit 16. Subsequently, the controller 10 determines, at Step S1030, whether the mode is changed. In other words, the controller 10 determines whether an operation to change the mode from the first mode to the second mode or an operation to change the mode from the second mode to the first mode is performed.

When it is determined that the mode is not changed at Step S1030, that is, when it is determined that the mode is the same as that of the current setting (No at Step S1030), the controller 10 proceeds to Step S1026. When it is determined that the mode is changed at Step S1030, that is, when it is determined that the mode is different from that of the current setting (Yes at Step S1030), the controller 10 proceeds to Step S1024 and performs setting processing of the receiver and the microphone.

When it is determined that the telephone conversation is completed at Step S1026 (Yes at Step S1026), the controller 10 terminates the processing.

As illustrated in FIG. 42 and FIG. 43, the mobile phone 1G can make a telephone conversation in the following two modes: the first mode in which the air conduction sound and the vibration sound are generated by the piezoelectric element 7a and the panel 20, which the first mode is selected by the setting processing from Step S1042 to Step S1048; and the second mode in which the dynamic receiver 7b is used as the telephone conversation receiver, which the second mode is selected by the setting processing from Step S1052 to Step S1058. This enables the user to switch the receiver to be used depending on the surrounding environment and usage. If a voice output from the dynamic receiver 7b is mixed with ambient noise and is hard to hear in noisy surroundings, for example, the user causes the mobile phone 1G to output the voice in the first mode. This enables the user to listen to the telephone conversation voice reliably in the noisy surroundings. In a quiet environment, the user causes the mobile phone 1G to output a voice at an appropriate volume in the second mode, thereby suppressing sound leakage reliably. In other words, the user causes the dynamic receiver 7b to output a sound at a volume appropriate for the ear by the air conduction method in the second mode, thereby suppressing transmission of the sound to a position away from the ear of the user by the air conduction method. This can suppress sound leakage.

The mobile phone 1G determines whether to make a telephone conversation in the first mode or the second mode based on the operation performed on the mobile phone 1G. This enables the user to switch the mode for outputting a voice simply by changing the operation performed on the mobile phone 1G.

In the mobile phone 1G, the first microphone 8a and the second microphone 8b are arranged near the dynamic receiver 7b and the piezoelectric element 7a, respectively. With this configuration, the mobile phone 1G can use one of the microphones as a telephone conversation microphone and the other as a noise cancelling microphone. This enables the mobile phone 1G to perform noise cancellation and make a telephone conversation both in the first mode and the second mode.

In the mobile phone 1G, the piezoelectric element 7a and the dynamic receiver 7b are arranged at the ends opposite to each other in the housing 40, and the first microphone 8a and the second microphone 8b are arranged at the ends opposite to each other in the housing 40. With this configuration, the mobile phone 1G can appropriately switch the receiver and the microphone both in the first mode and the second mode.

The mobile phone 1G preferably performs the setting processing of the first mode and the second mode during a telephone conversation like the present embodiment. This enables the mobile phone 1G to selectively perform the processing when needed, resulting in reduced power consumption.

When the dynamic receiver 7b is not used as a receiver, the mobile phone 1G preferably uses the dynamic receiver 7b as a speaker. Thus, the mobile phone 1G can provide a function of a receiver that outputs a sound by the air conduction method and a function of a speaker that notifies the user of a ringtone or the like with the dynamic receiver 7b alone. With this configuration, the mobile phone 1G can have a receiver including a plurality of output systems without increasing the number of mounted devices.

While the start of a telephone conversation is used as a trigger in FIG. 42, detection of any one of a call request and an incoming call may be used as a trigger to start the processing at Step S1022 and that subsequent thereto.

When an operation to inhibit switching is performed, the mobile phone 1G does not switch the mode for outputting a voice, thereby continuing output of the voice in the mode intended by the user.

Eleventh Embodiment

Figure 44:
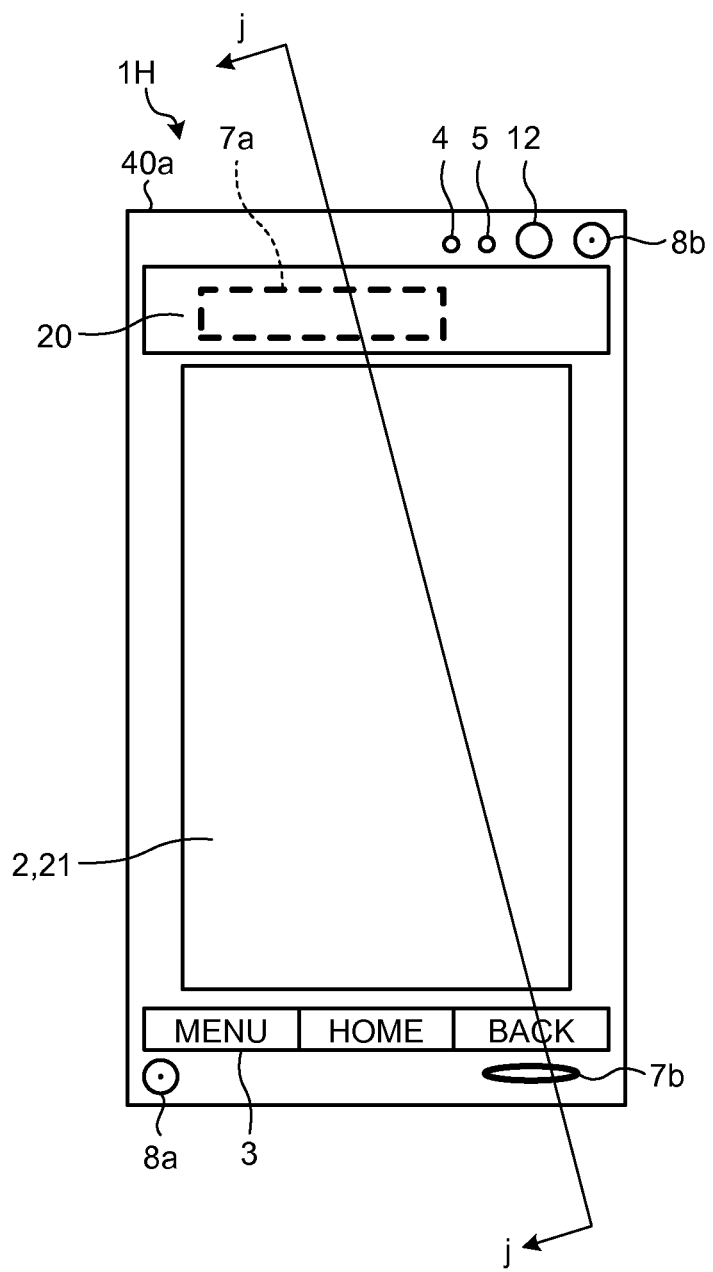
FIG. 44 is a front view of a mobile phone according to an eleventh embodiment.
Figure 45:
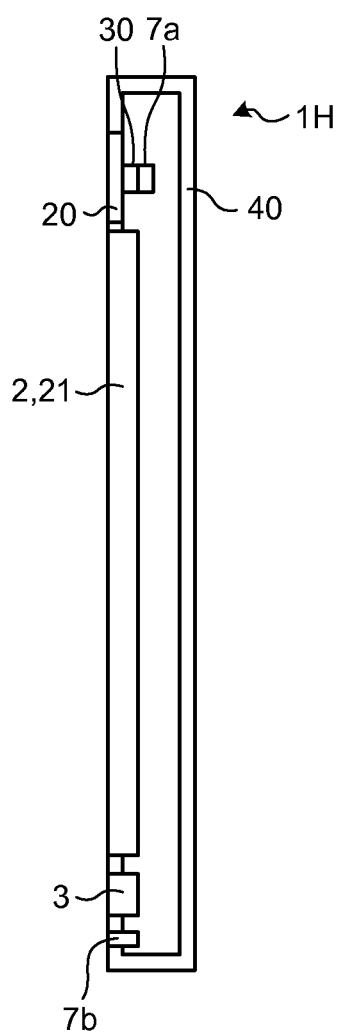
FIG. 45 is a sectional view of the mobile phone along line j-j in FIG. 44.

While the touch screen 21 is arranged on substantially the entire surface of the panel 20 in the tenth embodiment, the touch screen 21 may be arranged in a manner not overlapping with the panel 20. FIG. 44 is a front view of a mobile phone according to an eleventh embodiment. FIG. 45 is a sectional view of the mobile phone along line j-j in FIG. 44. The following describes a mobile phone 1H in which a touch screen 21 is arranged in a manner not overlapping with a panel 20 with reference to FIG. 44 and FIG. 45.

In the mobile phone 1H, a display 2 is arranged side by side with the panel 20 not on the inner-side surface of the panel 20 but on the same plane as that of the panel 20 as illustrated in FIG. 44 and FIG. 45. The touch screen 21 is arranged in a manner covering substantially the entire front surface of the display 2. In other words, the touch screen 21 and the display 2 constitute what is called a touch panel (a touch screen display).

A piezoelectric element 7a is attached to an area from substantially the center of the back surface of the panel 20 in the longitudinal direction to a position near one end with a joining member 30. When an electrical signal is applied to the piezoelectric element 7a, the panel 20 vibrates in association with deformation (expansion and contraction or bending) of the piezoelectric element 7a. Thus, the panel 20 generates an air conduction sound and a vibration sound transmitted via a part of the human body (e.g., the auricular cartilage) in contact with the panel 20.

The touch screen 21 is not arranged on the front surface of the panel 20. The panel 20 is arranged near the display 2 provided with the touch screen 21.

In the case of the mobile phone 1H in which the panel 20 is arranged in a manner not overlapping with the touch screen 21, a dynamic receiver 7b is provided to an end opposite to the end where the piezoelectric element 7a is arranged on a surface of a housing 40. Thus, the mobile phone 1H can output a voice in the two modes similarly to the tenth embodiment and output the voice in a manner suitable for the user.

Twelfth Embodiment

Figure 46:
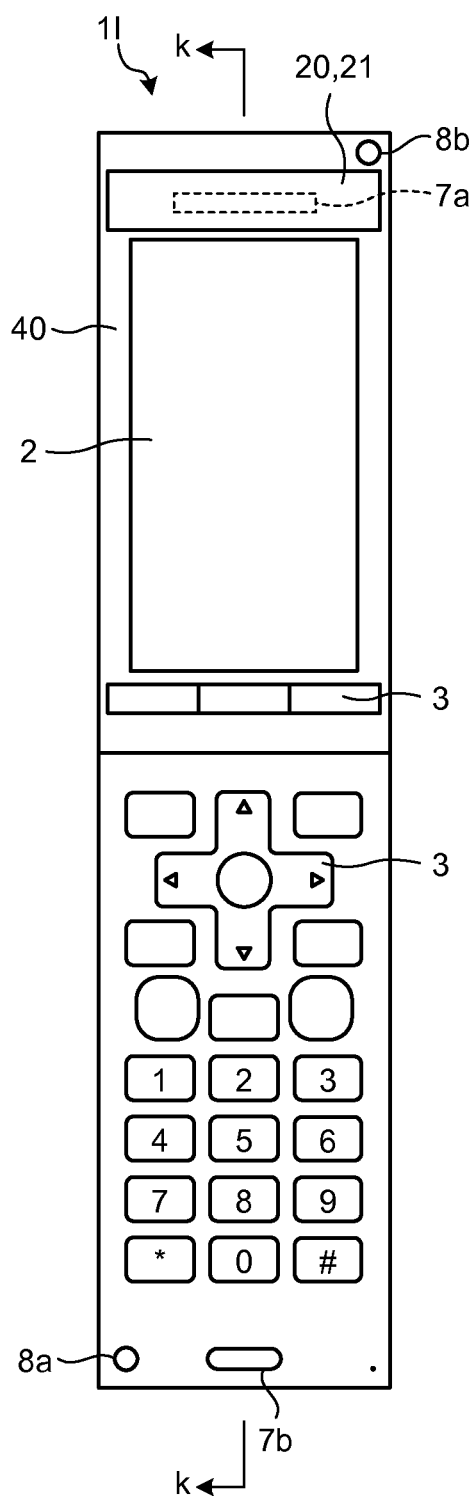
FIG. 46 is a front view of a mobile phone according to a twelfth embodiment.
Figure 47:
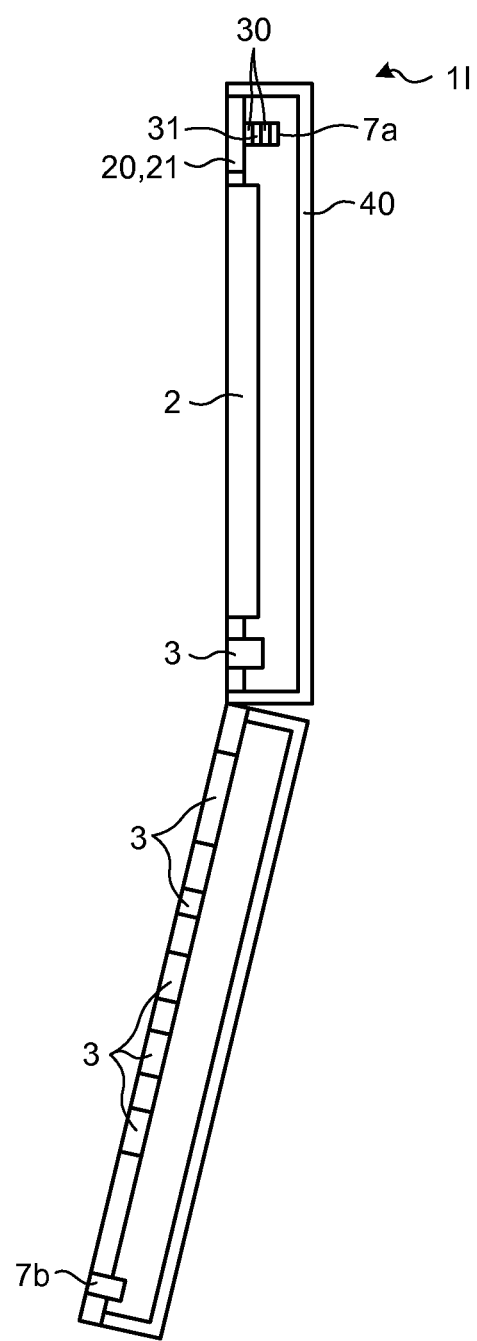
FIG. 47 is a sectional view of the mobile phone along line k-k in FIG. 46.

While the touch screen 21 is arranged with at least a part thereof overlapping with the display 2 in the tenth and the eleventh embodiments, the touch screen 21 may be arranged in a manner not overlapping with the display 2. FIG. 46 is a front view of a mobile phone according to a twelfth embodiment. FIG. 47 is a sectional view of the mobile phone along line k-k in FIG. 46. The following describes a mobile phone 1I in which a touch screen 21 is arranged in a manner not overlapping with the display 2 with reference to FIG. 46 and FIG. 47.

In the mobile phone 1I, the display 2 is arranged side by side with the panel 20 not on the inner-side surface of the panel 20 but on the same plane as that of the panel 20 as illustrated in FIG. 46 and FIG. 47.

A piezoelectric element 7a is attached to substantially the center of the back surface of the panel 20 with a joining member 30. A reinforcing member 31 is arranged between the panel 20 and the piezoelectric element 7a. The reinforcing member 31 is a resin plate, sheet metal, or a plate including glass fibers, for example. In other words, the piezoelectric element 7a and the reinforcing member 31 are bonded by the joining member 30 in the mobile phone 1I, and the reinforcing member 31 and the panel 20 are bonded by the joining member 30. The piezoelectric element 7a is not necessarily arranged at the center of the panel 20.

The reinforcing member 31 is an elastic member made of rubber or silicon, for example. The reinforcing member 31 may be a metal plate made of aluminum having a certain degree of elasticity, for example. The reinforcing member 31 may be a stainless plate of SUS304, for example. The thickness of the metal plate, such as a stainless plate, appropriately varies from 0.2 mm to 0.8 mm depending on the value of the voltage applied to the piezoelectric element 7a, for example. The reinforcing member 31 may be a resin plate, for example. Examples of the resin forming the resin plate include, but are not limited to, polyamide resin. Examples of the polyamide resin include, but are not limited to, Reny (registered trademark) made of crystalline thermoplastic resin composed of m-xylylenediamine and adipic acid and having sufficient strength and elasticity. Such polyamide resin may be reinforced resin reinforced with glass fibers, metal fibers, or carbon fibers using itself as a base polymer, for example. The strength and the elasticity of the reinforced resin are appropriately adjusted depending on the amount of glass fibers, metal fibers, or carbon fibers added to the polyamide resin, for example. The reinforced resin is formed by impregnating resin into a base material made of knitted glass fibers, metal fibers, or carbon fibers and then curing the resin, for example. Alternatively, the reinforced resin may be formed by mixing finely cut fiber pieces into liquid resin and then curing the resin. Still alternatively, the reinforced resin may be formed by laminating a base material made of knitted fibers and a resin layer.

Arrangement of the reinforcing member 31 between the piezoelectric element 7a and the panel 20 provides the following advantageous effects. When external force is applied to the panel 20, the reinforcing member 31 can reduce the possibility of the external force being transmitted to the piezoelectric element 7a and damaging it. When the mobile phone 1I is dropped to the ground and external force is applied to the panel 20, the external force is transmitted to the reinforcing member 31 first. Because the reinforcing member 31 has a predetermined degree of elasticity, the reinforcing member 31 is elastically deformed by the external force transmitted from the panel 20. Thus, the reinforcing member 31 absorbs at least a part of the external force applied to the panel 20, thereby reducing the external force transmitted to the piezoelectric element 7a. This can reduce the possibility of the piezoelectric element 7a being damaged. If the reinforcing member 31 is arranged between the piezoelectric element 7a and the housing 40, the reinforcing member 31 can reduce the possibility of the deformed housing 40 bumping into the piezoelectric element 7a and damaging it when the mobile phone 1I is dropped to the ground and a housing 40 is deformed.

The vibration caused by expansion and contraction or bending of the piezoelectric element 7a is transmitted to the reinforcing member 31 first and then to the panel 20. In other words, the piezoelectric element 7a vibrates the reinforcing member 31 having a larger elastic coefficient than that of the piezoelectric element 7a first and then vibrates the panel 20. Thus, the mobile phone 1I can suppress excessive deformation of the piezoelectric element 7a compared with a structure in which the piezoelectric element 7a is joined to the panel 20 by the joining member 30 without the reinforcing member 31. This makes it possible to adjust the amount of deformation (the degree of deformation) of the panel 20. The structure according to the present embodiment is effectively used particularly when the panel 20 has difficulty in preventing deformation of the piezoelectric element 7a.

Figure 48:
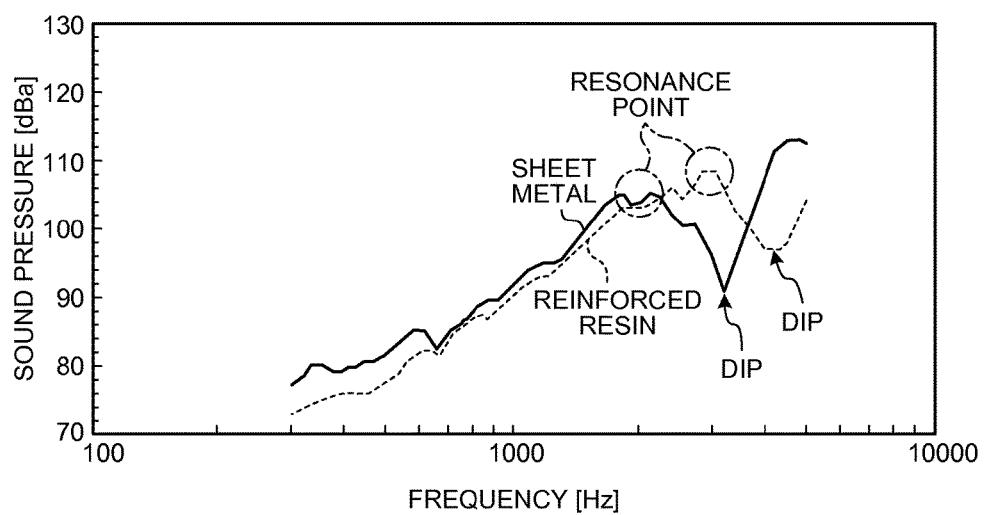
FIG. 48 is a diagram of an example of a change in frequency characteristics caused by a reinforcing member.

Furthermore, the reinforcing member 31 arranged between the piezoelectric element 7a and the panel 20 lowers the resonance frequency of the panel 20, thereby increasing the acoustic characteristics at a low frequency band as illustrated in FIG. 48. FIG. 48 is a diagram of an example of a change in the frequency characteristics caused by the reinforcing member 31. FIG. 48 illustrates the frequency characteristics obtained when sheet metal, such as SUS304, is used as the reinforcing member 31 and the frequency characteristics obtained when reinforced resin, such as Reny, is used as the reinforcing member 31. The abscissa represents the frequency, whereas the ordinate represents the sound pressure. The resonance point in the case of the reinforced resin is approximately 2 kHz, whereas the resonance point in the case of the sheet metal is approximately 1 kHz. The dip in the case of the reinforced resin is approximately 4 kHz, whereas the dip in the case of the sheet metal is approximately 3 kHz. In other words, when the reinforced resin is used, the resonance point of the panel 20 is positioned in a higher frequency domain, and the dip of the frequency characteristics is positioned in a higher frequency domain than those in the case where the sheet metal is used. The frequency band used for a voice call of a mobile phone falls within a range from 300 Hz to 3.4 kHz. Thus, the use of the reinforced resin as the reinforcing member 31 can prevent the dip from being included in the frequency band used by the mobile phone 1I. Even when the sheet metal is used as the reinforcing member 31, it is possible to prevent the dip from being included in the frequency band used by the mobile phone 1I by appropriately adjusting the types or the composition of the metals constituting the sheet metal or the thickness of the sheet metal, for example. In comparison between the sheet metal and the reinforced resin, the reinforced resin can reduce an influence on the antenna performance compared with the sheet metal. Because the reinforced resin is hardly plastically deformed compared with the sheet metal, the reinforced resin has an advantageous effect of making the acoustic characteristics less likely to change. The reinforced resin can suppress a rise in temperature occurring when a sound is generated compared with the sheet metal. Instead of the reinforcing member 31, a plate-like weight may be attached to the piezoelectric element 7a with the joining member 30.

When an electrical signal is applied to the piezoelectric element 7a, the panel 20 vibrates in association with deformation (expansion and contraction or bending) of the piezoelectric element 7a. Thus, the panel 20 generates an air conduction sound and a vibration sound transmitted via a part of the human body (e.g., the auricular cartilage) in contact with the panel 20. The touch screen 21 is arranged in a manner covering substantially the entire front surface of the panel 20.

Similarly to the tenth and the eleventh embodiments, the mobile phone 1I also includes a dynamic receiver 7b at an end opposite to an end 40a where the piezoelectric element 7a is arranged. A first microphone 8a is arranged near the dynamic receiver 7b. A second microphone 8b is arranged near the piezoelectric element 7a.

Also in the mobile phone 1I, the dynamic receiver 7b is provided to an end opposite to the end where the piezoelectric element 7a is arranged on a surface of the housing 40. Thus, the mobile phone 1I can output a voice in the two modes similarly to the tenth and the eleventh embodiments and output the voice in a manner suitable for the user.

The embodiments disclosed in the present application may include matters apparent to those skilled in the art, and various changes and modifications may be made without departing from the spirit and scope of the invention. The embodiments and the modifications disclosed in the present application may be combined as appropriate. The embodiments above, for example, may be modified as follows.

The computer programs illustrated in FIG. 41, for example, may be divided into a plurality of modules or combined with other computer programs.

While the piezoelectric element 7a and the dynamic receiver 7b are arranged at one end and the other end, respectively, of the housing 40 in the tenth to the twelfth embodiments, the embodiments are not limited thereto. In the mobile phones, the piezoelectric element 7a and the dynamic receiver 7b may be arranged close to each other.

While the microphones 8a and 8b are arranged near the dynamic receiver 7b and the piezoelectric element 7a, respectively, in the tenth to the twelfth embodiments, the embodiments are not limited thereto. The mobile phones may use the same microphone as a receiving microphone. In this case, the mobile phones may include a single microphone alone. The mobile phones may further include another microphone used for noise cancellation both in the first mode and the second mode. In the embodiments above, the first microphone 8a and the second microphone 8b are not necessarily used for noise cancellation.

While the piezoelectric element 7a and the dynamic receiver 7b are arranged near the respective ends in the longitudinal direction of the housing 40 in the tenth to the twelfth embodiments, the embodiments are not limited thereto. The piezoelectric element 7a and the dynamic receiver 7b may be arranged near respective ends in the short direction of the housing 40. In the case of the housing 40 having not a rectangular shape but a square shape, the piezoelectric element 7a and the dynamic receiver 7b may be arranged near respective ends opposite to each other. While the dynamic speaker serves as the second sound generating unit in the embodiments above, the second sound generating unit may be the panel 20 and a second piezoelectric element attached to the panel and different from the piezoelectric element 7a. In this case, the second piezoelectric element may be arranged at an end opposite to the end where the piezoelectric element 7a is provided in the longitudinal direction of the panel 20.

While the first microphone 8a and the second microphone 8b are arranged at respective positions on a diagonal line on the principal surface of the housing 40 in the tenth to the twelfth embodiments, the embodiments are not limited thereto. The first microphone 8a and the second microphone 8b may be arranged at the same end in the short direction on a surface of the housing 40.

While it is determined whether to perform the first mode or the second mode based on a contact operation or a pressing operation performed on the mobile phones in the tenth to the twelfth embodiments, the embodiments are not limited thereto. The mobile phones may determine the mode based on control conditions other than the operations described above. The mobile phones may determine whether to perform the first mode or the second mode based on an operation input by a voice, for example. In this case, the mobile phones collect a voice from an active microphone, such as the first microphone or the second microphone. When the mobile phones catch a specific keyword, such as "the first mode", "the second mode", or "switch the mode", in the voice using the sound recognition function, the mobile phones may switch the output mode to the mode corresponding to the word.

The mobile phones may detect the shape or the orientation and the position of the ear with the touch screen 21, thereby determining whether to perform the first mode or the second mode based on the shape or the orientation and the position of the ear, for example. The mobile phones may determine the mode so as to output a voice using a receiver to which the upper part of the ear is directed, for example.

In the example above, the shape or the orientation and the position of the ear in contact with the panel 20 are detected using the touch screen 21. The detecting unit that detects the position of an object is not limited to the touch screen 21. The detecting unit that detects the position of an object may be the camera 12, for example. In this case, the position of an object is detected based on an image acquired by the camera 12.

In the mobile phone 1G according to the tenth embodiment, the display 2 is attached to the back surface of the panel 20 with the joining member 30. The mobile phone 1G may have a space between the panel 20 and the display 2. The space formed between the panel 20 and the display 2 facilitates vibration of the panel 20, thereby increasing the range in which the vibration sound is easy to hear on the panel 20.

While the piezoelectric element 7a is attached to the panel 20 in the tenth to the twelfth embodiments, the piezoelectric element 7a may be attached to another position. The piezoelectric element 7a may be attached to a battery lid, for example. The battery lid is a member attached to the housing 40 to cover a battery. The battery lid is frequently attached to a surface different from that on the display 2 side in a mobile electronic device including a mobile phone. This configuration enables the user to listen to a sound by bringing a part of the body (e.g., the ear) into contact with the surface different from that on the display 2 side.

In the mobile phones, the piezoelectric element 7a may vibrate a corner of the housing 40 (e.g., at least one of the four corners). In this case, the piezoelectric element 7a may be attached to the inner surface of the corner of the housing 40. Alternatively, an intermediate member may be provided, and vibration of the piezoelectric element 7a may be transmitted to the corner of the housing 40 via the intermediate member. This configuration can make the range of vibration relatively small, thereby making an air conduction sound generated by the vibration less likely to leak to the surroundings. This configuration enables the user to receive the air conduction sound and the vibration sound by inserting the corner of the housing 40 into the external auditory meatus, for example. This can make ambient noise less likely to enter the external auditory meatus of the user, thereby improving the quality of the sound transmitted to the user.

While the reinforcing member 31 is a plate-like member in the twelfth embodiment, the shape of the reinforcing member 31 is not limited thereto. The reinforcing member 31 may be larger than the piezoelectric element 7a and have a shape whose end is curved toward the piezoelectric element 7a to cover the side portion of the piezoelectric element 7a, for example. The reinforcing member 31 may include a plate-like portion and an extended portion extended from the plate-like portion to cover the side portion of the piezoelectric element 7a, for example. In this case, the extended portion and the side portion of the piezoelectric element 7a are preferably separated from each other by a predetermined distance. This can make the extended portion less likely to prevent deformation of the piezoelectric element.

The panel 20 may be a part or all of any one of a display panel, an operation panel, a cover panel, and a lid panel that makes a rechargeable battery detachable. In the case of the panel 20 serving as a display panel, the piezoelectric element 7*a* is arranged outside of a display area for a display function. This configuration is less likely to obstruct display. The operation panel includes a touch panel. The operation panel further includes a sheet key, which is a member serving as a surface on the operating unit side of the housing integrated with key tops of operation keys in a folding mobile phone, for example.

In the description above, the joining member that bonds the panel 20 and the piezoelectric element 7*a* and the joining member that bonds the panel 20 and the housing 40 are referred to as the joining member 30 assigned with the same reference numeral. The joining members, however, may be different from each other as needed depending on the members to be joined.

While the explanations have been made of the mobile phones as examples of the device according to claims in the embodiments above, the device according to the claims are not limited to the mobile phones. The device according to the claims may be a mobile electronic device other than the mobile phones. Examples of the mobile electronic device include, but are not limited to, a tablet, a mobile personal computer, a digital camera, a media player, an electronic book reader, a navigator, and a game machine.

While the controller of the mobile phones controls generation of a sound in the embodiments above, the embodiments are not limited thereto. Generation of a sound may be controlled based on an instruction signal received via a network by the communication unit, for example. The mobile phones may receive a signal from another electronic device via what is called short-range communications, such as Bluetooth (registered trademark) and infrared communications, and control generation of a sound based on the received signal, for example.

The explanations have been made of the characteristic embodiments for complete and clear disclosure of the technologies according to the claims. The claims, however, are not limited to the embodiments above. The claims are embodied by all modifications and replaceable configurations that can be manufactured by those skilled in the art within the range of basic matters disclosed in the present application.

The invention claimed is:

1. An electronic device, comprising:
   a piezoelectric element;
   a first sound generating unit configured to be vibrated by the piezoelectric element and to generate a vibration sound transmitted by vibrating a part of a human body;
   a second sound generating unit configured to generate an air conduction sound;
   an attitude detection unit configured to detect an orientation of the electronic device;
   a controller configured to switch between (i) sound generation using the first sound generating unit and (ii) sound generation using the second sound generating unit; and
   a sound input unit configured to receive sound around the electronic device, wherein
   the first sound generating unit and the second sound generating unit are configured to generate sound based on a sound pressure of the sound around the electronic device received by the sound input unit,
   the first sound generating unit is configured to generate sound when the sound pressure of the sound around the electronic device is not lower than a threshold,
   the second sound generating unit is configured to generate sound when the sound pressure of the sound around the electronic device is lower than the threshold,
   the controller is configured to cause the first sound generating unit to generate sound when
      the second sound generating unit generates sound, and
      the sound pressure of the sound around the electronic device is not lower than the threshold,
   the controller is configured to cause the second sound generating unit to generate sound when
      the first sound generating unit generates sound, and
      a state where the sound pressure of the sound around the electronic device is lower than the threshold continues for a certain period of time,
   the first sound generating unit and the second sound generating unit are configured to generate the sound based on place information obtained by position measurement processing,
   the place information is a geographical location of the electronic device,
   the controller is configured to switch between the first and second sound generating units based on the geographic location of the electronic device, and
   the controller is configured to, based on the detected orientation of the electronic device, automatically switch between (i) sound generation using the first sound generating unit and (ii) sound generation using the second sound generating unit, without any user intervention.

2. The electronic device according to claim 1, wherein the first sound generating unit is configured to be vibrated by the piezoelectric element and to generate both an air conduction sound and the vibration sound.

3. The electronic device according to claim 1, further comprising:
   a voice input unit configured to receive a voice uttered by a user in a telephone conversation, wherein
   the controller is configured to
      before a start of the telephone conversation,
         cause at least one of the first sound generating unit and the second sound generating unit to generate sound based on a result of comparison between the sound pressure of the sound around the electronic device and the threshold, and
      after the start of the telephone conversation,
         analyze the voice received by the voice input unit, and
         in response to a detection, in the analyzed voice, of a predetermined switching keyword, switch between (i) sound generation using the first sound generating unit and (ii) sound generation using the second sound generating unit.

4. The electronic device according to claim 1, further comprising a display, wherein
   the first sound generating unit is a panel attached to the piezoelectric element to be vibrated by the piezoelectric element, and
   the panel is separate from the display.

5. The electronic device according to claim 4, wherein the panel is configured to vibrate in a larger area than an area having (a) a length corresponding to a distance from a lower crus of an antihelix to an antitragus of a human ear and (b) a width corresponding to a distance from a tragus to an antihelix.

6. The electronic device according to claim 4, wherein the panel is a part or all of any one of a display panel, an operation panel, a cover panel, and a lid panel that makes a rechargeable battery detachable.

7. The electronic device according to claim 6, wherein the panel is the display panel, and
the piezoelectric element is attached to the display panel but arranged outside a display area for a display function of the display panel.

8. The electronic device according to claim 4, wherein the panel is configured to deform to transmit an air conduction sound and the vibration sound at any point of the panel.

9. The electronic device according to claim 4, wherein
the panel has a plurality of points configured to vibrate in a direction intersecting with a principal surface of the panel in a vibration area, and
the vibration has a value of amplitude changing from plus to minus or minus to plus with time in each of the points.

10. The electronic device according to claim 1, wherein the controller is configured to
automatically switch between (i) sound generation using the first sound generating unit and (ii) sound generation using the second sound generating unit based on the obtained geographical location.

11. An electronic device, comprising:
a housing;
a piezoelectric element;
a first sound generating unit configured to be vibrated by the piezoelectric element and to generate a vibration sound transmitted by vibrating a part of a human body;
a second sound generating unit;
an attitude detection unit configured to detect an orientation of the electronic device; and
a controller configured to, based on the detected orientation of the electronic device, automatically switch between (i) sound generation using the first sound generating unit and (ii) sound generation using the second sound generating unit, without any user intervention,
wherein
the housing has a first end and a second end opposite to each other in a long-side direction of the housing,
the piezoelectric element is arranged closer to the first end than the second end in the long-side direction of the housing,
the second sound generating unit is arranged closer to the second end than the first end in the long-side direction of the housing,
the electronic device further comprises first and second microphones arranged on the second and first ends, respectively, the first and second microphones configured to receive a voice uttered by a user, and
the controller is configured to
specify the first microphone to receive the voice when selecting the first sound generating unit to generate sound, and
specify the second microphone to receive the voice when selecting the second sound generating unit to generate sound.

12. The electronic device according to claim 11, wherein the first sound generating unit is configured to be vibrated by the piezoelectric element and to generate both an air conduction sound and the vibration sound.

13. The electronic device according to claim 11, wherein the first sound generating unit is configured to generate the sound when the piezoelectric element is positioned above the second sound generating unit in the vertical direction.

14. The electronic device according to claim 11, wherein the second sound generating unit is configured to generate the sound when the second sound generating unit is positioned above the piezoelectric element in the vertical direction.

15. The electronic device according to claim 11, further comprising:
a communication unit configured to perform communications for a voice call, wherein
one of the first sound generating unit and the second sound generating unit is configured to generate the sound in a telephone conversation using the communication unit.

16. The electronic device according to claim 11, wherein when the first sound generating unit generates sound,
the first microphone is configured as a microphone for the voice, and
the second microphone is configured as a microphone for noise cancellation, and when the second sound generating unit generates sound,
the second microphone is configured as a microphone for the voice, and
the first microphone is configured as a microphone for noise cancellation.

17. The electronic device according to claim 11, further comprising a display, wherein
the first sound generating unit is a panel attached to the piezoelectric element to be vibrated by the piezoelectric element, and
the panel is separate from the display.

18. The electronic device according to claim 17, wherein
the panel is arranged on a principal surface of the housing,
the first microphone and the second microphone each include, in the housing, a microphone main body configured to detect a sound, and
the housing has a microphone hole that communicates a space in which the first microphone or the second microphone is arranged and a space outside the housing, the microphone hole being on a surface different from the principal surface.

19. The electronic device according to claim 17, wherein the panel is configured to vibrate in a larger area than an area having (a) a length corresponding to a distance from a lower crus of an antihelix to an antitragus of a human ear and (b) a width corresponding to a distance from a tragus to an antihelix.

20. The electronic device according to claim 17, wherein the panel is a part or all of any one of a display panel, an operation panel, a cover panel, and a lid panel that makes a rechargeable battery detachable.

21. The electronic device according to claim 17, wherein the panel is configured to deform to transmit an air conduction sound and the vibration sound at any point of the panel.

22. The electronic device according to claim 11, further comprising a display panel, wherein
the first sound generating unit is a panel,
the panel is the display panel, and
the piezoelectric element is arranged outside a display area for a display function of the display panel.

23. The electronic device according to claim 11, wherein the attitude detection unit is configured to detect an attitude of the electronic device, and the controller is configured to, based on the detected attitude of the electronic device, automatically switch between (i) sound generation using the first sound generating unit and (ii) sound generation using the second sound generating unit.

24. The electronic device according to claim 23, wherein the attitude detection unit comprises at least one selected from the group consisting of an acceleration sensor, an orientation sensor, and a gyroscope.

* * * * *